United States Patent
Kurahashi et al.

(10) Patent No.: US 8,694,226 B2
(45) Date of Patent: Apr. 8, 2014

(54) CONTROL APPARATUS FOR INTERNAL COMBUSTION ENGINE, CONTROL METHOD FOR INTERNAL COMBUSTION ENGINE AND NON-TRANSITORY COMPUTER-READABLE RECORDING MEDIUM

(75) Inventors: Ken Kurahashi, Wako (JP); Yukio Noda, Wako (JP); Koichi Saiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 564 days.

(21) Appl. No.: 13/103,944

(22) Filed: May 9, 2011

(65) Prior Publication Data

US 2011/0295491 A1 Dec. 1, 2011

(30) Foreign Application Priority Data

Jun. 1, 2010 (JP) .................................. 2010-125740

(51) Int. Cl.
*F02D 11/00* (2006.01)
*F02D 41/00* (2006.01)

(52) U.S. Cl.
USPC ........................................................ 701/103

(58) Field of Classification Search
USPC .......... 701/102–105, 114, 115; 123/674, 677, 123/672, 700, 704
See application file for complete search history.

(56) References Cited

U.S. PATENT DOCUMENTS 5,755,212 A * 5/1998 Ajima ........................... 123/674

FOREIGN PATENT DOCUMENTS

| JP | 3-189371 | 8/1991 |
| JP | 2006-009674 | 1/2006 |
| JP | 2009-270543 | 11/2009 |

OTHER PUBLICATIONS

Japanese Office Action for corresponding JP Application No. 2010-125740, May 8, 2012.

* cited by examiner

*Primary Examiner* — Hieu T Vo
(74) *Attorney, Agent, or Firm* — Ditthavong Mori & Steiner, P.C.

(57) ABSTRACT

A control apparatus for an internal-combustion engine includes a diagnosis device. The diagnosis device includes a determination section and an exhaust flow rate calculator configured to calculate an exhaust flow rate that reflects a volume flow amount of exhaust gas. A filter is configured to filter a signal representing an air-fuel ratio so that a 0.5th-order frequency component of engine speed is extracted from the signal. An integrator is configured to accumulate a filtered signal for a predetermined period of time to compute an integration value. A corrector is configured to correct the integration value to compute a corrected integration value each time the integration value is computed by the integrator. The determination section is configured to determine that cylinder-to-cylinder air-fuel ratio imbalance occurs in cylinders if the corrected integration value is greater than a predetermined threshold value after the predetermined period of time has elapsed.

20 Claims, 31 Drawing Sheets

FIG. 5A
0　　　　　　　0.5TH-ORDER　　　　　FIRST-ORDER
FREQUENCY SPECTRUM
FIG. 5B
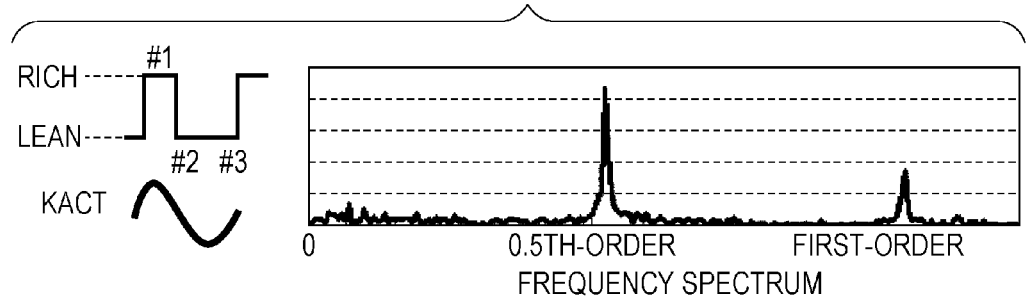
0　　　　　　　0.5TH-ORDER　　　　　FIRST-ORDER
FREQUENCY SPECTRUM
FIG. 5C
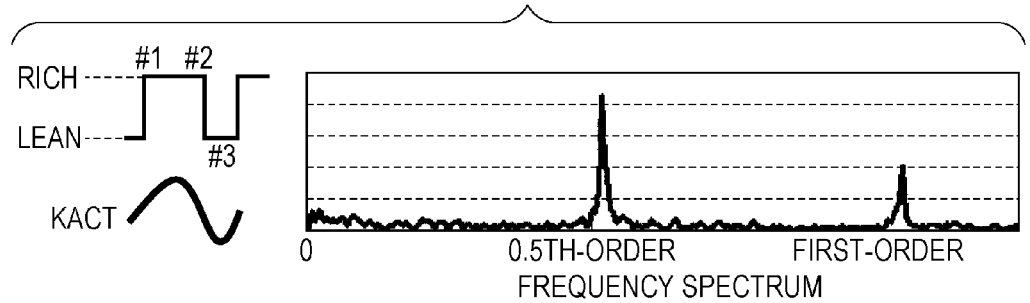
0　　　　　　　0.5TH-ORDER　　　　　FIRST-ORDER
FREQUENCY SPECTRUM

FIG. 8A

LOW (LOW LOAD) ← EXHAUST FLOW RATE GAIR$_{EX}$ (g/sec) → HIGH (HIGH LOAD)

NE(rpm): LOW → HIGH

|  | GEX1 | GEX2 | GEX3 | GEX4 |
|---|---|---|---|---|
| NE1 | INSUFFICIENT EXHAUST GAS VOLUME | | DIAGNOSABLE REGION | |
| NE2 | | | | |
| NE3 | | | | |
| NE4 | LIMIT OF RESPONSIVENESS OF LAF SENSOR | | | |

FIG. 8B

LOW (LOW LOAD) ← EXHAUST FLOW RATE GAIR$_{EX}$ (g/sec) → HIGH (HIGH LOAD)

NE(rpm): LOW → HIGH

|  | GEX1 | GEX2 | GEX3 | GEX4 |
|---|---|---|---|---|
| NE1 |  |  | MEDIUM | HIGH |
| NE2 |  | LOW | MEDIUM | MAXIMUM |
| NE3 | LOW | MEDIUM | HIGH | HIGH |
| NE4 |  |  |  |  |

FIG. 8C

LOW (LOW LOAD) ← EXHAUST FLOW RATE GAIR$_{EX}$ (g/sec) → HIGH (HIGH LOAD)

NE(rpm): LOW → HIGH

|  | GEX1 | GEX2 | GEX3 | GEX4 |
|---|---|---|---|---|
| NE1 |  |  | 1.4 | 1.2 |
| NE2 |  | 1.7 | 1.4 | 1.0 |
| NE3 | 1.7 | 1.4 | 1.2 | 1.2 |
| NE4 |  |  |  |  |

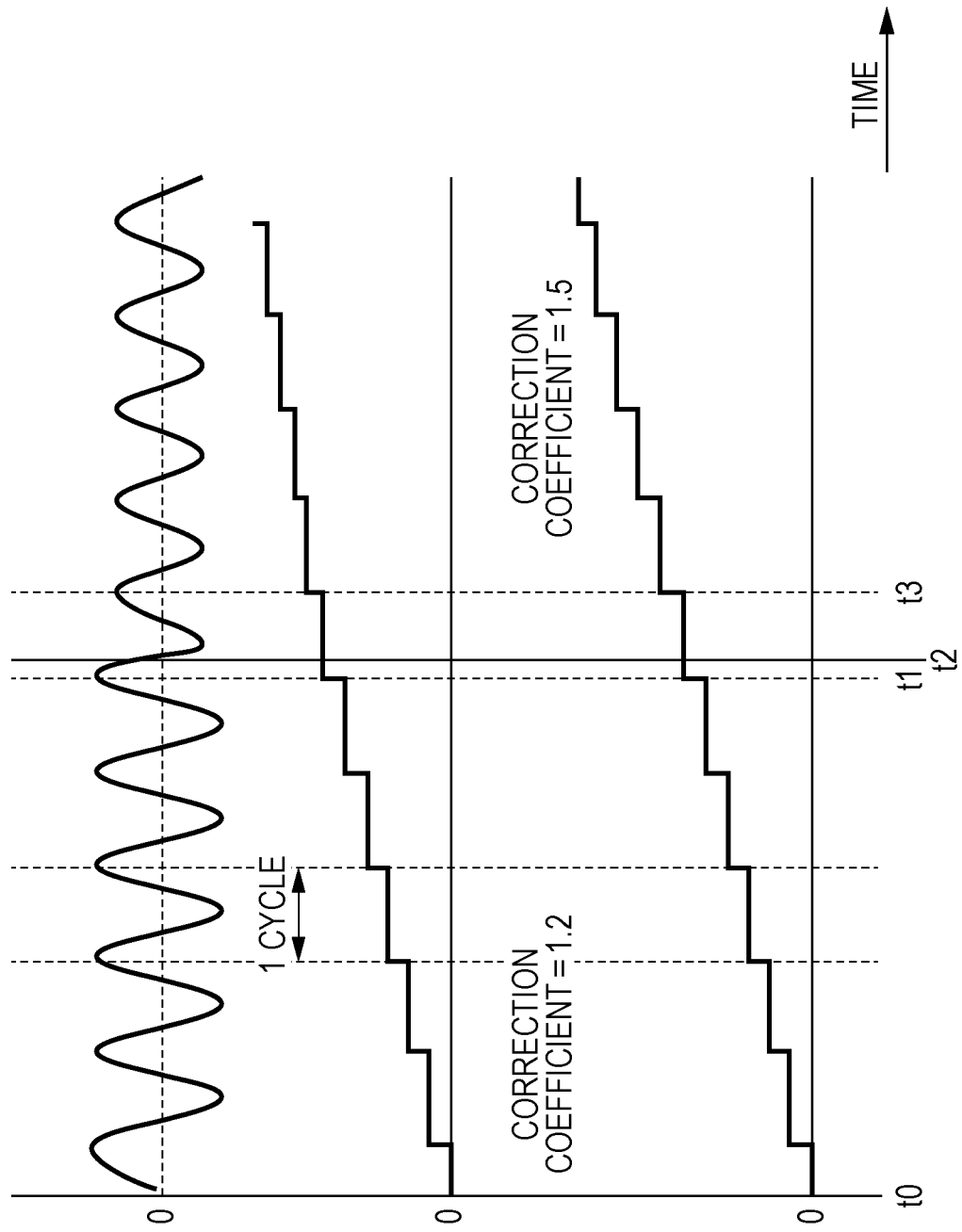

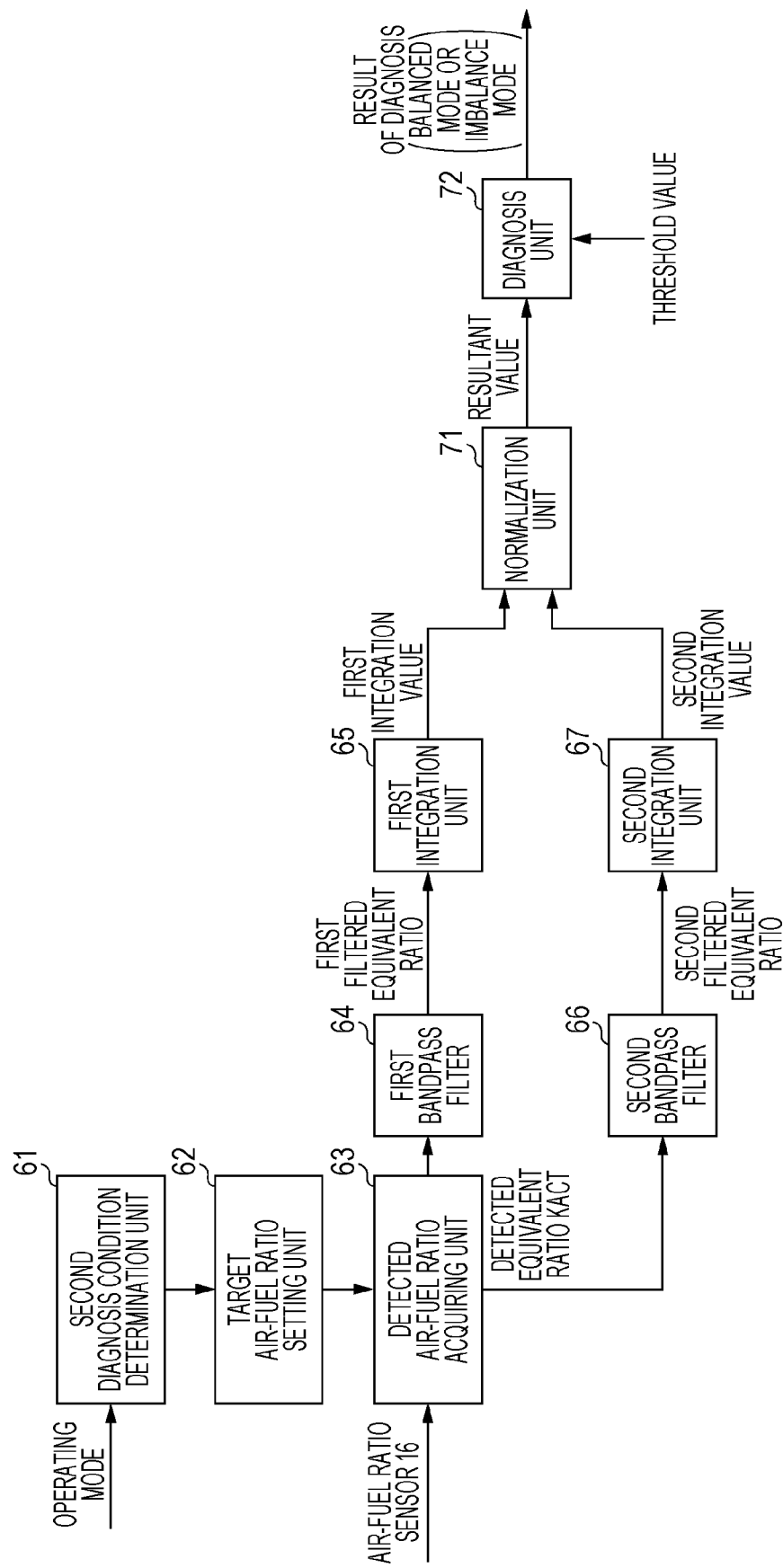

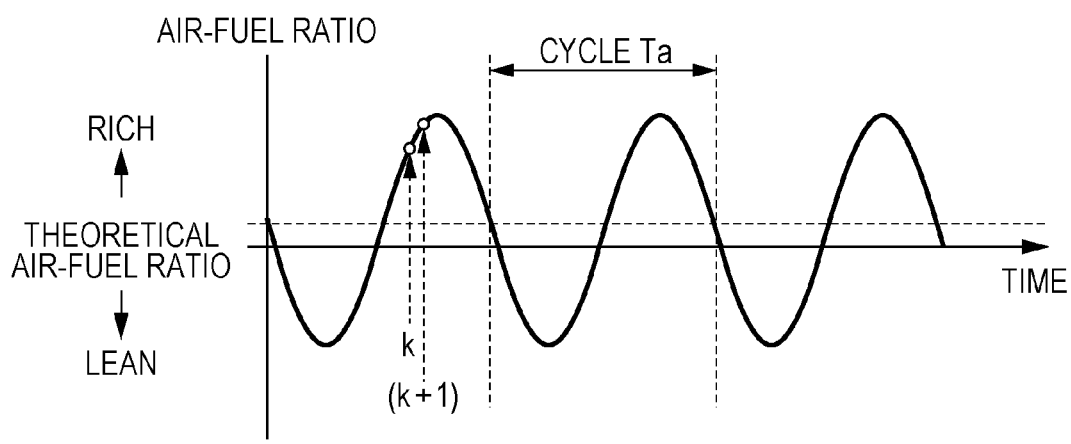

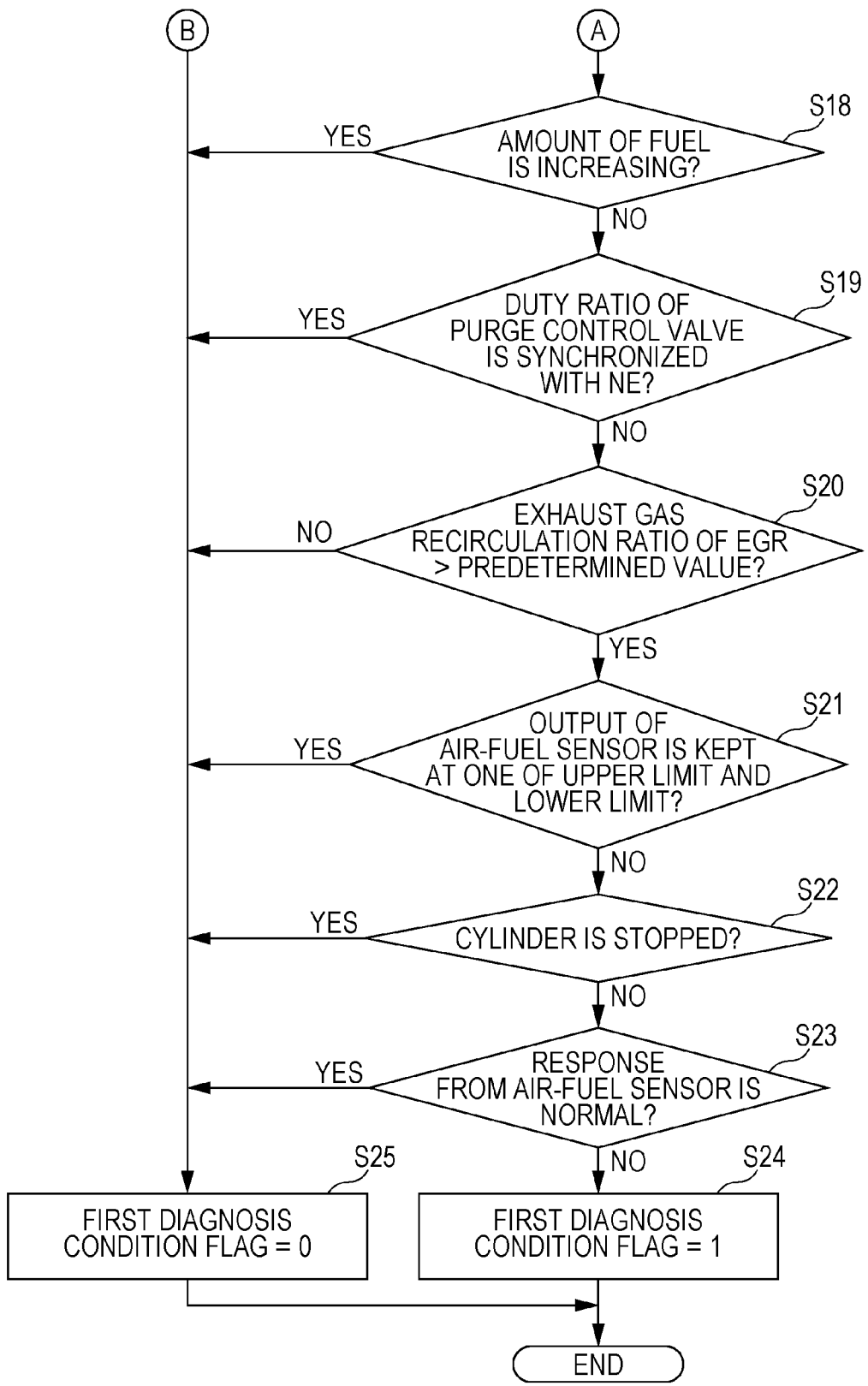

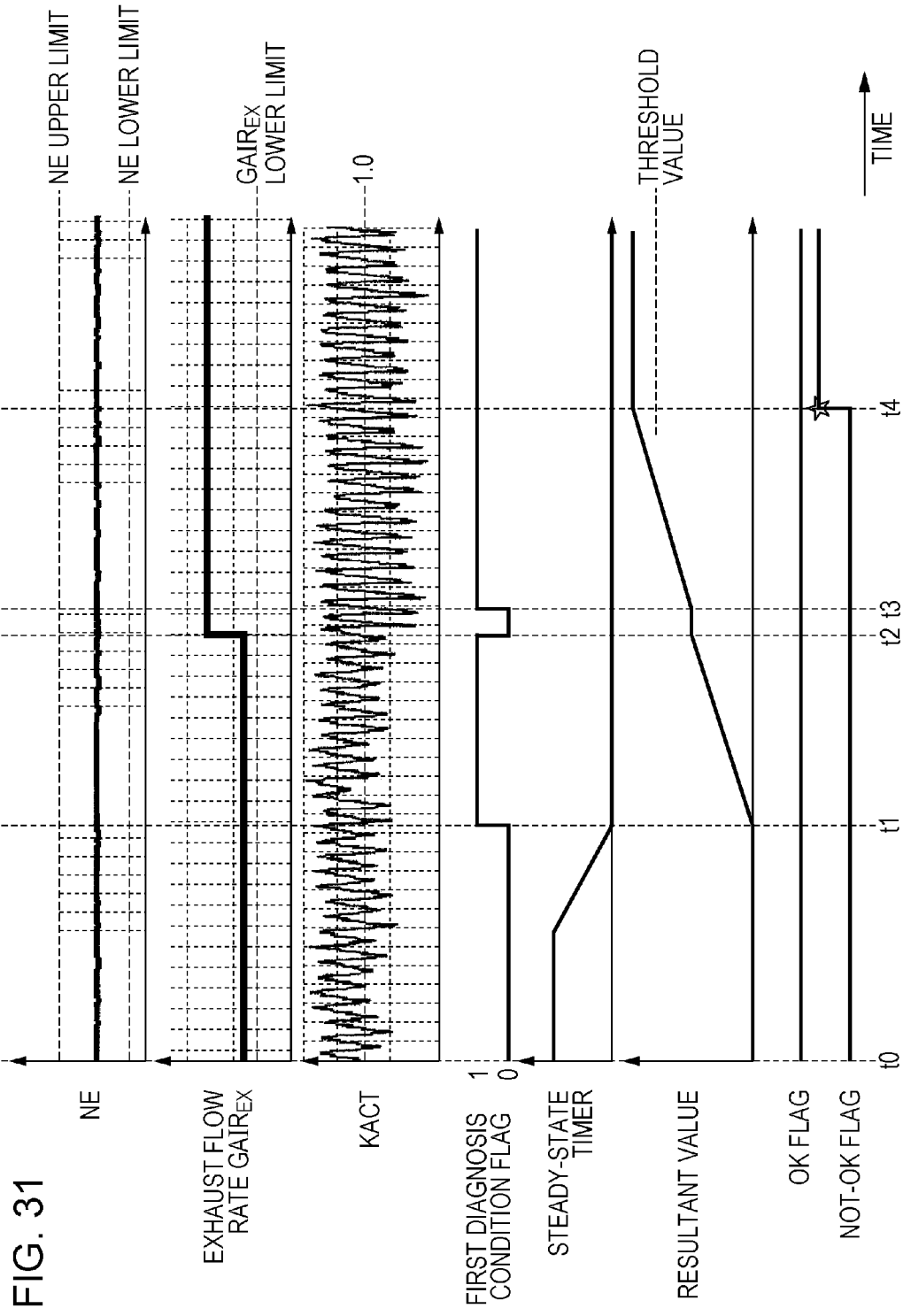

CONTROL APPARATUS FOR INTERNAL COMBUSTION ENGINE, CONTROL METHOD FOR INTERNAL COMBUSTION ENGINE AND NON-TRANSITORY COMPUTER-READABLE RECORDING MEDIUM

CROSS-REFERENCE TO RELATED APPLICATIONS

The present application claims priority under 35 U.S.C. §119 to Japanese Patent Application No. 2010-125740 filed in the Japan Patent Office on Jun. 1, 2010 entitled "CYLINDER-TO-CYLINDER AIR-FUEL RATIO IMBALANCE DETECTING DEVICE." The contents of this application are incorporated herein by reference in their entirety.

BACKGROUND OF THE INVENTION

1. Field of the Invention

The present invention relates to a control apparatus for an internal combustion engine, a control method for an internal combustion engine, and a non-transitory computer-readable recording medium having program code stored thereon which, when executed by a computer, causes the computer to perform an internal combustion engine control method for performing a plurality of application programs.

2. Description of the Related Art

If cylinder-to-cylinder air-fuel ratio imbalance occurs in an internal-combustion engine, the conversion efficiency of a three-way catalyst that cleans up automobile exhaust emissions decreases and, therefore, pollutant emissions may be increased.

In addition, pollutant emissions are increased due to a misfire. Japanese Unexamined Patent Application Publication No. 3-189371 describes a technique for identifying a cylinder in which a misfire has occurred on the basis of the average of the values output from an air-fuel ratio sensor and the amplitude of the output.

SUMMARY OF THE INVENTION

According to one aspect of the present invention, a control apparatus for an internal-combustion engine includes an air-fuel ratio detector, an intake air amount detector, an atmospheric pressure detector, and a first diagnosis device. The air-fuel ratio detector is configured to detect an air-fuel ratio of the internal-combustion engine having a plurality of cylinders. The intake air amount detector is provided in an intake passage of the internal-combustion engine and is configured to detect an intake air amount. The atmospheric pressure detector is configured to detect an atmospheric pressure. The first diagnosis device is configured to diagnose whether cylinder-to-cylinder air-fuel ratio imbalance occurs. The first diagnosis device includes an exhaust flow rate calculator, a first filter, an first integrator, a corrector, and a first determination section. The exhaust flow rate calculator is configured to calculate an exhaust flow rate that reflects a volume flow amount of exhaust gas flowing through an exhaust passage of the internal-combustion engine by performing volume-correction of the intake air amount detected by the intake air amount detector based on at least the atmospheric pressure detected by the atmospheric pressure detector. The first filter is configured to filter a signal representing the air-fuel ratio detected by the air-fuel ratio detector using a first bandpass filter so that a 0.5th-order frequency component of engine speed of the internal-combustion engine is extracted from the signal. The first integrator is configured to accumulate a filtered signal filtered by the first filter for a predetermined first period of time to compute an first integration value. The corrector is configured to correct the first integration value in accordance with the exhaust flow rate calculated by the exhaust flow rate calculator to compute a corrected integration value each time the first integration value is computed by the first integrator. The first determination section is configured to determine that cylinder-to-cylinder air-fuel ratio imbalance occurs in the plurality of cylinders if the corrected first integration value is greater than a predetermined first threshold value after the predetermined first period of time has elapsed.

According to another aspect of the present invention, a control method for an internal-combustion engine includes detecting an air-fuel ratio of the internal-combustion engine having a plurality of cylinders. An intake air amount of the internal-combustion engine is detected. An atmospheric pressure is detected. It is diagnosed whether cylinder-to-cylinder air-fuel ratio imbalance occurs. An exhaust flow rate that reflects a volume flow amount of exhaust gas flowing through an exhaust passage of the internal-combustion engine is calculated by performing volume-correction of the intake air amount based on at least the atmospheric pressure. A signal representing the air-fuel ratio is filtered using a first bandpass filter so that a 0.5th-order frequency component of engine speed of the internal-combustion engine is extracted from the signal. A filtered signal filtered using the first bandpass filter is accumulated for a predetermined first period of time to compute an first integration value. The first integration value is corrected in accordance with the exhaust flow rate to compute a corrected first integration value each time the first integration value is computed. It is determined that cylinder-to-cylinder air-fuel ratio imbalance occurs in the plurality of cylinders if the corrected first integration value is greater than a predetermined first threshold value after the predetermined first period of time has elapsed.

According to further aspect of the present invention, a non-transitory computer-readable recording medium has program code stored thereon which, when executed by a computer, causes the computer to perform an internal combustion engine control method for performing a plurality of application programs. The internal combustion engine control method includes detecting an air-fuel ratio of the internal-combustion engine having a plurality of cylinders. An intake air amount of the internal-combustion engine is detected. An atmospheric pressure is detected. It is diagnosed whether cylinder-to-cylinder air-fuel ratio imbalance occurs. An exhaust flow rate that reflects a volume flow amount of exhaust gas flowing through an exhaust passage of the internal-combustion engine is calculated by performing volume-correction of the intake air amount based on at least the atmospheric pressure. A signal representing the air-fuel ratio is filtered using a first bandpass filter so that a 0.5th-order frequency component of engine speed of the internal-combustion engine is extracted from the signal. A filtered signal filtered using the first bandpass filter is accumulated for a predetermined first period of time to compute an first integration value. The first integration value is corrected in accordance with the exhaust flow rate to compute a corrected first integration value each time the first integration value is computed. It is determined that cylinder-to-cylinder air-fuel ratio imbalance occurs in the plurality of cylinders if the corrected first integration value is greater than a predetermined first threshold value after the predetermined first period of time has elapsed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A, 5B, and 5C illustrate the frequency spectrum of the detected equivalent ratio in a cylinder-to-cylinder air-fuel ratio balanced mode and a cylinder-to-cylinder air-fuel ratio imbalance mode of a V-six cylinder engine;

FIGS. 8A, 8B, and 8C illustrate correction maps based on the response characteristic of the air-fuel ratio sensor according to the embodiment of the present invention;

FIGS. 9A, 9B, and 9C illustrate examples of a filtered equivalent ratio, an integration value, and a resultant value according to the embodiment of the present invention;

FIG. 15 is a block diagram of a second diagnosis processing unit according to the embodiment of the present invention;

FIG. 16 illustrates a region in which second diagnosis as to whether a cylinder-to-cylinder air-fuel ratio imbalance mode occurs is available according to the embodiment of the present invention;

FIG. 17 illustrates an example of the target air-fuel ratio varying in predetermined cycles, which is set in a diagnosis mode according to the embodiment of the present invention;

FIGS. 25A and 25B are flowcharts of determination of diagnosis conditions in the first diagnosis;

FIG. 31 illustrates an example of the simulation result obtained when air-fuel ratio cylinder imbalance occurs in the first diagnosis according to the embodiment of the present invention.

DESCRIPTION OF THE EMBODIMENTS

Figure 1:
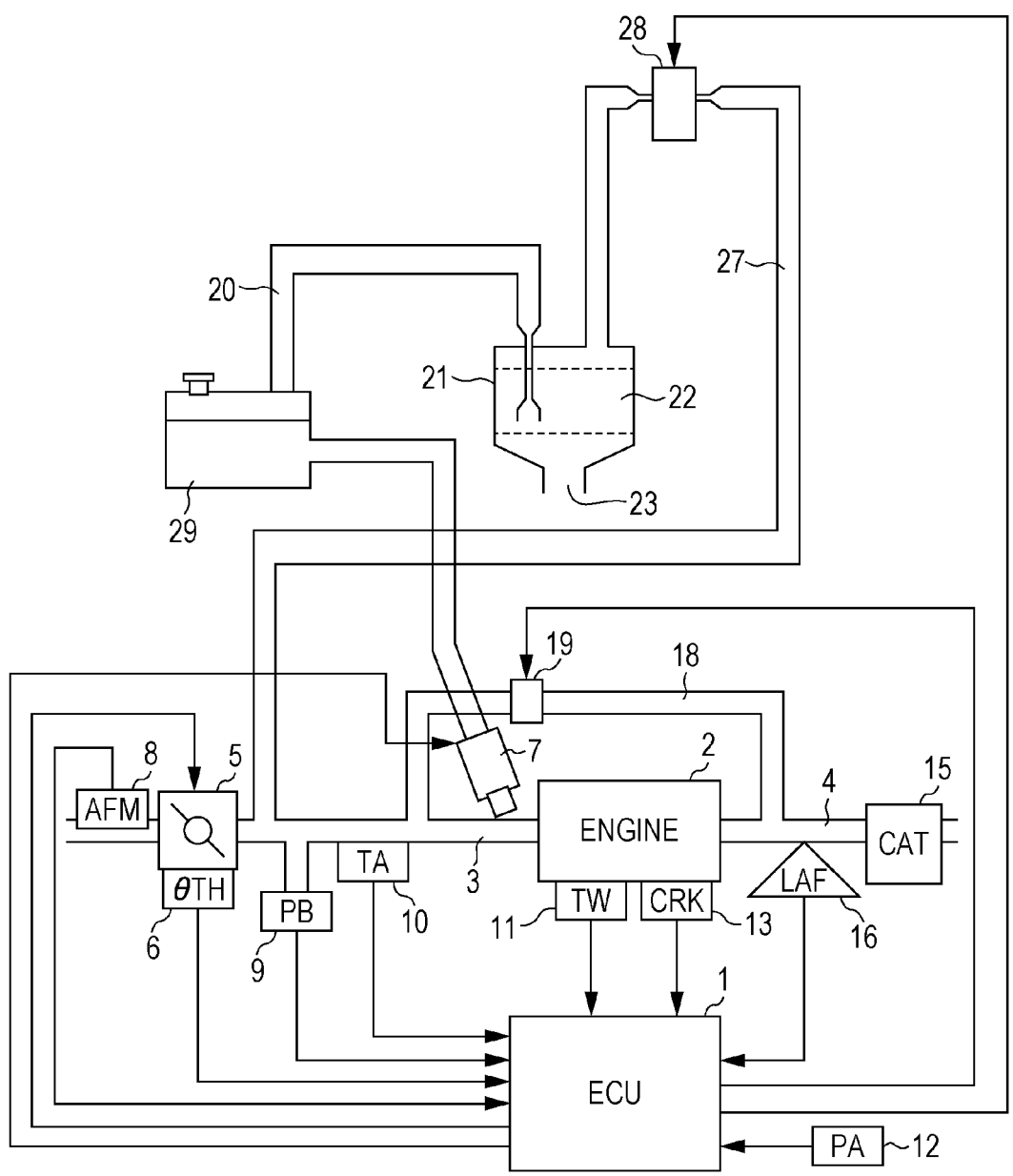
FIG. 1 is a block diagram of an internal-combustion engine and a control unit for controlling the internal-combustion engine according to an embodiment of the present invention.

The embodiments of the present invention are described below with reference to the accompanying drawings, wherein like reference numerals designate corresponding or identical elements throughout the various drawings. FIG. 1 is a block diagram of an internal-combustion engine and a control unit for controlling the internal-combustion engine according to an embodiment of the present invention.

An electronic control unit (ECU) 1 is formed from a computer including a central processing unit (CPU) and a memory. The memory can store a computer program used for performing a variety of control operations for a vehicle and data (including a map) required for executing the program. The ECU 1 receives signals from a variety of components of the vehicle and performs computation in accordance with the data and the program stored in the memory. Thereafter, the ECU 1 generates control signals for controlling the components of the vehicle.

An engine 2 includes a plurality of cylinders. The engine 2 has an intake passage 3 and an exhaust passage 4 connected thereto. The intake passage 3 includes a throttle valve 5. The opening angle of the throttle valve 5 is controlled using a control signal output from the ECU 1. By controlling the opening angle of the throttle valve 5, the air flow drawn into the engine 2 can be controlled. A throttle valve opening angle (θTH) sensor 6 for detecting the opening angle of the throttle valve is connected to the throttle valve 5. A detection value of the throttle valve opening angle (θTH) sensor 6 is output to the ECU 1.

A fuel injection valve 7 is disposed between the engine 2 and the throttle valve 5. The fuel injection valve 7 is located immediately upstream of an intake valve (not shown) of the engine 2 for each of the cylinders. The fuel injection valve 7 is connected to a fuel tank 29. The fuel injection valve 7 injects fuel supplied from the fuel tank 29. The timing of fuel injection and the injected fuel quantity are changed in accordance with the control signal output from the ECU 1.

An airflow meter (AFM) 8 for detecting the amount of air flowing through the intake passage 3 is disposed upstream of the throttle valve 5.

An intake manifold pressure (PB) sensor 9 is disposed downstream of the throttle valve 5. The intake manifold pressure sensor 9 detects a pressure (the absolute pressure) PB in the intake passage 3. An intake air temperature (TA) sensor 10 is disposed downstream of the intake manifold pressure sensor 9. The intake air temperature sensor 10 detects the temperature in the intake passage 3. These detection values are transmitted to the ECU 1. In addition, the engine 2 includes an engine water temperature sensor 11 for detecting an engine water temperature TW. The detection value of the engine water temperature sensor 11 is transmitted to the ECU 1. An atmospheric pressure sensor 12 for detecting an atmospheric pressure PA is disposed at a location outside the engine 2. The detection value of the atmospheric pressure sensor 12 is transmitted to the ECU 1.

A crank angle sensor 13 for detecting the rotation angle of a crank shaft of the engine 2 is connected to the ECU 1. The detection value of the crank angle sensor 13 is transmitted to the ECU 1. The crank angle sensor 13 generates a pulse (a CRK pulse) at every predetermined crank angle (e.g., 30°). Thus, the crank angle position of the crank shaft can be identified using the CRK pulse. The ECU 1 computes an engine speed NE of the engine 2 using the CRK pulses. In addition, the crank angle sensor 13 outputs a TDC signal to the ECU 1 when the crank angle corresponds to the position of the top dead center of a piston.

The exhaust passage 4 includes an exhaust emission control device (CAT) 15 formed using a variety of catalysts. The exhaust emission control device 15 cleans up exhaust gas output from each of the cylinders to the exhaust passage 4. Thus, the exhaust gas is discharged to the atmosphere.

An air-fuel ratio sensor (an LAF sensor) 16 for detecting the air-fuel ratio is disposed upstream of the exhaust emission control device 15. The air-fuel ratio sensor 16 linearly detects the air-fuel ratio in the range from a lean air-fuel mixture to a rich air-fuel mixture. Thereafter, the air-fuel ratio sensor 16 transmits the detected air-fuel ratio to the ECU 1. According to the present embodiment, a detected equivalent ratio KACT is detected from the output of the air-fuel ratio sensor 16. The detected equivalent ratio KACT serves as a signal indicating the air-fuel ratio. The detected equivalent ratio KACT is computed as "theoretical air-fuel ratio/air-fuel ratio". If the detected equivalent ratio KACT is less than 1, the air-fuel mixture is lean. However, if the detected equivalent ratio KACT is grater than 1, the air-fuel mixture is rich.

An EGR passage 18 is connected between the intake passage 3 and the exhaust passage 4. The exhaust gas recirculates from the exhaust passage 4 to the intake passage 3 via the EGR passage 18. Thus, the exhaust gas can be supplied to the cylinders. The recirculation ratio (the quantity of recirculated exhaust gas/the quantity of intake air) can be controlled using an EGR valve 19. The opening angle of the EGR valve 19 can be changed in accordance with a control signal output from the ECU 1.

The fuel tank 29 is connected to a canister 21 via a charge passage 20. The canister 21 incorporates an adsorption agent 22 that absorbs fuel gas evaporated in the fuel tank 29. In addition, the canister 21 includes a fresh-air intake port 23.

The canister 21 is connected downstream to the throttle valve 5 of the intake passage 3 via a purge passage 27. The purge passage 27 includes a purge control valve 28. The purge control valve 28 is duty-controlled in accordance with a control signal output from the ECU 1. The opening angle of the purge control valve 28 can be continuously controlled by changing the ratio of an open valve period of time (ON) to a closed valve period of time (OFF) (i.e., the duty ratio) indicated by the control signal (a duty signal). In this way, the purge control valve 28 controls the amount of evaporated fuel flowing towards the intake passage 3 through the purge passage 27.

In this way, a mixture of the fuel supplied from the fuel injection valve 7, the EGR gas supplied from the EGR passage 18, the evaporated fuel supplied from the purge passage 27, and the air supplied from the intake passage 3 is burned in a combustion chamber of the engine 2.

Note that although not shown, a variable valving mechanism capable of changing the amount of lift and the phase of the intake valve in each of the cylinders can be provided. The amount of lift and the phase may be changed continuously or in a stepwise manner. The amount of lift and the phase are controlled in accordance with a control signal output from the ECU 1.

The ECU 1 detects the operating mode of the engine 2 using the program and data (including the map) stored in the memory in accordance with the input signals received from the above-described various sensors. In addition, the ECU 1 generates the control signals for controlling the throttle valve 5, the fuel injection valve 7, the EGR valve 19, and the purge control valve 28.

The background of the technique for detecting cylinder-to-cylinder air-fuel ratio imbalance in a plurality of cylinders according to the present embodiment is described next.

Figure 2A:
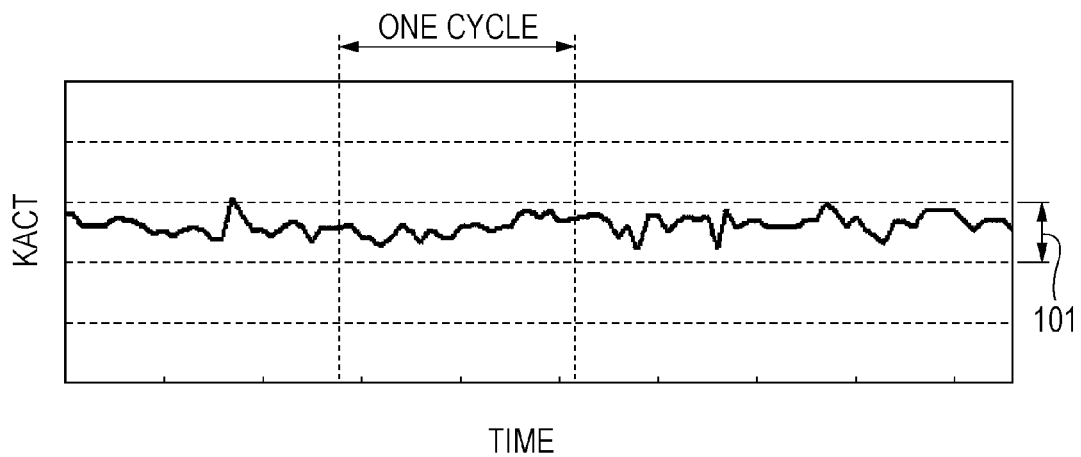
FIGS. 2A and 2B illustrate graphs indicating a detected equivalent ratio in an air-fuel ratio cylinder balanced mode and a cylinder-to-cylinder air-fuel ratio imbalance mode.
Figure 2B:
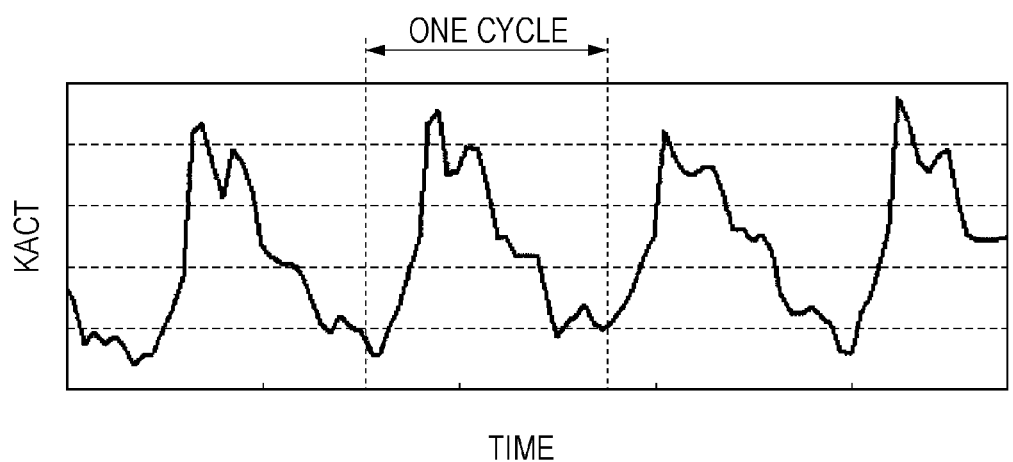

FIGS. 2A and 2B illustrate graphs indicating the air-fuel ratio detected by the air-fuel ratio sensor 16 in the form of the equivalent ratio KACT. As described above, if the detected equivalent ratio KACT is greater than 1, the air-fuel mixture is rich. However, if the detected equivalent ratio KACT is less than 1, the air-fuel mixture is lean. In FIGS. 2A and 2B, during one cycle, combustion in the first to fourth cylinders is sequentially initiated (more specifically, the first cylinder to the third cylinder to the forth cylinder to the second cylinder). According to the present embodiment, one cycle corresponds to a 720-degree crank angle period. Accordingly, combustion in one of the four cylinders is initiated at every 180-degree crank angle.

FIG. 2A illustrates the state in which the cylinder-to-cylinder air-fuel ratio is balanced in four cylinders (also referred to as a "balanced state"). The detected equivalent ratio KACT for each of the cylinders stays within a predetermined range indicated by an arrow 101 (a range of 0.01 in this example).

In contrast, in FIG. 2B, for the four cylinders, the air-fuel ratio varies from cylinder to cylinder (also referred to as an "imbalance mode"). As shown in FIG. 2B, during one cycle, the detected equivalent ratio KACT does not stay in the predetermined range for a certain period of time. In this example, the fuel is injected so that the air-fuel ratio for only the first cylinder is richer than that for the other cylinders by 20%. In this way, the imbalance mode indicates that the air-fuel ratio for at least one of the cylinders is unbalanced (shifted) from that of the other cylinders. For example, such imbalance is caused by malfunction of a unit for processing evaporated fuel gas (e.g., a unit including the fuel injection valve 7 and the purge control valve 28) or a unit for processing EGR gas (e.g., a unit including the EGR valve 19).

As can be seen from FIGS. 2A and 2B, in the balanced mode, a periodic variation in the detected equivalent ratio KACT negligibly occurs. However, in the imbalance mode, a periodic variation in the detected equivalent ratio KACT occurs. Accordingly, by extracting a varying frequency component (a variation component) from the detected equivalent ratio KACT, it can be determined whether an imbalance mode occurs.

The principal of a technique for detecting an imbalance mode is described below with reference to an in-line four-cylinder engine and a V-six cylinder engine.

Figure 3A:
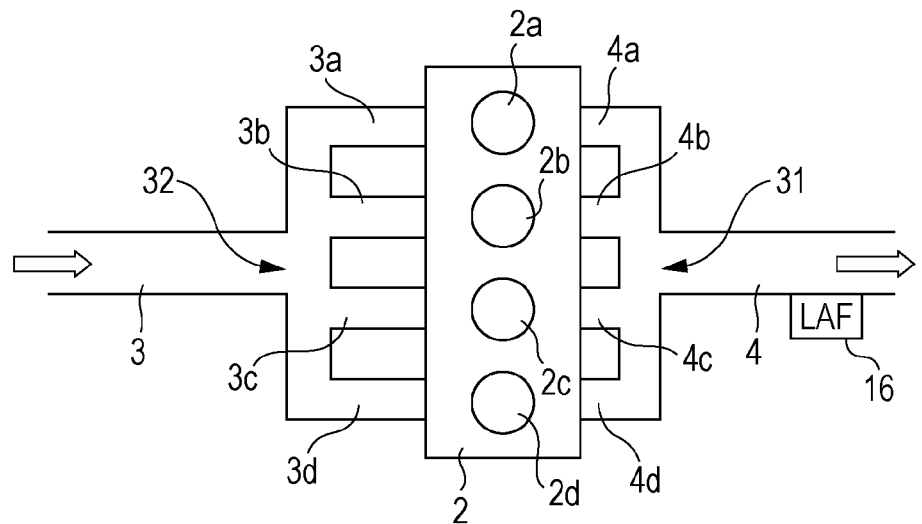
FIGS. 3A and 3B illustrate the layout of an air-fuel ratio sensor in an in-line four-cylinder engine and in a V-six cylinder engine according to the embodiment of the present invention.

FIG. 3A is a schematic illustration of arrangement of the air-fuel ratio sensor (the LAF sensor) 16 when the engine 2 shown in FIG. 1 is an in-line four-cylinder engine. This engine includes four cylinders 2a to 2d. Intake pipes 3a to 3d branch from a collector portion 32 of the intake passage 3. The intake pipes 3a and 3d are connected to the respective cylinders. Exhaust pipes 4a to 4d extending from the cylinders 2a to 2d, respectively, are connected to the exhaust passage 4 in a collector portion 31 of the exhaust passage 4. The air-fuel ratio sensor 16 is disposed in the exhaust passage 4.

Figure 3B:
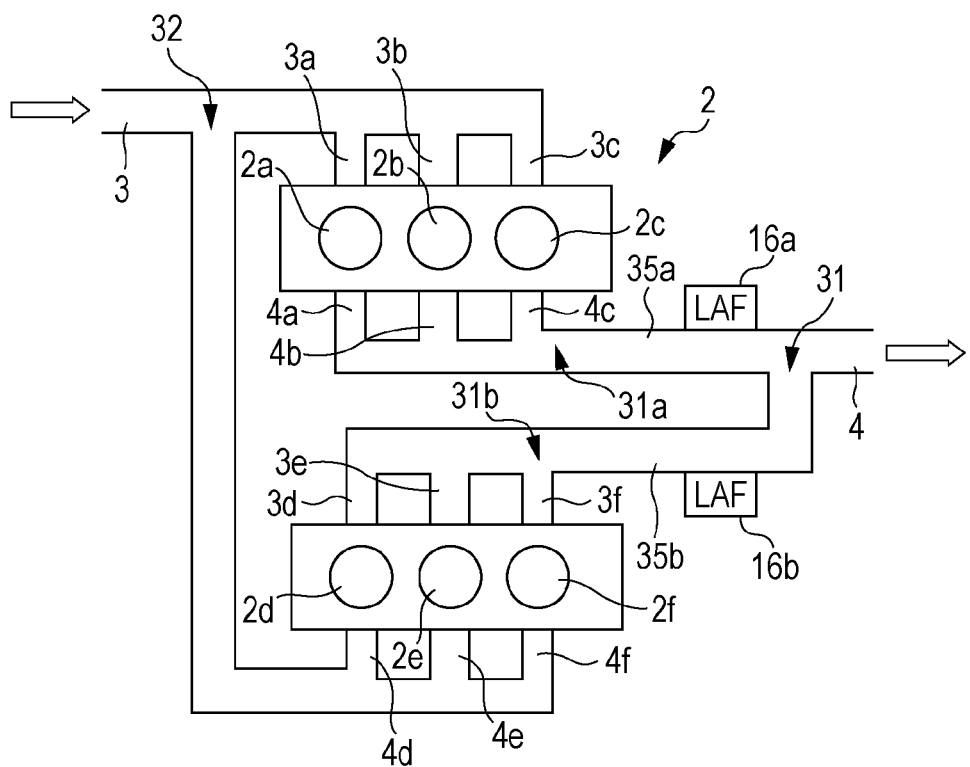

FIG. 3B is a schematic illustration of arrangement of the air-fuel ratio sensor (the LAF sensor) 16 when the engine 2 shown in FIG. 1 is a V-six cylinder engine. This engine includes three cylinders 2a to 2c on a first bank and three cylinders 2d to 2f on a second bank. In the first bank, the intake pipes 3a to 3c that branch from the collector portion 32 of the intake passage 3 are connected to the corresponding cylinders, and the exhaust pipes 4a to 4c extending from the corresponding cylinders are joined together in a collector portion 31a of an exhaust passage 35a. An air-fuel ratio sensor 16a is provided to the exhaust passage 35a. The second bank has a structure similar to that of the first bank.

Figure 4A:
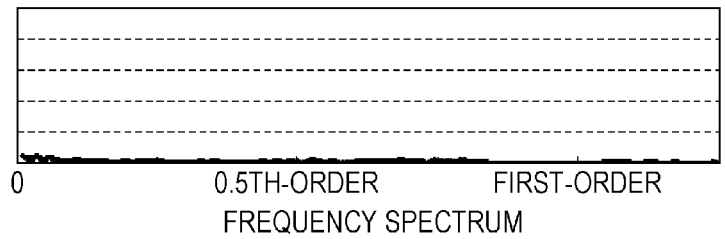
FIGS. 4A, 4B, 4C, and 4D illustrate the frequency spectrum of the detected equivalent ratio in a cylinder-to-cylinder air-fuel ratio balanced mode and a cylinder-to-cylinder air-fuel ratio imbalance mode of an in-line four-cylinder engine.
Figure 4B:
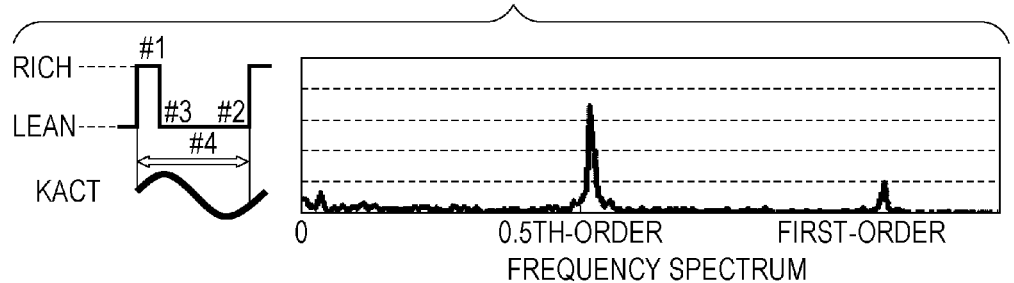
Figure 4C:
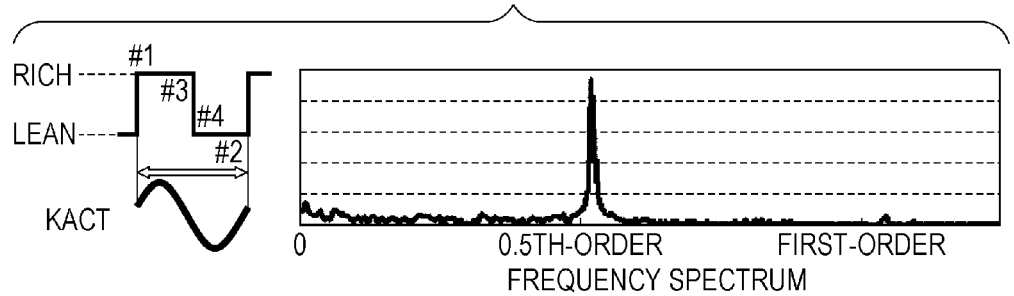

FIGS. 4A to 4D illustrate data for an in-line four-cylinder engine as shown in FIG. 3A. In this engine, fuel is injected into the cylinders during one cycle (one 720-degree crank angle period) in the following order: the first cylinder, the third cylinder, the fourth cylinder, and the second cylinder. FIG. 4A illustrates the frequency spectrum of the detected equivalent ratio KACT obtained when the air-fuel ratios are balanced cylinder to cylinder (in a balanced mode). The symbol "0.5-th order" on the abscissa represents the 0.5-th order frequency component of the engine speed, and the symbol "first-order" on the abscissa represents the first-order frequency component of the engine speed.

FIGS. 3B to 3D illustrate data when the air-fuel ratio cylinder imbalance (an imbalance mode) occurs. More specifically, FIG. 3B shows data in the case in which the air-fuel ratio is rich in only the first cylinder and the air-fuel ratio is lean in the other cylinders. FIG. 3C shows data in the case in which the air-fuel ratio is rich in two cylinders into which fuel is consecutively injected (the first and third cylinders in this case) and the air-fuel ratio is lean in the other cylinders. FIG. 3D shows data in the case in which the air-fuel ratio is rich in two cylinders into which fuel is nonconsecutively injected (the first and fourth cylinders in this case and, hereinafter, referred to as an "opposed two-cylinder") and the air-fuel ratio is lean in the other cylinders. In each of FIGS. 3B to 3D, signals indicating a rich state, a lean state, the detected equivalent ratio KACT, and the frequency spectrum of the detected equivalent ratio KACT are shown.

As can be seen from FIGS. 3A to 3D, if, as indicated by FIG. 3B, the air-fuel ratio for only one cylinder varies, the 0.5th-order frequency component of the engine speed is high. In contrast, if, as indicated by FIG. 3D, the air-fuel ratios in the opposed two-cylinder are unbalanced, the first-order frequency component of the engine speed is high.

When the engine speed is 1000 rpm, the first-order frequency is (1000/60) Hz. Accordingly, the cycle length is 60 millisecond (the period for the crank angle of 360 degrees=1/2 cycle). The 0.5th-order frequency is (1000/120) Hz. Accordingly, the cycle length is 120 milliseconds (the period for the crank angle of 720 degrees=1 cycle). When the engine speed is 3000 rpm, the first-order frequency corresponds to a cycle of 20 milliseconds (the period for the crank angle of 360 degrees). The 0.5th-order frequency corresponds to a cycle of 40 milliseconds (the period for the crank angle of 720 degrees). Therefore, in the cases illustrated in FIGS. 4B and 4C, the detected equivalent ratio KACT varies by one cycle. In contrast, in the cases illustrated in FIG. 4D, the detected equivalent ratio KACT varies by 1/2 cycle.

In this way, in the case of a in-line four-cylinder engine, by extracting the 0.5th-order frequency component and the first-order frequency component of the engine speed from the output of the air-fuel ratio sensor, the frequency component that varies due to cylinder-to-cylinder air-fuel ratio imbalance can be excellently extracted. Thus, an imbalance mode can be detected.

FIGS. 5A to 5C illustrate data for a V six-cylinder engine as shown in FIG. 3B. In this engine, fuel is injected into the cylinders during one cycle (one 720-degree crank angle period) in the following order: the first cylinder, the fourth cylinder, the second cylinder, the fifth cylinder, the third cylinder, and the sixth cylinder. As described above, in the case of a V engine, the air-fuel ratio sensor is provided for each of the banks. Accordingly, the waveform of the detected equivalent ratio KACT for the first bank including the first to third cylinders is shown in FIGS. 5A to 5C. Note that the same applies to the second bank.

Figure 4D:
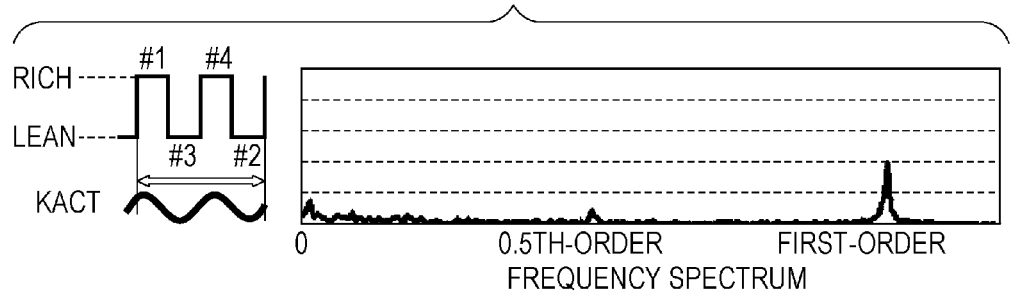

FIG. 5A illustrates the frequency spectrum of the detected equivalent ratio KACT when the air-fuel ratios are balanced cylinder to cylinder (in a balanced mode). However, FIGS. 5B and 5C illustrate data when cylinder-to-cylinder air-fuel ratio imbalance (an imbalance mode) occurs. More specifically, FIG. 5B illustrates a signal indicating a rich state or a lean state, the detected equivalent ratio KACT, and the frequency spectrum of the detected equivalent ratio KACT in the case in which the air-fuel ratio is rich in only the first cylinder and is lean in the other cylinders. FIG. 5C illustrates those in the case in which the air-fuel ratio is rich in two cylinders into which fuel is consecutively injected (the first and second cylinders in this case) and the air-fuel ratio is lean in the other cylinders. Since one bank includes three cylinders, the case of an opposed two-cylinder as shown in FIG. 4D does not occur. Therefore, by extracting only the 0.5th-order frequency component of the engine speed, cylinder-to-cylinder air-fuel ratio imbalance can be detected.

Figure 6:
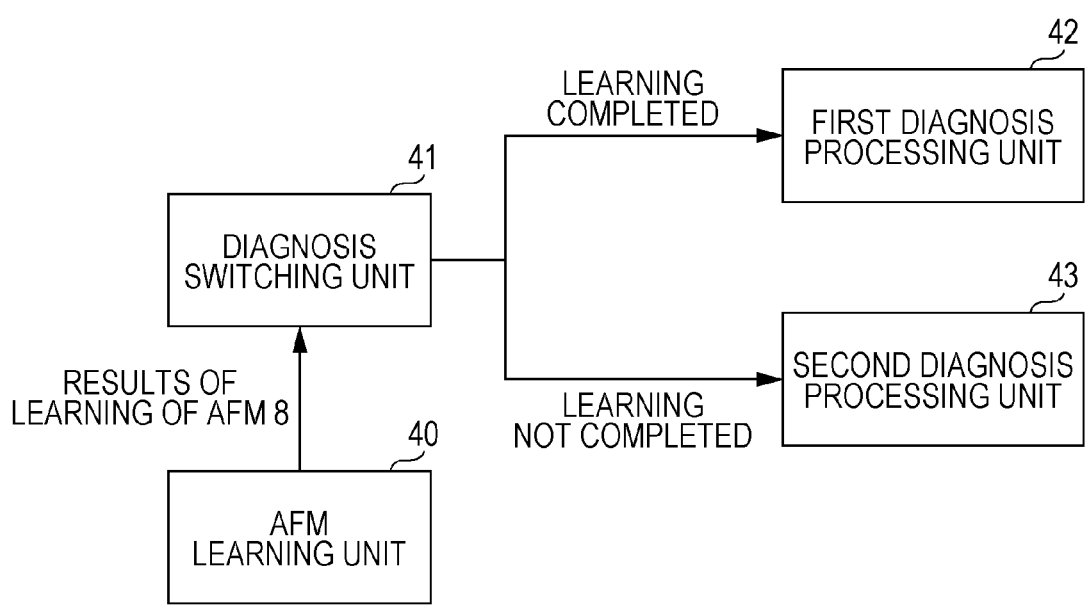
FIG. 6 is a block diagram of a control unit for determining whether the air-fuel ratio cylinder imbalance occurs according to the embodiment of the present invention.

FIG. 6 is a block diagram of a control device for diagnosing whether cylinder-to-cylinder air-fuel ratio imbalance occurs according to an embodiment of the present invention. The functional blocks can be realized in the ECU 1.

According to the present embodiment, two diagnosis routes are provided. These diagnosis routes are switched by determining whether learning of the outputs (the detection values) of the airflow meter (AFM) 8 performed by an AFM learning unit 40 is completed. Note that the AFM 8 is provided to measure the amount of intake air.

The output of the AFM 8 may be "sifted" due to aged deterioration or a deposited material. Accordingly, the AFM learning unit 40 performs learning of the detection values of the AFM 8. The learning is performed when predetermined learning conditions are satisfied. It is desirable that the learning be performed in a stable operating state.

Therefore, for example, the learning conditions can include the following items:
1) Idling operation,
2) AFM 8 functioning normally,
3) No secondary airflow caused by, for example, pumping braking,
4) Stoppage of purge (the purge control valve 28 is closed), and
5) Phase of the intake valve being at a predetermined position (e.g., the most retarded position) and the lift is zero if a variable valving mechanism is employed.

As indicated by the item 1), it is desirable that the engine be in idling operation. However, alternatively, the engine may be in a normal operation in which the engine speed is stable.

If the learning conditions are satisfied, the AFM learning unit 40 acquires a detection value Gaircyl of the AFM 8. For example, the memory of the ECU 1 prestores a map defining a reference intake air amount for an intake pipe pressure and an engine speed. The AFM learning unit 40 references the map and looks up a reference intake air amount corresponding to the current intake pipe pressure PB detected by the intake manifold pressure sensor 9 and an engine speed NE detected by the crank angle sensor 13. Thereafter, the AFM learning unit 40 computes a learning ratio (%) as follows:

$$\text{Learning Ratio (\%)} = \frac{\text{Detection value Gaircyl of } AFM8}{\text{Reference intake air amount}} \times 100 \quad (1)$$

As used herein, the term "reference intake air amount" refers to the amount of air that should be actually drawn into the engine 2. Accordingly, the above-described learning ratio indicates the level of shift of the detection value Gaircyl of the AFM 8 from the reference intake air amount.

Preferably, the reference intake air amount in equation (1) is the value that is density-corrected in accordance the intake-air temperature and the atmospheric pressure. This is because the air density may be changed due to a change in the intake-air temperature and the atmospheric pressure. The value of the reference intake air amount in the map is defined for a reference atmospheric pressure and a reference intake-air temperature. The air density is proportional to the pressure and is inversely proportional to the temperature. Accordingly, the density is corrected so that the reference intake air amount increases as the atmospheric pressure at the learning time becomes higher with respect to the reference atmospheric pressure and as the temperature of intake air at the learning time becomes lower with respect to the reference temperature of intake air.

The learning ratio computed in the above-described manner is used for correcting the detection value of the AFM 8 after learning is completed. That is, a value obtained by dividing the detection value of the AFM 8 by the learning ratio is used as the intake air amount Gaircyl detected by the AFM 8.

Note that the detection value of the AFM 8 is gradually decreased when the intake air amount is small. Accordingly, the detection value may be corrected using the above-described learning ratio only when the intake air amount is small. For example, only when the engine speed is lower than or equal to a predetermined value, such correction can be performed.

If, after the learning process is performed, the difference between 100% and the learning ratio (i.e., |100−the learning ratio (%)|) is less than or equal to a predetermined value (e.g., 10%), a diagnosis switching unit 41 determines that the learning process is completed. Thereafter, the diagnosis switching unit 41 starts the operation of a first diagnosis processing unit 42 that performs diagnosis using the intake air amount detected by the AFM 8 (the above-described detection value of the AFM 8 corrected using the learning ratio).

However, if the learning process has not been completed due to, for example, unsatisfied learning conditions, the AFM 8 may have an error in the detection value. Therefore, the diagnosis switching unit 41 starts the operation of a second diagnosis processing unit 43 that performs diagnosis without using the detection value of the AFM 8. In addition, if the leaning result |100−the learning ratio (%)| is greater than the above-described predetermined value, a shift of the detection value of the AFM 8 from the reference intake air amount is large. Accordingly, in such a case, the diagnosis switching unit 41 determines that the learning process has not been completed and starts the second diagnosis processing unit 43.

The first diagnosis processing unit 42 performs correction in accordance with the response characteristic of the air-fuel ratio sensor 16 and performs diagnosis (hereinafter referred to as "first diagnosis"). In this correction, the intake air amount detected by the AFM 8 and corrected using the learning ratio in the above-described manner is volume-corrected, and the exhaust flow that reflects the volume flow of air (exhaust air) passing through the exhaust passage 4 including the air-fuel ratio sensor 16 disposed therein is computed. Since this diagnosis uses the exhaust airflow, an accurate diagnosis can be performed even when a variation in the volume flow of the exhaust air that passes through the exhaust passage occurs due to a variation in the atmospheric pressure in a place where the vehicle is traveling.

Unlike the correction process performed by the first diagnosis processing unit 42, the second diagnosis processing unit 43 changes a target air-fuel ratio and compares a signal obtained by extracting the frequency component of the detected equivalent ratio KACT output from the air-fuel ratio sensor 16 with a signal obtained by extracting a frequency component of the target air-fuel ratio. In this way, the second diagnosis processing unit 43 performs a diagnosis (hereinafter referred to as a "second diagnosis"). In the second diagnosis, the detection value of the AFM 8 is not required. However, since the target air-fuel ratio needs to be changed, the computation load may be higher than that required for the first diagnosis. Accordingly, if learning of the detection values of the AFM 8 is completed, diagnosis using the first diagnosis processing unit 42 is performed. However, if learning of the detection values of the AFM 8 has not been completed, diagnosis using the second diagnosis processing unit 43 is performed.

As described above, by switching between the first diagnosis and the second diagnosis, the computation load can be reduced. In addition, even when the output of the AFM 8 is deteriorated, the diagnosis can be continuously and reliably performed.

The first diagnosis and the second diagnosis are described in more detail below.

Figure 7:
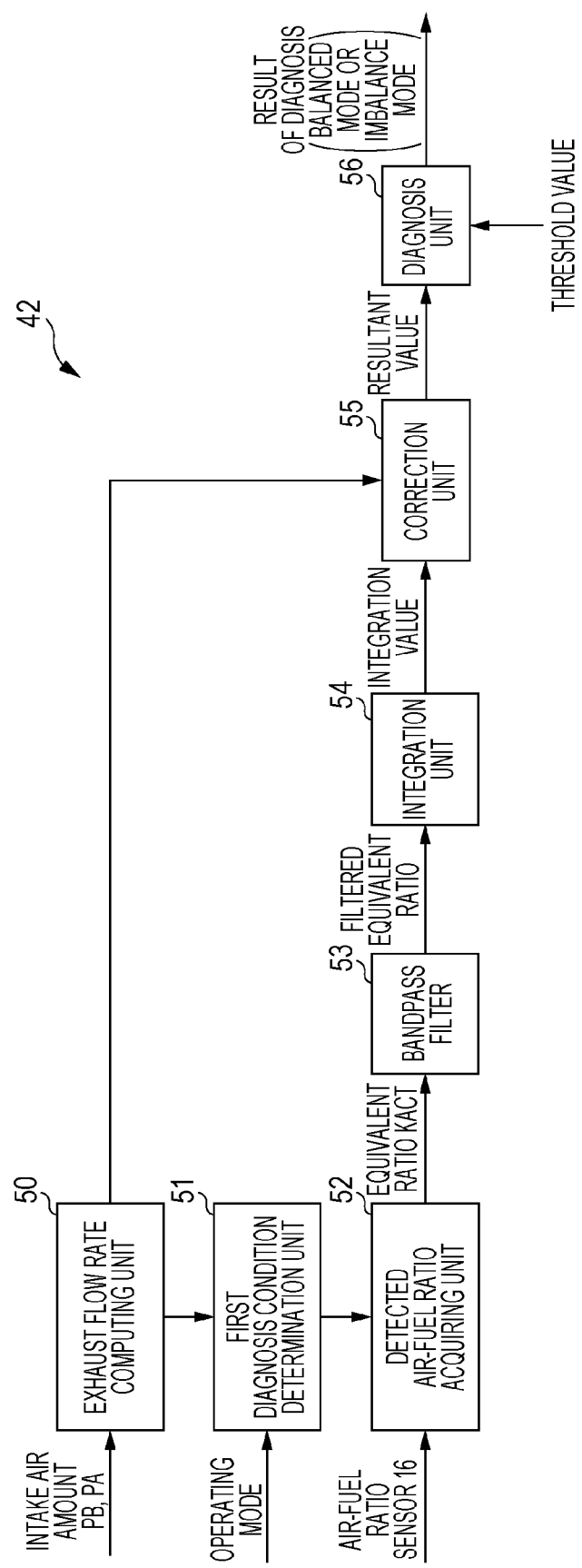
FIG. 7 is a block diagram of a first diagnosis processing unit according to the embodiment of the present invention.

FIG. 7 is a detailed functional block diagram of the first diagnosis processing unit 42 shown in FIG. 6. An exhaust flow rate computing unit 50 corrects, using a volume correction coefficient, the intake air amount (g/sec) detected by the AFM 8 and corrected using the learning ratio in the above-described manner. The volume correction coefficient represents the ratio of the current intake pipe pressure PB detected by the intake manifold pressure sensor 9 to an atmospheric pressure PA detected by the atmospheric pressure sensor 12. Thus, the exhaust flow rate computing unit 50 computes an exhaust flow rate $GAIR_{EX}$ (g/sec) that reflects the volume flow of the exhaust gas flowing through the exhaust passage. The exhaust flow rate $GAIR_{EX}$ is used as an index of the engine load. The reason why the exhaust flow rate $GAIR_{EX}$ is used and a particular technique for computing the exhaust flow rate $GAIR_{EX}$ are described below.

A first diagnosis condition determination unit 51 determines whether predetermined conditions for enabling a diagnosis process that determines whether an imbalance mode occurs are satisfied on the basis of the operating mode of the engine. The predetermined conditions include a condition that depends on the response characteristic of the air-fuel ratio sensor 16. The response characteristic is determined in accordance with the volume of the exhaust gas and the limitation of the responsiveness of the air-fuel ratio sensor 16. The volume of the exhaust gas and the limitation of the responsiveness of the air-fuel ratio sensor 16 are determined by the engine speed NE and the engine load. According to the present embodiment, the engine load is represented by the above-described exhaust flow rate $GAIR_{EX}$ computed by the exhaust flow rate computing unit 50.

FIG. 8A is a schematic illustration of the response characteristic of the air-fuel ratio sensor on the basis of the engine speed NE and the exhaust flow rate $GAIR_{EX}$. In this example, the engine speed within a predetermined range is divided into four sub-ranges NE1 to NE4. The engine speed becomes higher from the sub-range NE1 toward the sub-range NE4. In addition, the exhaust flow rate $GAIR_{EX}$ within a predetermined range is divided into four sub-ranges GEX1 to GEX4. The exhaust flow rate $GAIR_{EX}$ becomes higher from the sub-range GEX1 toward the sub-range GEX4. That is, the engine load becomes higher from the sub-range GEX1 toward the sub-range GEX4. Note that the number of sub-ranges here is only an example. A different number of sub-ranges may be set.

In a region in which the engine speed is low and the engine load is low (the exhaust flow rate is low), the volume of the exhaust gas is insufficient. Accordingly, the output of the air-fuel ratio sensor is low. In addition, in a region in which the engine speed is high, a cycle length is long. Therefore, it is difficult for the output of the air-fuel ratio sensor to track an actual variation in the air-fuel ratio (i.e., the region is a limit region of the responsiveness). Thus, the subsequent diagnosis may be difficult. Accordingly, if the operating mode of the engine stays in these regions, it is desirable to disable the diagnosis process. However, if the operating mode of the engine stays in a diagnosable region other than these regions, the diagnosis process is enabled.

The above-described conditions used for determining whether the diagnosis process is enabled or disabled can include another condition. An example of such a condition is described below.

If the above-described predetermined conditions are satisfied, the diagnosis mode starts. The diagnosis mode continues for a predetermined period of time. Referring back to FIG. 7, a detected air-fuel ratio acquiring unit 52 acquires the detected air-fuel ratio, that is, the equivalent ratio KACT by sampling the outputs of the air-fuel ratio sensor 16 in synchronization with the cycles of the filtering process performed by a bandpass filter 53 disposed downstream of the detected air-fuel ratio acquiring unit 52.

The bandpass filter 53 extracts a 0.5th-order frequency component of the engine speed from the acquired equivalent ratio KACT. According to the present embodiment, for example, the bandpass filter 53 is a recursive digital filter, and the output of the bandpass filter is expressed as follows:

$$y_n = a_0 x_n + a_1 x_{n-1} + a_2 x_{n-2} + \ldots + a_N x_{n-N} - (b_1 y_{n-1} + b_2 y_{n-2} + \ldots + b_M y_{n-M}) \quad (2)$$

where $a_0$ to $a_N$ and $b_1$ to $b_M$ denote filter coefficients determined through, for example, simulation, x denotes the detected equivalent ratio KACT of the air-fuel ratio sensor, y denotes the value of the output of the filter, and n denotes a control cycle. The length of each of the control cycles is equal to or less than the cycle of accumulation and correction subsequently performed.

A filtered equivalent ratio can be computed by filtering the detected equivalent ratio KACT using the bandpass filter 53. FIG. 9A illustrates an example of the filtered equivalent ratio. In this example, the cycle of filtering is equal to the cycle of accumulation subsequently performed.

Referring back to FIG. 7, an integration unit 54 accumulates the filtered equivalent ratio for each cycle corresponding to the above-described 0.5th-order frequency of the engine speed and computes the integration value. More specifically, the integration unit 54 receives the filtered equivalent ratio for each cycle and adds the filtered equivalent ratio to the previously computed integration value. Thus, the integration unit 54 computes the current integration value. In this way, as shown in FIG. 9B, the integration value increases in a stepwise fashion for each cycle. The initial value of the integration value can be set to zero.

A correction unit 55 corrects the integration value using a correction coefficient K corresponding to the current responsiveness of the air-fuel ratio sensor. As can be seen from FIG. 8B, in the diagnosable range, the responsiveness of the air-fuel ratio sensor (the level (the amplitude) of the output of the air-fuel ratio sensor) can be ranked to one of "maximum", "high", "medium", and "low". As the engine speed becomes higher, the cycle length decreases. Therefore, the responsiveness of the air-fuel ratio sensor deteriorates. In addition, as the exhaust flow rate decreases, that is, as the load becomes low, the volume of exhaust gas decreases. Accordingly, the responsiveness of the air-fuel ratio sensor deteriorates.

The integration value obtained after a predetermined period of time has elapsed varies in accordance with the varying responsiveness (the level of deterioration). As the level of deterioration of the responsiveness of the air-fuel ratio sensor increases, the integration value obtained after a predetermined period of time has elapsed decreases. In order to compensate for the variation in the level of deterioration of the responsiveness, the correction coefficient K is set as shown in FIG. 8C in accordance with the rank of the responsiveness shown in FIG. 8B. A correction coefficient K of "1.0" is set for the region in which the responsiveness is maximized. That is, in practice, no correction is performed. As the responsiveness decreases, a correction coefficient K of a higher value that is greater than 1 is assigned to the corresponding region and, therefore, correction is performed so that the integration value increases.

The correction coefficient K shown in FIG. 8C can be stored in the memory of the ECU 1 in the form of, for example, a map. The correction unit 55 looks up the value of a correction coefficient K corresponding to the current engine speed NE and the computed exhaust flow rate $GAIR_{EX}$ in the map. Thereafter, the correction unit 55 multiplies the computed integration value by the correction coefficient K for each of the cycles. In this way, correction is performed.

Note that the correction coefficient K may be acquired for each of the cycles. In such a case, it is desirable that the correction unit 55 look up the map to find a correction coefficient corresponding to the average vale of the engine speeds and the average value of the exhaust flow rates during the cycle. By using the average values, a more suitable correction coefficient K can be selected even when a variation in the operating mode of the engine occurs during the cycle.

The values of the correction coefficient K shown in FIG. 8C are only examples and are not limited thereto. In addition, in FIG. 8C, the correction coefficient is set for each of the regions determined by the exhaust flow rate $GAIR_{EX}$ and the engine speed NE. However, such regions are not necessarily required. For example, the exhaust flow rate $GAIR_{EX}$, the engine speed NE, and the correction coefficient K may be defined as a three-dimensional map.

Furthermore, as used herein, the term "deterioration" to be compensated for refers to deterioration having a level so that the deterioration is not considered as "malfunction". If the level of deterioration is higher than a predetermined level (e.g., if the difference between the output of the air-fuel ratio sensor 16 and the design value (e.g., the target air-fuel ratio) is greater than or equal to a predetermined value), it is determined that malfunction occurs. In this case, the compensation process is not performed (e.g., step S23 shown in FIG. 25B described below).

The value obtained after the correction is performed is referred to as a "resultant value". By correcting the integration value using a correction coefficient corresponding to the responsiveness of the air-fuel ratio sensor, the resultant value that does not depend on the responsiveness of the air-fuel ratio sensor can be obtained.

Referring back to FIG. 9C, an example of the resultant value is shown. In a period between points of time t0 to t3, the value 1.2 is acquired as the correction coefficient K, and the resultant value obtained by multiplying the integration value by the correction coefficient K for each cycle is shown. In a period after the point of time t3, the value 1.5 is acquired as the correction coefficient K, and the resultant value obtained by multiplying the integration value by the correction coefficient K for each cycle is shown. As shown in FIG. 9A, the value of the filtered equivalent ratio varies in accordance with a variation in the operating mode of the engine at a point of time t2 during a cycle starting from the point of time t1. The responsiveness of the air-fuel ratio sensor deteriorates more in a period after the point of time t2 than in a period between the points of time t0 to t2. Accordingly, in the next cycle starting from the point of time t3, the correction coefficient K having a higher value is used. In this way, as shown in FIG. 9C, an increment of the resultant value for each cycle in a region between t0 to t3 can be made equal to an increment of the resultant value for each cycle in a region after t3. Thus, the resultant value can be increased by a constant increment regardless of the responsiveness of the air-fuel ratio sensor.

As described above, the processing performed by the integration unit 54 and the correction unit 55 for each cycle is performed for a predetermined period of time of the diagnosis mode. For example, the predetermined period can be a period of time corresponding to 20 cycles (0.8 second when the engine speed is 3000 rpm).

Referring back to FIG. 7, a diagnosis unit 56 compares the resultant value obtained after the predetermined period of time has elapsed with a predetermined threshold value. As described above, since the resultant value is independent from the responsiveness of the air-fuel ratio sensor, the threshold value can be set to a constant value regardless of the responsiveness. If the resultant value is greater than the threshold value, a variation in the detected equivalent ratio KACT is large. Accordingly, it is determined that a cylinder-to-cylinder air-fuel ratio imbalance mode occurs. However, if the resultant value is less than or equal to the threshold value, a variation in the detected equivalent ratio KACT is small. Accordingly, it is determined that a cylinder-to-cylinder air-fuel ratio balanced mode occurs.

Figure 10:
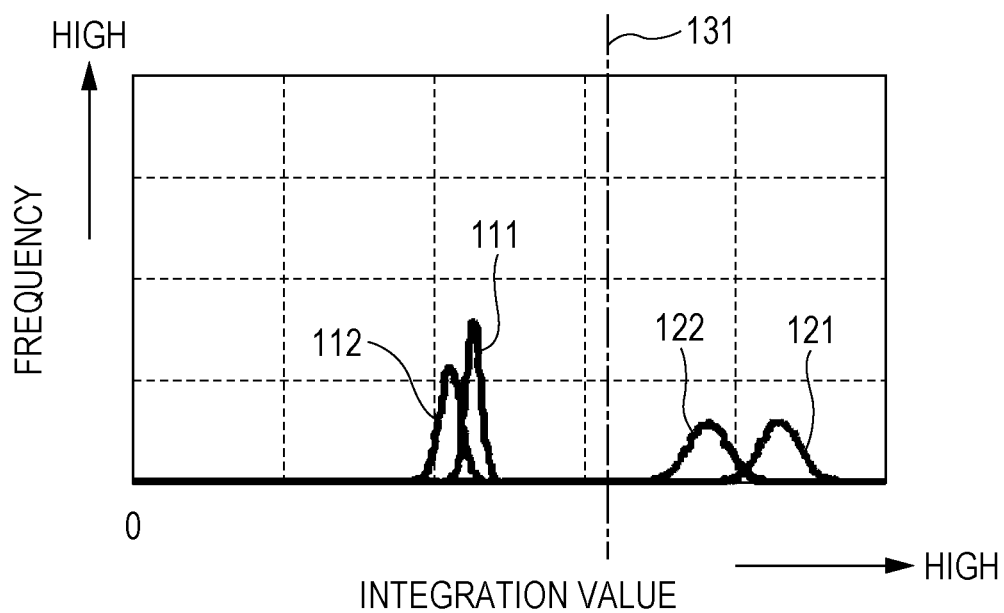
FIG. 10 illustrates a technique for setting a threshold value according to the embodiment of the present invention.

The setting of the threshold value is briefly described next. FIG. 10 illustrates the result of simulation of the distribution (the frequency) of the resultant value in the diagnosable region shown in FIG. 8A. This example shows values in the region GEX2 of the exhaust flow rate and an engine speed NE in the sub-range NE2 shown in FIGS. 8A to 8C. The reference symbols "111" and "112" indicate the case in which the air-fuel ratios in the first and second cylinders are richer than that in the other cylinders by 10%. Reference symbols "121" and "122" indicate the case in which the air-fuel ratios in the first and second cylinders are richer than that in the other cylinders by 20%.

As can be seen from FIG. 10, in the case in which it is determined that the air-fuel ratios are balanced cylinder to cylinder if a shift of the air-fuel ratio between one cylinder and another cylinder is less than or equal to 10% and it is determined that cylinder-to-cylinder air-fuel ratio imbalance occurs if a shift of the air-fuel ratio between one cylinder and another cylinder is greater than or equal to 20%, a threshold value indicated by a reference symbol "131" can be set between the resultant value indicated by the reference symbol "111" or "112" and the resultant value indicated by the reference symbol "121" or "122". In this way, a threshold value can be set in accordance with the percentage of the shift that determines the balanced mode or the imbalance mode.

Note that if the diagnosis unit 56 determines that an imbalance mode occurs, the diagnosis unit 56 can notify a user of information indicating that cylinder-to-cylinder air-fuel ratio imbalance occurs by, for example, illuminating a predetermined warning lamp.

Figure 11A:
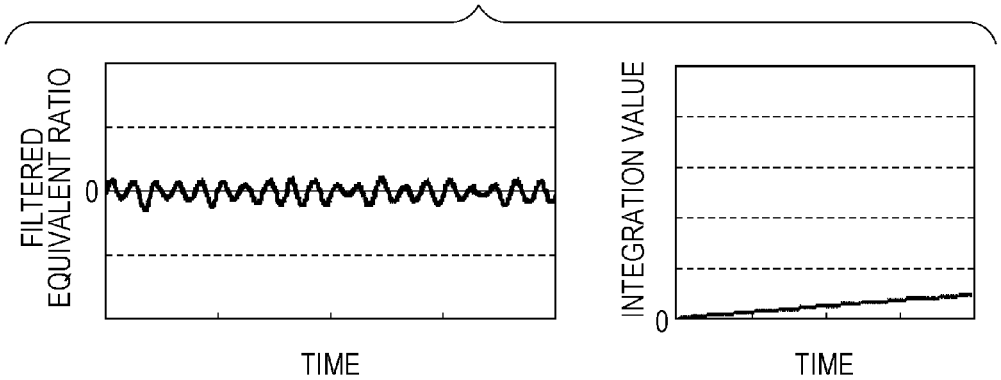
FIGS. 11A and 11B illustrate a filtered equivalent ratio and an integration value in a cylinder-to-cylinder air-fuel ratio balanced mode and in a cylinder-to-cylinder air-fuel ratio imbalance mode according to the embodiment of the present invention.
Figure 11B:
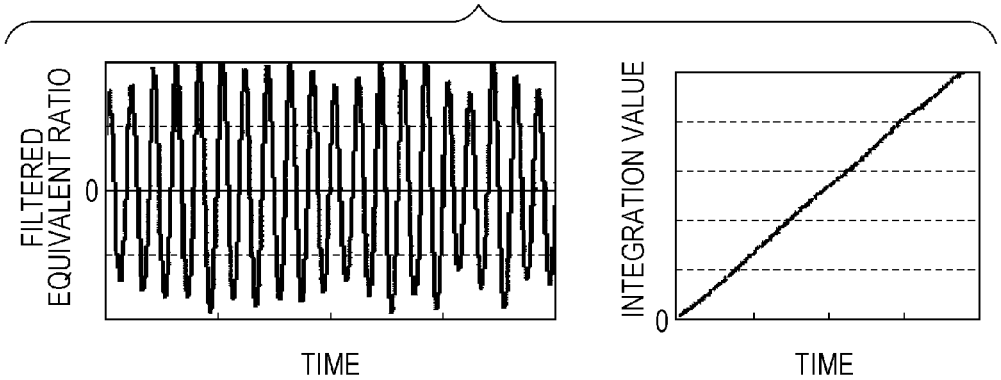

FIGS. 11A and 11B illustrate an example of the result of such simulation in order to show the effect of the filtering performed by the bandpass filter 53 and the accumulation performed by the integration unit 54 according to the present embodiment shown in FIG. 7. More specifically, FIG. 11A illustrates changes in the output of the bandpass filter 53 and the integration value in a balanced mode. In contrast, FIG. 11B illustrates changes in the output of the bandpass filter 53 and the integration value in an imbalance mode (in the example, correction is not performed by the correction unit 55). As can be seen from FIGS. 11A and 11B, a variation component of the detected equivalent ratio is accurately extracted by the bandpass filter 53. In addition, by accumulating the filtered equivalent ratio, the imbalance mode can be accurately differentiated from the balanced mode.

The reason why the exhaust flow rate $GAIR_{EX}$ is used and a particular technique for computing the exhaust flow rate $GAIR_{EX}$ are described next.

Even for the same intake air masses (g), if the volumes of the intake air differ from each other, the volume flows ($m^3$/ sec) (i.e., the flow velocities) of the exhaust gas (air) discharged into the exhaust passage differ from each other. This phenomenon is caused by a variation in the atmospheric pressure and/or a variation in the pressure in the intake pipe. For example, as the altitude of the traveling vehicle increases, the atmospheric pressure decreases. Accordingly, the volume flow on the exhaust side with respect to the same intake air mass increases. Accordingly, the flow velocity of the exhaust gas flowing through the air-fuel ratio sensor 16 increases. If the flow velocity of the exhaust gas increases, the responsiveness of the air-fuel ratio sensor 16 increases. As a result, the above-described integration value also increases.

Figure 12:
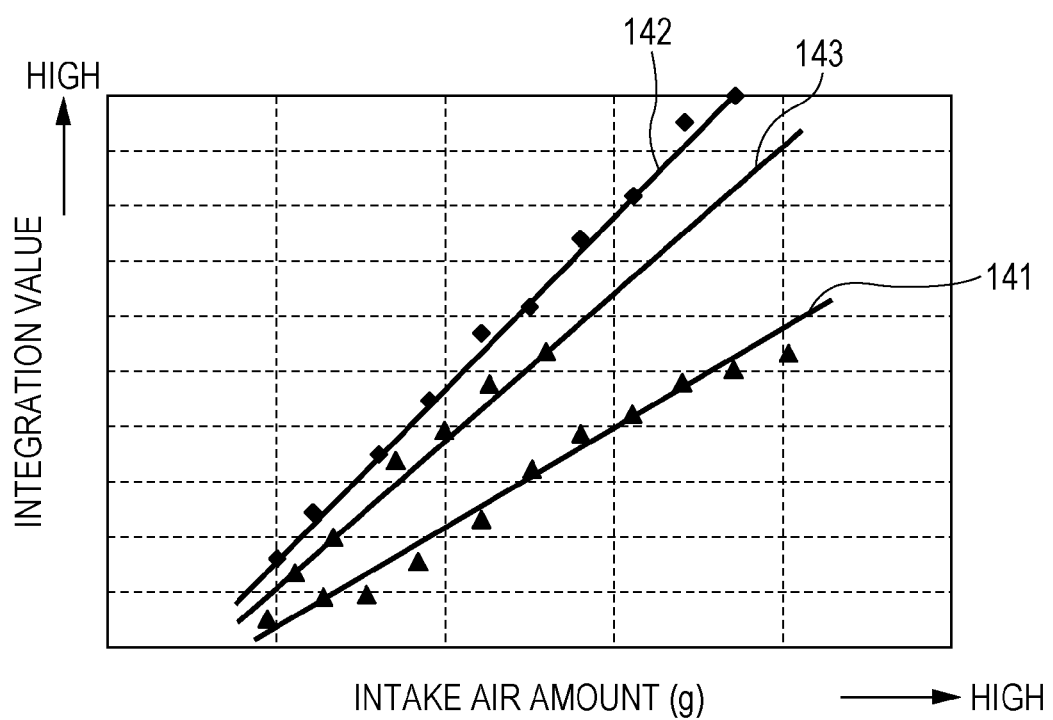
FIG. 12 illustrates an example of the resultant value corresponding to an intake air amount in low ground and high ground according to the embodiment of the present invention.

FIG. 12 illustrates an example of the results of simulation of an integration value corresponding to an intake air amount (g). Reference symbol "141" indicates the integration value obtained when the air-fuel ratio in one of the cylinders is richer than that in the other cylinders by 10% on low ground (the atmospheric pressure is substantially 760 mmHg). Reference symbol "142" indicates the integration value obtained when the air-fuel ratio in one of the cylinders is richer than that in the other cylinders by 20% on low ground. Reference symbol "143" indicates the integration value obtained when the air-fuel ratio in one of the cylinders is richer than that in the other cylinders by 10% on high ground (the atmospheric pressure is lower than 760 mmHg).

In such a case, in the situation indicated by the reference symbol "141" on low ground, it is determined that a balanced mode occurs. In contrast, in the situation indicated by the reference symbol "142", it is determined that an imbalance mode occurs. The integration value indicated by the reference symbol "143" on high ground and the integration value indicated by the reference symbol "141" on low ground are computed under the same condition indicating the same shift of the air-fuel ratio. Therefore, the integration value indicated by the reference symbol "143" should indicate a balanced mode. However, since the value is computed on high ground, the computed integration value is higher than that indicated by the reference symbol "141". Therefore, like the mode indicated by the reference symbol "142", the mode indicated by the reference symbol "143" may be erroneously diagnosed as an imbalance mode.

To prevent such mis-diagnosis, the concept of the exhaust flow rate is introduced. As described above, the exhaust flow rate reflects the level of the volume flow of the exhaust gas flowing through the exhaust passage. The exhaust flow rate can be computed by volume-correcting the intake air amount.

Let $P_I$ and $V_I$ be the pressure and the volume of air drawn into the intake pipe, respectively. In addition, let $P_E$ and $V_E$ be the pressure and the volume of air discharged into the exhaust pipe, respectively. Then, from Boyle's law stating that, at constant temperature, the volume of a gas having a constant mass is inversely proportional to the pressure of the gas, the following equation can be obtained:

$$P_I \cdot V_I = P_E \cdot V_E \quad (3)$$

$P_I$ in equation (3) corresponds to the current intake pipe pressure (the absolute pressure) PB, and $P_E$ corresponds to the atmospheric pressure PA. Accordingly, equation (3) can be re-written as follows:

$$V_E = (PB/PA) \times V_I \quad (4)$$

As indicated by equation (4), under a condition in which PB and PA are constant, as the intake air amount (mass) increases, the volume $V_I$ corresponding to the intake air amount increases. Accordingly, the volume $V_E$ on the exhaust side increases, and the flow velocity of the exhaust gas increases. However, even under a condition in which the intake air amount is constant, if one of PB and PA varies, the volume $V_E$ on the exhaust side varies. Thus, the flow velocity of the exhaust gas varies. As (PB/PA) increases, the volume $V_E$ on the exhaust side increases. Thus, the flow velocity increases, and the responsiveness of the air-fuel ratio sensor 16 increases. Accordingly, (PB/PA) is used as a volume correction coefficient, and the intake air amount is corrected using the volume correction coefficient, as described below. Let $GAIR_{IN}$ (g/sec) be the time-average of the intake air amount Gaircyl (g/TDC) detected by the AFM 8 and corrected using the learning ratio. Then, the exhaust flow rate $GAIR_{EX}$ is expressed as follows:

$$\text{Exhaust flow rate } GAIR_{EX}(\text{g/sec}) = (PB/PA) \times GAIR_{IN} (\text{g/sec}) \quad (5)$$

That is, the intake air amount $GAIR_{IN}$ is volume-corrected using equation (5). As a result, as (PB/PA) increases, the computed exhaust flow rate $GAIR_{EX}$ increases. Thus, the computed exhaust flow rate $GAIR_{EX}$ reflects the level of the volume flow (the flow velocity) of the exhaust gas. For example, as the atmospheric pressure PA decreases, that is, as the altitude of the vehicle becomes higher, the volume correction coefficient (PB/PA) increases and the exhaust flow rate $GAIR_{EX}$ increases. In addition, as the intake pipe pressure PB is increased by increasing the opening angle of the throttle (e.g., in order to obtain a desired intake air amount, the opening angle of the throttle on high ground may be increased more than that on low ground), the exhaust flow rate $GAIR_{EX}$ increases.

Note that the exhaust flow rate $GAIR_{EX}$ does not represent the mass flow rate of the actual exhaust gas that flows through the exhaust passage (the mass of the intake air and the mass of the exhaust gas are the same due to the law of conservation of mass). The exhaust flow rate $GAIR_{EX}$ is computed as an index indicating the level of the volume flow of the exhaust gas when a volume variation indicated by PB/PA occurs, that is, the level of the responsiveness of the air-fuel ratio sensor. Since the exhaust flow rate $GAIR_{EX}$ also reflects the level of the intake air amount, the exhaust flow rate $GAIR_{EX}$ can be used as an index indicating the engine load.

The range of the exhaust flow rate $GAIR_{EX}$ can be computed through simulation or experiments in advance. Such a range can be set for the sub-ranges GEX1 to GEX4 of the exhaust flow rate in each of the maps shown in FIGS. 8A to 8C, and the maps can be stored in, for example, the memory. The exhaust flow rate computing unit 50 computes $GAIR_{in}$ (g/sec) by time-averaging the intake air amount Gaircyl (g/TDC) detected by the AFM 8 and corrected using the learning ratio (note that the time length of a TDC duration can be computed from the engine speed NE). In addition, the exhaust flow rate computing unit 50 detects the intake pipe pressure PB and the atmospheric pressure PA from the detection values of the intake manifold pressure sensor 9 and the atmospheric pressure sensor 12 and computes the current exhaust flow rate $GAIR_{EX}$ using equation (5). The exhaust flow rate $GAIR_{EX}$ computed in this manner is used by the first diagnosis condition determination unit 51 and the integration unit 54, as described above.

In existing techniques, the engine load is represented by, for example, the intake air amount or the intake pipe pressure PB. However, in the first diagnosis, the above-described exhaust flow rate is used instead of the intake air amount or the intake pipe pressure PB. Thus, an increase or a decrease in the volume of the exhaust gas caused by a variation in the atmospheric pressure and the pressure in the intake pipe can be taken into account. Accordingly, the response characteristic of the air-fuel ratio sensor 16 can be more accurately detected. Consequently, the correction coefficient K can be more accurately computed. As a result, a more accurate resultant value can be obtained, and the accuracy of the diagnosis can be improved. In addition, mis-diagnosis that could occur on high ground illustrated in FIG. 12 can be prevented.

Figure 13A:
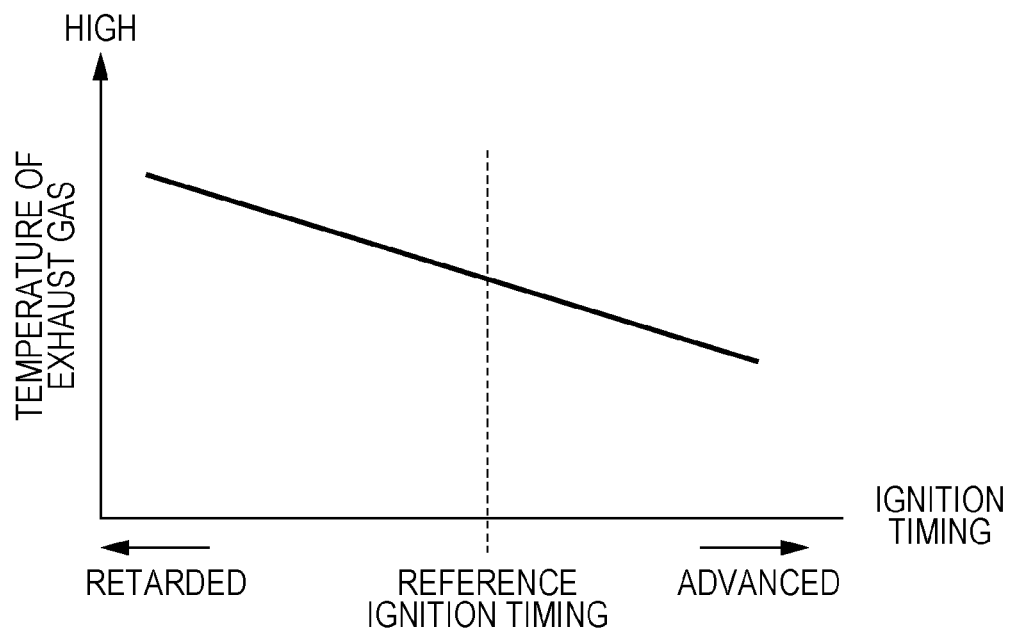
FIGS. 13A and 13B illustrate a temperature of exhaust gas corresponding to an ignition timing and a correction coefficient corresponding to an ignition timing according to the embodiment of the present invention.

The correction coefficient K is determined on the basis of the exhaust flow rate shown in FIG. 8C under the assumption that the ignition timing is maintained at a predetermined reference ignition timing. However, if the ignition timing is shifted from the reference ignition timing, the temperature of the exhaust gas varies. Therefore, the volume flow of the exhaust gas may be changed. More specifically, as shown in FIG. 13A, as the ignition timing is more retarded with respect to the reference ignition timing, the temperature of the exhaust gas increases. In contrast, as the ignition timing is more advanced with respect to the reference ignition timing, the temperature of the exhaust gas decreases. As the temperature of the exhaust gas increases, the actual volume flow of the exhaust gas increases. Accordingly, the responsiveness of the air-fuel ratio sensor 16 becomes high, and the integration value may be increased. As a result, the increment of the integration value for each cycle may vary in accordance with the ignition timing. In such a case, the resultant value cannot be changed by the same increment for each cycle, as illustrated in FIGS. 9A to 9C.

Figure 13B:
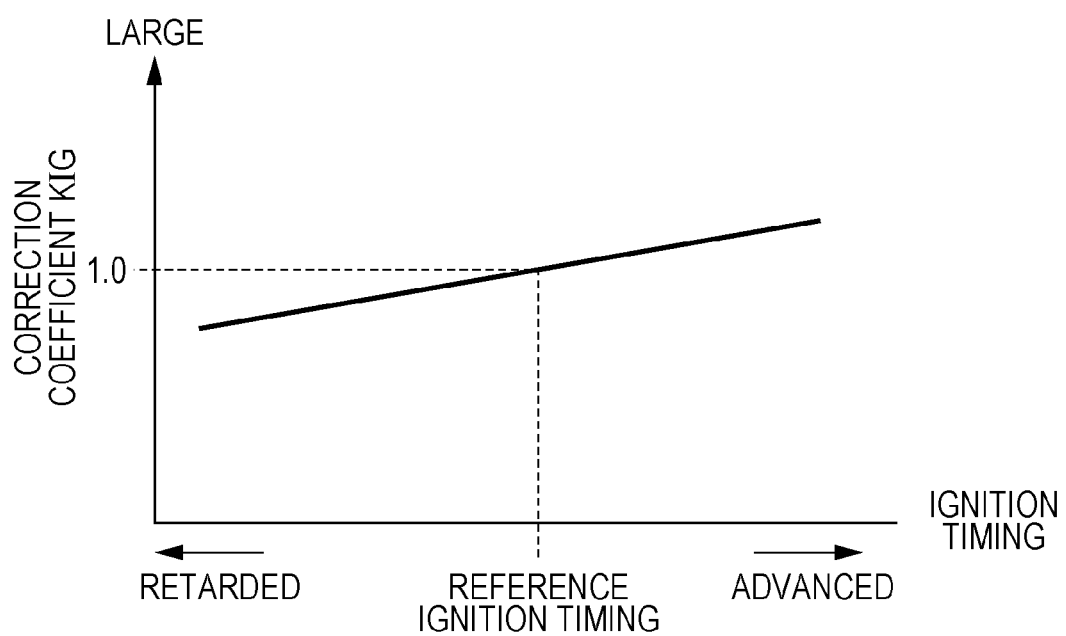

Therefore, it is desirable that the exhaust flow rate computing unit 50 correct the exhaust flow rate $GAIR_{EX}$ computed using equation (5) in accordance with the ignition timing. FIG. 13B illustrates an example of a map of a correction coefficient KIG corresponding to an ignition timing (the map can be stored in the memory of the ECU 1). The value of the correction coefficient KIG is 1 when the ignition timing is the reference ignition timing. The value of the correction coefficient KIG decreases from 1 as the ignition timing is more retarded from the reference ignition timing. In contrast, the value of the correction coefficient KIG increases from 1 as the ignition timing is more advanced from the reference ignition timing. The exhaust flow rate computing unit 50 looks up the value of the correction coefficient KIG corresponding to the current ignition timing in the map. Thereafter, the exhaust flow rate computing unit 50 corrects the exhaust flow rate by dividing the exhaust flow rate $GAIR_{EX}$ computed using equation (5) by the correction coefficient KIG (i.e., $GAIR_{EX} \times (1/KIG)$).

In this way, correction is performed so that the exhaust flow rate $GAIR_{EX}$ increases as the ignition timing is further retarded. Through such correction, the computing accuracy of the exhaust flow rate can be increased. Thus, the exhaust flow rate $GAIR_{EX}$ corrected in accordance with the ignition timing (hereinafter referred to as an "ignition timing-corrected exhaust flow rate $GAIR_{EX}$") is used by the correction unit 55, and an appropriate correction coefficient K corresponding to the ignition timing (refer to FIG. 8C) can be obtained. As the ignition timing is retarded, the integration value is corrected using a smaller correction coefficient K and, therefore, a smaller resultant value can be obtained. As a result, as shown in FIGS. 9A to 9C, the resultant value can be changed by a constant increment for each cycle.

In addition, the first diagnosis condition determination unit 51 can determine whether the above-described diagnosis process is enabled using the ignition timing-corrected exhaust flow rate $GAIR_{EX}$. By using the ignition timing-corrected exhaust flow rate $GAIR_{EX}$, the accuracy of the diagnosis can be increased.

Note that, in above description, the ignition timing correction is performed on the exhaust flow rate $GAIR_{EX}$. Alternatively, the ignition timing correction may be performed on the integration value computed by the integration unit 54 or the resultant value computed by the correction unit 55. Even in such a case, correction is performed so that the resultant value decrease as the ignition timing is further retarded. More specifically, when the integration value is corrected using the ignition timing, the correction unit 55 multiplies the integration value by the correction coefficient KIG obtained by referencing the ignition timing in a map shown in FIG. 13B. In this way, the ignition timing-correction can be performed. Thereafter, the correction unit 55 further corrects the ignition timing-corrected integration value by using the correction coefficient K corresponding to the exhaust flow rate $GAIR_{EX}$ computed using equation (5) in the map shown in FIG. 8C. Thus, the correction unit 55 computes the resultant value. In order to ignition timing-correct the resultant value, the correction unit 55 can multiply the resultant value by the correction coefficient KIG. Note that even when ignition timing-correction is performed on the integration value or the resultant value, it is desirable that the first diagnosis condition determination unit 51 determine whether the diagnosis conditions are satisfied using the ignition timing-corrected exhaust flow rate $GAIR_{EX}$.

Figure 14:
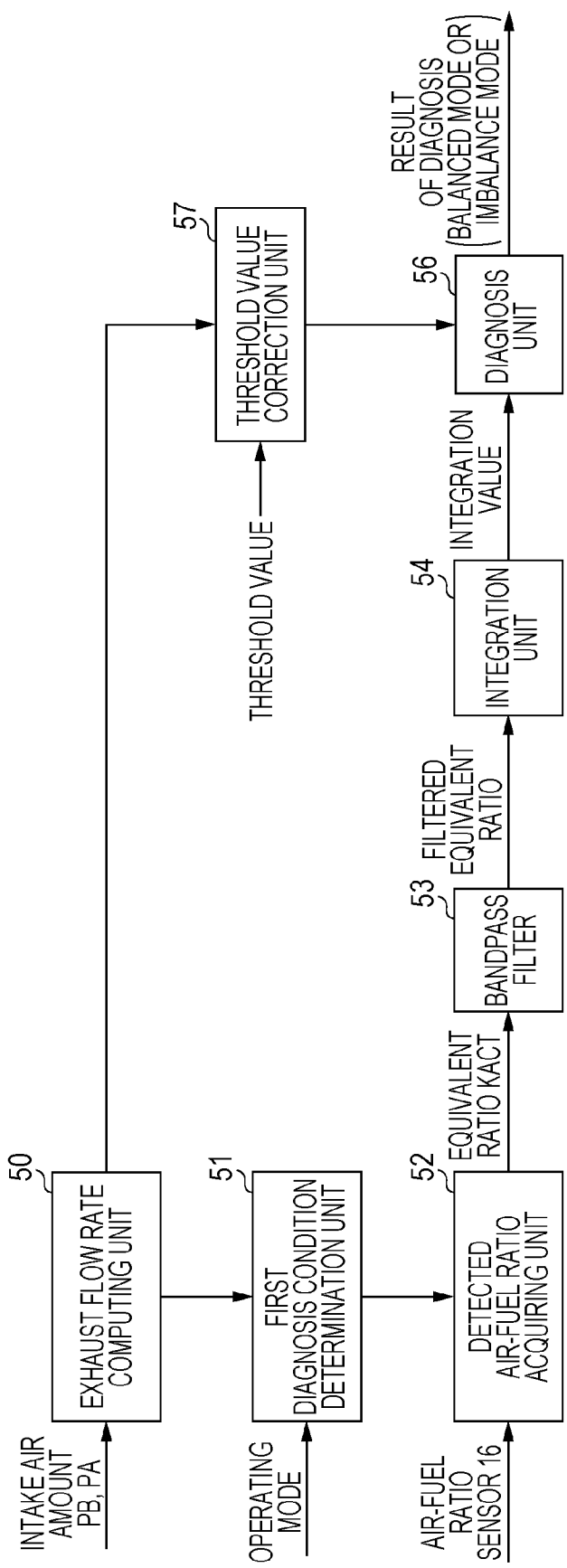
FIG. 14 is a block diagram of one of the alternatives to the first diagnosis processing unit according to the embodiment of the present invention.

While the embodiment illustrated in FIG. 7 has been described with reference to correction in which the integration value is multiplied by the correction coefficient K, the threshold value may be alternatively corrected. In such a case, as shown in FIG. 14, a threshold value correction unit 57 for correcting the threshold value is provided. The threshold value correction unit 57 obtains the correction coefficient K corresponding to the engine speed NE and the exhaust flow rate $GAIR_{EX}$ shown in FIG. 8C. Thereafter, the threshold value correction unit 57 corrects the above-described predetermined threshold value by dividing the threshold value by the correction coefficient K. The integration unit 54 accumulates the filtered equivalent ratio output from the bandpass filter 53 for each cycle during a predetermined period of time of the diagnosis mode. After the predetermined period of time of the diagnosis mode has elapsed, the diagnosis unit 56 compares the integration value with the corrected threshold value.

Note that correction of the threshold value may be performed by the threshold value correction unit 57 for each of the cycles. However, according to the present embodiment, since the integration value is compared with the threshold value after the predetermined period of time of the diagnosis mode has elapsed, correction may be performed for only a cycle in which the integration value is finally computed during the predetermined period of time.

If the integration value is greater than the corrected threshold value, a variation in the detected equivalent ratio KACT is large. Therefore, it is determined that a cylinder-to-cylinder air-fuel ratio imbalance mode occurs. However, if the integration value is less than or equal to the corrected threshold value, a variation in the detected equivalent ratio KACT is small. Therefore, it is determined that a cylinder-to-cylinder air-fuel ratio balanced mode occurs.

Note that the above-described ignition timing correction is performed on one of the exhaust flow rate, the integration value, the resultant value. However, the ignition timing correction may be alternatively performed on the threshold value. In such a case, by dividing the threshold value by the correction coefficient KIG corresponding to the current ignition timing in a map shown in FIG. 13B, the threshold value can be corrected. That is, the threshold value is divided by each of the above-described correction coefficient K and the above-described correction coefficient KIG. In this way, correction is performed so that the threshold value increases as the ignition timing is further retarded.

FIG. 15 is a detailed block diagram of the second diagnosis processing unit 43 shown in FIG. 6.

Like the first diagnosis condition determination unit 51, a second diagnosis condition determination unit 61 determines whether predetermined conditions for enabling a diagnosis process for determining whether an imbalance mode occurs are satisfied on the basis of the operating mode of the engine. The predetermined conditions differ from the predetermined conditions used by the first diagnosis condition determination unit 51 in terms of an operating parameter indicating the engine load. The first diagnosis condition determination unit 51 uses the exhaust flow rate $GAIR_{EX}$ as an operating parameter indicating the engine load. However, since the second diagnosis is performed when learning of the detection values of the AFM 8 has not yet been completed, the second diagnosis condition determination unit 61 uses the intake pipe pressure PB detected by the intake manifold pressure sensor 9 instead of the exhaust flow rate.

Accordingly, for example, the intake pipe pressure PB having a predetermined range can be divided into four sub-ranges, and the sub-ranges GEX1 to GEX4 shown on the abscissa of the map in FIG. 8A can be changed to PB1 to PB4, respectively. The changed map is illustrated in FIG. 16. As can be seen from FIG. 16, the intake manifold pressure increases from PB1 towards PB4. That is, the load increases from PB1 towards PB4. The second diagnosis condition determination unit 61 determines whether the operating mode of the engine stays within a diagnosable region of the map on the basis of the intake pipe pressure PB detected by the intake manifold pressure sensor 9 and the engine speed NE detected by the crank angle sensor 13. As in the first diagnosis condition determination unit 51, the above-described predetermined conditions used by the second diagnosis condition determination unit 61 can include another condition.

If the predetermined conditions are satisfied, the diagnosis mode starts. The diagnosis mode continues for a predetermined period of time. Like the first diagnosis, the predetermined period of time can be set in advance.

When the diagnosis mode starts, a target air-fuel ratio setting unit 62 stops normal air-fuel ratio feedback control for feedback-controlling the target air-fuel ratio having a predetermined value (ideally, the theoretical air-fuel ratio) using the air-fuel ratio detected by the air-fuel ratio sensor 16. Thereafter, as shown in FIG. 17, the target air-fuel ratio setting unit 62 sets the target air-fuel ratio to a value in the form of a periodic wave in which the value varies above and below a predetermined air-fuel ratio at a predetermined frequency fa, that is, in predetermined cycles Ta. Here, the predetermined frequency fa has a value different from the value of the above-described 0.5th-order and first-order frequencies. More preferably, the predetermined frequency fa is set so as to be lower than the 0.5th-order frequency and so as to be a frequency that is not generated from a variation in the opening angle of a throttle valve (a variation in the load) (e.g., 4 to 8 Hz).

According to the present embodiment, the frequency fa is set to 4 Hz (the cycle Ta is 250 msec long). The target air-fuel ratio is set as a sine wave that varies above and below an air-fuel ratio that is slightly richer than the theoretical air-fuel ratio (14.7). In this way, even when, as described above, the target air-fuel ratio is varied in the diagnosis mode, emission of NOx can be reduced.

Note that the frequency and the waveform of the periodic wave of the air-fuel ratio are not limited thereto. For example, another type of periodic wave, such as square wave or sawtooth wave, having a different frequency may be used as the target air-fuel ratio. The reason why the target air-fuel ratio is set in the form of a periodic wave is because the responsiveness of the air-fuel ratio sensor needs to be compensated for. The reason is described in more detail below.

The target air-fuel ratio set in this manner is sampled through the air-fuel ratio feedback control performed at a predetermined control cycle rate for a predetermined period of time during which the diagnosis mode continues (in FIG. 17, the target air-fuel ratio is sampled in the current control cycle k and the next control cycle (k+1)). The amount of fuel is computed so that the air-fuel ratio detected by the air-fuel ratio sensor 16 converges onto the sampled value of the target air-fuel ratio, and the computed amount of fuel is sprayed from the fuel injection valve 7. As a result, an air-fuel ratio is detected by the air-fuel ratio sensor 16. The detected air-fuel ratio varies in the predetermined cycles Ta in synchronization with a variation in the target air-fuel ratio.

Referring back to FIG. 15, a detected air-fuel ratio acquiring unit 63 samples the output of the air-fuel ratio sensor 16 in synchronization with the cycles of the filtering process performed by a first bandpass filter 64 and a second bandpass filter 66 disposed downstream of the detected air-fuel ratio acquiring unit 63. Thus, the detected air-fuel ratio acquiring unit 63 acquires the detected air-fuel ratio, that is, the detected equivalent ratio KACT.

The first bandpass filter 64 has a configuration similar to that of the above-described bandpass filter 53 used in the first diagnosis. The first bandpass filter 64 extracts the 0.5th-order frequency component of the engine speed from the acquired detected equivalent ratio KACT. In addition, the output of the first bandpass filter 64 is expressed using an equation that is the same as the above-described equation. The detected equivalent ratio KACT is filtered by the first bandpass filter 64, and a first filtered equivalent ratio is computed.

A first integration unit 65 has a configuration similar to that of the above-described integration unit 54 used in the first diagnosis. The first integration unit 65 accumulates the first filtered equivalent ratio for each of the cycles corresponding to the 0.5th-order frequency of the engine speed and computes a first integration value. This integration process is performed by the first integration unit 65 for each of the cycles within a predetermined period of time in which the above-described diagnosis mode continues.

In this second diagnosis, the correction unit 55 used in the first diagnosis is replaced with the second bandpass filter 66, a second integration unit 67, and a normalization unit 71.

The second bandpass filter 66 extracts, from the detected equivalent ratio KACT, a component of the predetermined frequency fa corresponding to the predetermined cycles Ta in which the target air-fuel ratio varies (hereinafter also referred to as a "target air-fuel ratio variation frequency component") and set by the target air-fuel ratio setting unit 62. As described above, in the diagnosis mode, the target air-fuel ratio is set in the form of a periodic wave that varies in predetermined cycles, that is, at a predetermined frequency. According to the present embodiment, the periodic wave is a sine wave having a frequency of 4 Hz. Accordingly, the second bandpass filter 66 extracts a frequency component of 4 Hz from the detected equivalent ratio KACT. The detected equivalent ratio KACT is filtered using the second bandpass filter 66. Thus, a second filtered equivalent ratio is computed. The second integration unit 67 accumulates the second filtered equivalent ratio and computes a second integration value.

The second bandpass filter 66 and the second integration unit 67 perform the processing in synchronization with the processing performed by the first bandpass filter 64 and the first integration unit 65. That is, the input to the first and second bandpass filters is the equivalent ratio KACT detected at the same time and acquired by the detected air-fuel ratio acquiring unit 63. The first and second integration processes are performed at the same time, that is, for each of the cycles corresponding to the 0.5th-order frequency. Like the first integration process, the second integration process is performed for the above-described predetermined period of time.

The normalization unit 71 normalizes the first integration value finally computed by the first integration unit 65 obtained after the predetermined period of time of the diagnosis mode has elapsed using the second integration value finally computed by the second integration unit 67. In this way, the normalization unit 71 computes the resultant value. More specifically, the resultant value is computed as follows:

resultant value=first integration value computed after the predetermined period of time has elapsed/ second integration value computed after the predetermined period of time has elapsed (6)

A diagnosis unit 72 compares the resultant value with a predetermined threshold value. If the resultant value is greater than the threshold value, a variation in the detected equivalent ratio KACT is large. Thus, it is determined that a cylinder-to-cylinder air-fuel ratio imbalance mode occurs. However, if the resultant value is less than or equal to the threshold value, a variation in the detected equivalent ratio KACT is small. Thus, it is determined that a cylinder-to-cylinder air-fuel ratio balanced mode occurs. In addition, as in the case of the first diagnosis, if it is determined that a cylinder-to-cylinder air-fuel ratio imbalance mode occurs, a predetermined warning lamp, for example, may be illuminated.

Figure 18A:
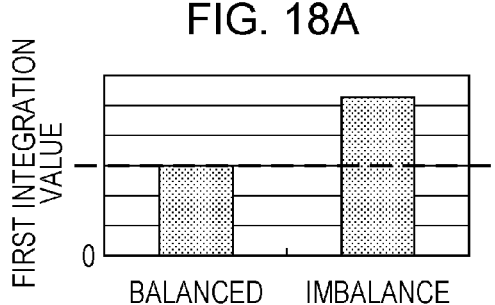
FIGS. 18A, 18B, and 18C are schematic illustrations of the first integration value, the second integration value, and the resultant value obtained when the responsiveness of the air-fuel ratio sensor is excellent in the second diagnosis.
Figure 18D:
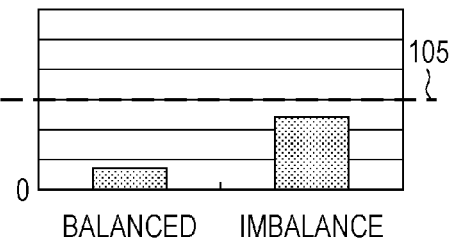
FIGS. 18D, 18E, and 18F are schematic illustrations of the first integration value, the second integration value, and the resultant value obtained when the responsiveness of the air-fuel ratio sensor is deteriorated in the second diagnosis according to the embodiment of the present invention.

FIGS. 18A, 18B, and 18C and FIGS. 18D, 18E, and 18F illustrate an example of the results of the second diagnosis. FIG. 18A shows a bar graph of examples of the first integration values obtained after a predetermined period of time has elapsed in the cylinder-to-cylinder air-fuel ratio balanced and imbalance modes when the responsiveness of the air-fuel ratio sensor is excellent (a reference case in which the value substantially the same as the actual air-fuel ratio is detected). FIG. 18D shows a bar graph of examples of the first integration values obtained after the predetermined period of time has elapsed in the cylinder-to-cylinder air-fuel ratio balanced and imbalance modes when the responsiveness of the air-fuel ratio sensor is deteriorated, as compared with the case in FIG. 18A. Here, it is supposed that the reason why the imbalance mode is caused is the same for the cases shown in FIGS. 18A and 18D.

As the responsiveness is further deteriorated, the output of the air-fuel ratio sensor 16 decreases. Accordingly, the first integration value shown in FIG. 18D is smaller than that shown in FIG. 18A. At that time, if it is determined that an imbalance mode occurs when a predetermined threshold value indicated by a reference symbol "105" is set and the first integration value is greater than the threshold value and if it is determined that a balanced mode occurs when the first integration value is less than or equal to the threshold value, a correct result of determination can be obtained in the case shown in FIG. 18A. However, in the case shown in FIG. 18D, it is determined that an imbalance mode occurs for both of the first integration values. Thus, a wrong result of determination is obtained.

Figure 18B:
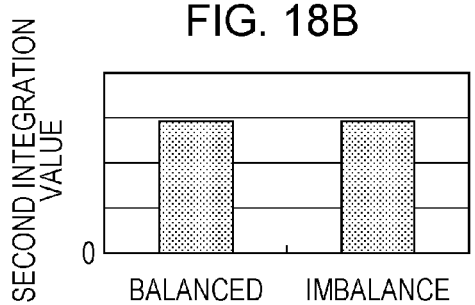
Figure 18E:
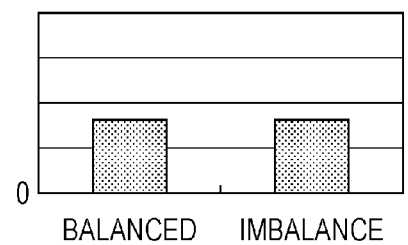
Figure 18C:
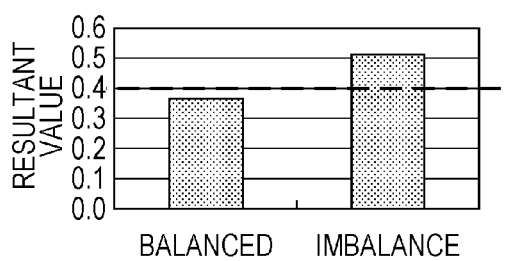
Figure 18F:
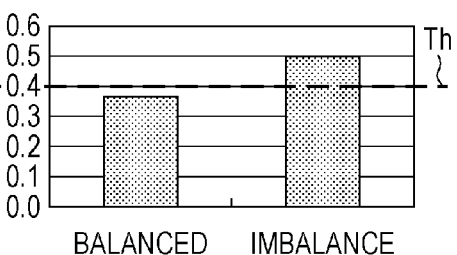

FIG. 18B shows a bar graph of an example of the second integration value obtained when the responsiveness of the air-fuel ratio sensor 16 is excellent. FIG. 18C shows a bar graph of an example of the resultant value computed using the first integration value in FIG. 18A and the second integration value in FIG. 18B. FIG. 18E shows a bar graph of an example of the second integration value obtained when the responsiveness of the air-fuel ratio sensor 16 is deteriorated. FIG. 18F shows a bar graph of an example of the resultant value computed using the first integration value in FIG. 18D and the second integration value in FIG. 18E.

As described above, if the air-fuel ratio sensor is deteriorated, the output of the sensor decreases. Therefore, the second integration value shown in FIG. 18E is smaller than that shown in FIG. 18B. However, in each of FIGS. 18B and 18E, the second integration values are substantially the same for the balanced mode and imbalance mode. That is, since the second integration value indicates the output of the air-fuel ratio sensor based on the frequency component of a variation in the target air-fuel ratio, the second integration value is not affected by cylinder-to-cylinder air-fuel ratio imbalance. Therefore, the second integration value indicates the level of deterioration of the air-fuel ratio sensor regardless of cylinder-to-cylinder air-fuel ratio imbalance. Thus, by normalizing the first integration value using the second integration value, the resultant value can be obtained as a value indicating cylinder-to-cylinder air-fuel ratio imbalance without being affected by the deterioration of the air-fuel ratio sensor. Accordingly, as shown in FIGS. 18C and 18F, even when the air-fuel ratio sensor is deteriorated, it can be accurately determined whether a cylinder-to-cylinder air-fuel ratio imbalance mode or a cylinder-to-cylinder air-fuel ratio balanced mode occurs using a predetermined threshold value Th.

Like the threshold value Th used in the first diagnosis illustrated in FIG. 10, it is desirable that for a shift of the air-fuel ratio between one cylinder and another cylinder, the boundary between the balanced mode and the imbalance mode be set in advance and the shift of the air-fuel ratio follow the shift of the boundary.

In above description, the second integration value indicates the responsiveness of the air-fuel ratio sensor 16. As the second integration value increases, the responsiveness of the air-fuel ratio sensor increases. Therefore, the predetermined threshold value Th may be set in accordance with the responsiveness and, subsequently, the set threshold value Th may be compared with the first integration value.

Figure 19:
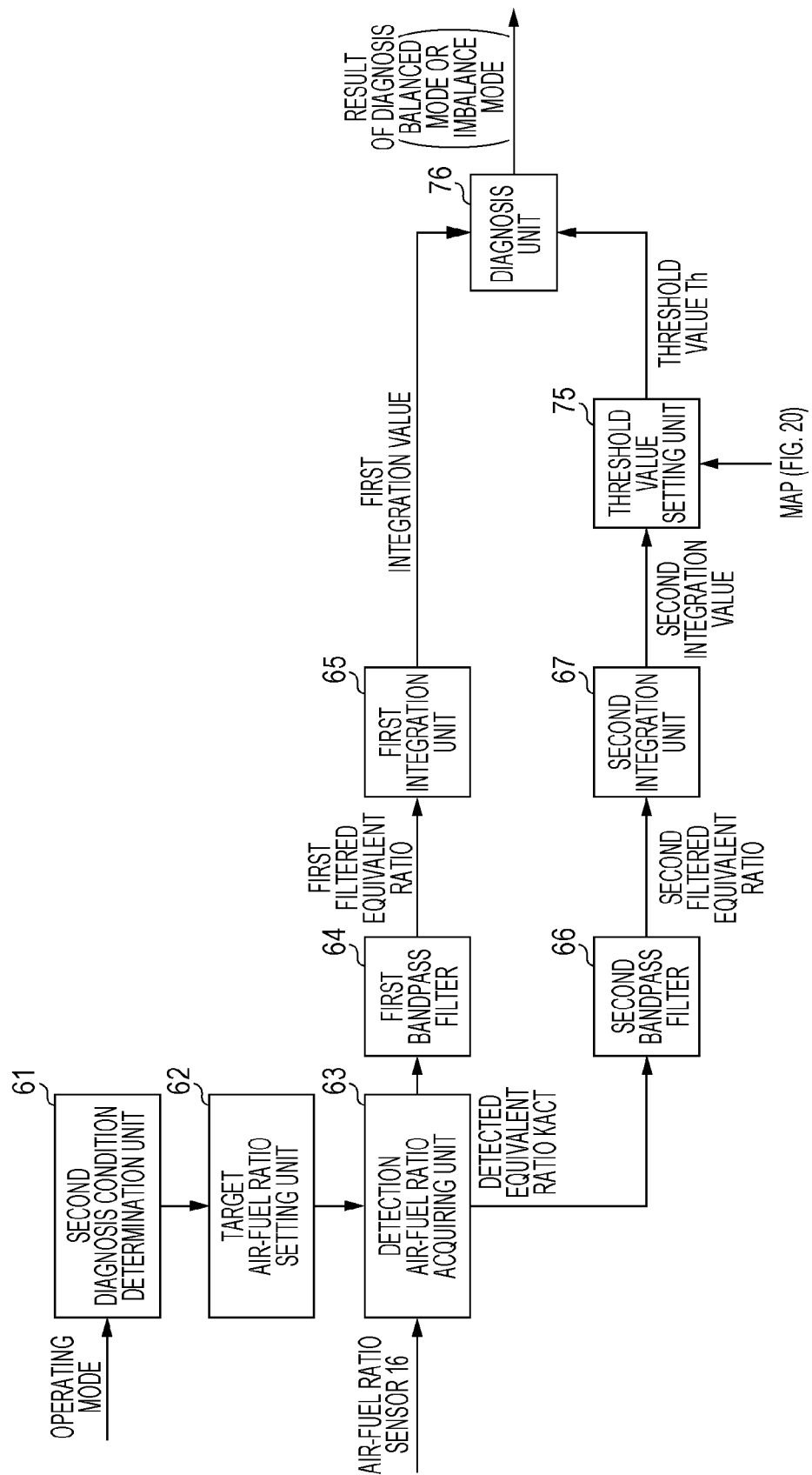
FIG. 19 is a block diagram of one of the alternatives to the second diagnosis processing unit according to the embodiment of the present invention.
Figure 20:
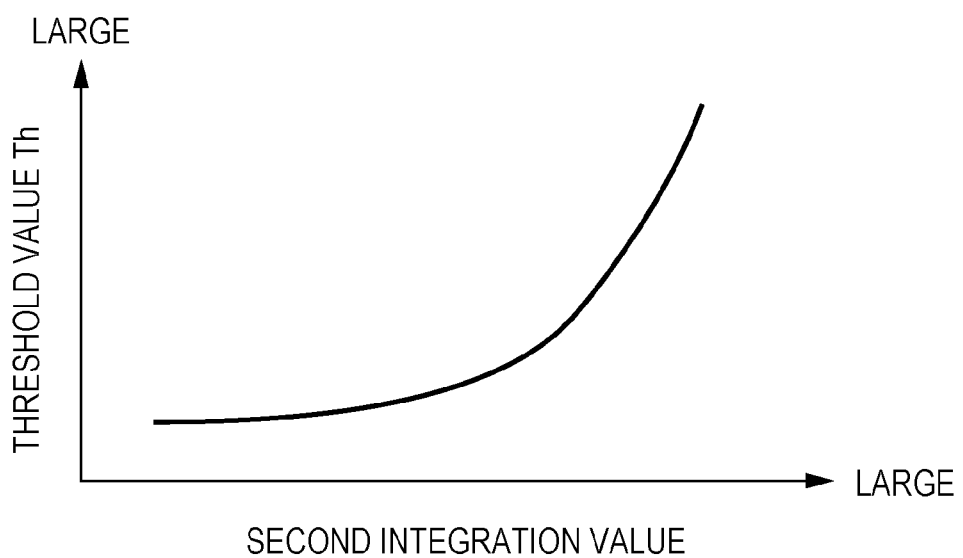
FIG. 20 illustrates a map used for determining a threshold value in the alternative to the second diagnosis according to the embodiment of the present invention.

FIG. 19 illustrates such a modified embodiment. Unlike the configuration shown in FIG. 15, the normalization unit 71 is replaced with a threshold value setting value 75. For example, a map shown in FIG. 20 is stored in the storage unit, such as a memory, in advance. After the predetermined period of time has elapsed in the diagnosis mode, the threshold value setting value 75 looks up, in the map, a threshold value Th corresponding to the second integration value finally computed by the second integration unit 67. As the second integration value increases, a higher threshold value Th can be obtained.

A diagnosis unit 76 compares the first integration value finally computed by the first integration unit 65 and the threshold value Th obtained from the map in this manner. If the first integration value is greater than the threshold value Th, a variation in the detected equivalent ratio KACT is large. Accordingly, the diagnosis unit 76 determines that a cylinder-to-cylinder air-fuel ratio imbalance mode occurs. However, if the first integration value is less than or equal to the threshold value Th, a variation in the detected equivalent ratio KACT is small. Accordingly, the diagnosis unit 76 determines that a cylinder-to-cylinder air-fuel ratio balanced mode occurs.

Figure 21:
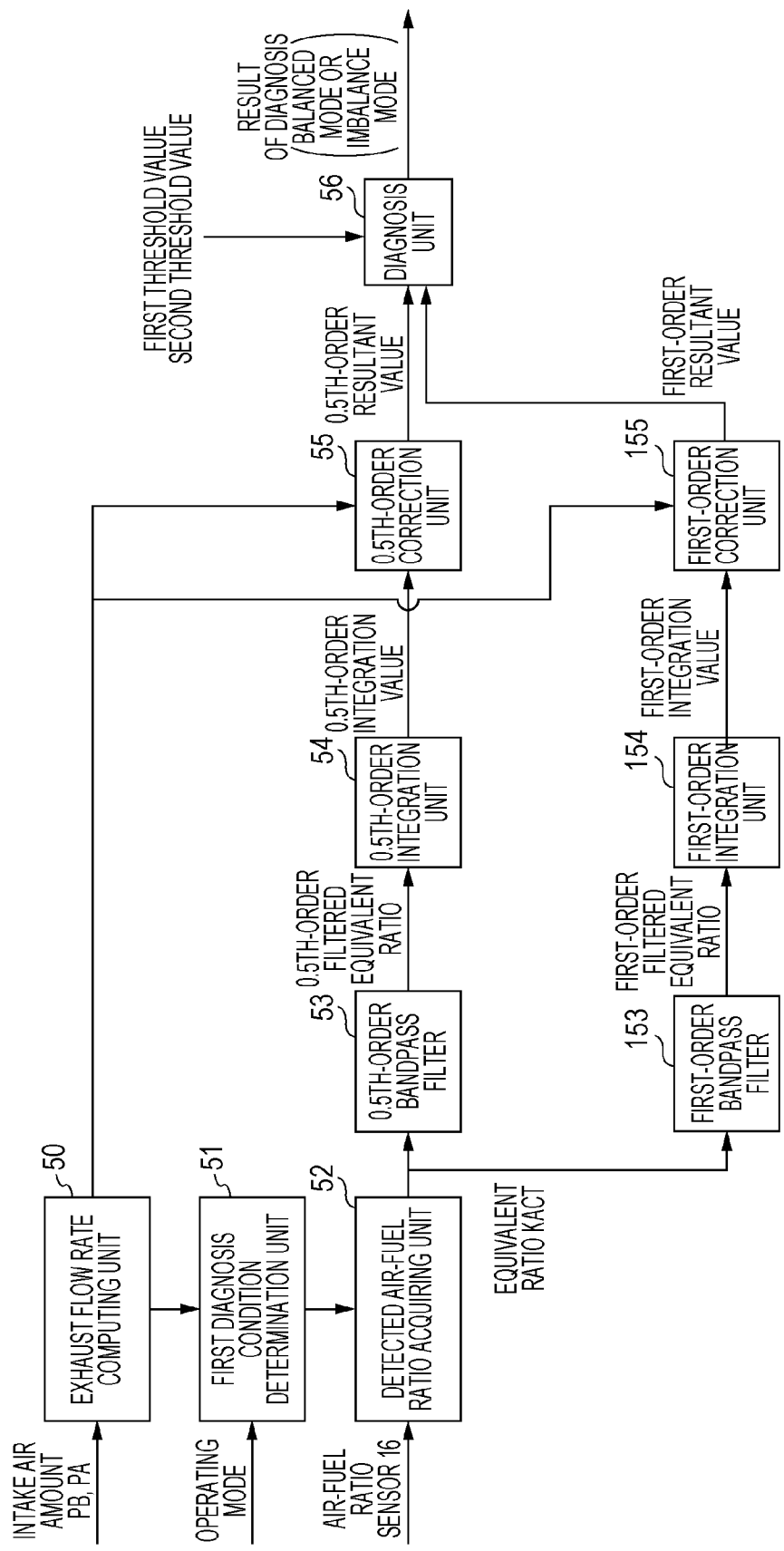
FIG. 21 is a block diagram of a first diagnosis processing unit according to another embodiment of the present invention.
Figure 22:
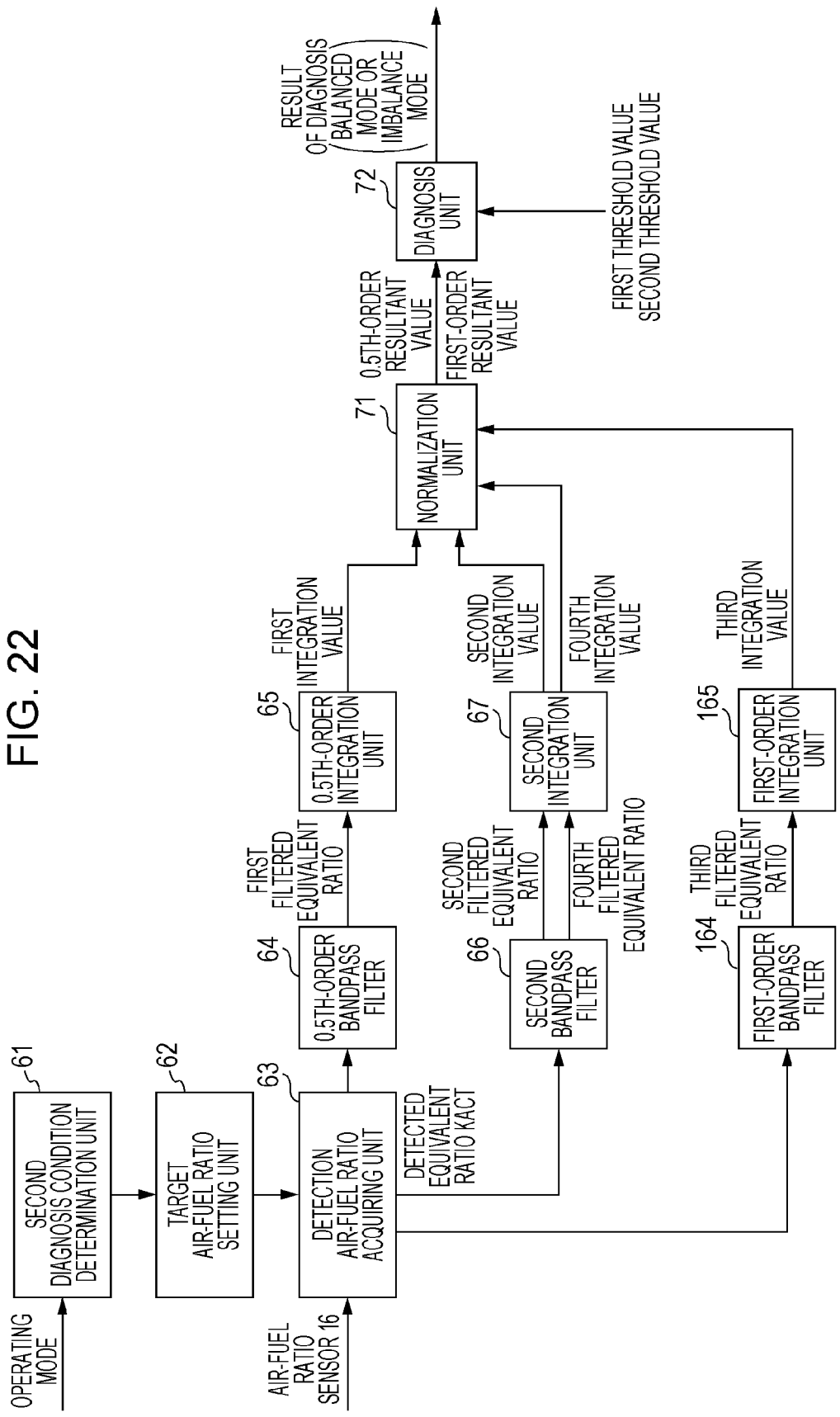
FIG. 22 is a block diagram of a second diagnosis processing unit according to the embodiment of the present invention.

FIGS. 21 and 22 are functional block diagrams of the first diagnosis processing unit 42 and the second diagnosis processing unit 43 that can detect a shift of the air-fuel ratio in the opposed two-cylinder of the in-line four cylinder engine illustrated in FIG. 4, respectively.

Unlike the configuration shown in FIG. 7, as shown in FIG. 21, a processing route for a first-order frequency of engine speed is additionally provided.

The detected air-fuel ratio acquiring unit 52 acquires the detected equivalent ratio KACT by sampling the output of the air-fuel ratio sensor 16 in synchronization with the cycle of the filtering process performed by the 0.5th-order bandpass filter 53 and a first-order bandpass filter 153 disposed downstream of the detected air-fuel ratio acquiring unit 52.

The 0.5th-order bandpass filter 53, a 0.5th-order integration unit 54, and a 0.5th-order correction unit 55 are the same as those shown in FIG. 7. The 0.5th-order integration unit 54 accumulates a filtered 0.5th-order equivalent ratio received from the 0.5th-order bandpass filter 53 in the cycles corresponding to the 0.5th-order frequency of the engine speed. Thus, the 0.5th-order integration unit 54 computes a 0.5th-order integration value. The 0.5th-order correction unit 55 corrects the 0.5th-order integration value using the correction coefficient K corresponding to the engine speed NE and the exhaust flow rate $GAIR_{EX}$. Thus, the 0.5th-order correction unit 55 computes a 0.5th-order resultant value.

The first-order bandpass filter 153 extracts the first-order frequency component of the engine speed from the acquired detected equivalent ratio KACT and outputs the filtered first-order equivalent ratio. As described above, the cycle of filtering is set so as to be less than or equal to the cycle of accumulation subsequently performed.

In addition, a first-order integration unit 154 accumulates the filtered first-order equivalent ratio in cycles corresponding to the first-order frequency of the engine speed. Thus, the first-order integration unit 154 computes a first-order integration value. A first-order correction unit 155 corrects the first-order integration value using the correction coefficient K corresponding to the engine speed NE and the exhaust flow rate $GAIR_{EX}$. Thus, the first-order correction unit 155 computes a first-order resultant value.

Note that the length of a cycle corresponding to the first-order frequency is half the length of a cycle corresponding to the 0.5th-order frequency. Therefore, the filtered 0.5th-order equivalent ratio is computed every other time when the filtered first-order equivalent ratio is computed. The two values computed at the same time are the same. Accordingly, the filtered first-order equivalent ratio computed in cycles corresponding to the first-order frequency may be obtained in cycles corresponding to the 0.5th-order frequency, and the obtained value may be used as the filtered 0.5th-order equivalent ratio.

After the predetermined period of time of the diagnosis mode has elapsed, the diagnosis unit 56 compares the 0.5th-order resultant value with a first threshold value and compares the first-order resultant value with a second threshold value. As shown in FIG. 4, the value of the 0.5th-order frequency component may differ from the value of the first-order frequency component. Accordingly, it is desirable that the first and second threshold values be separately set. For example, the first and second threshold values can be set as illustrated in FIG. 10.

If at least one of the 0.5th-order resultant value and the first-order resultant value is larger than the corresponding threshold value, the diagnosis unit 56 determines that a cylinder-to-cylinder air-fuel ratio imbalance mode occurs. However, if each of the 0.5th-order resultant value and the first-order resultant value is smaller than or equal to the corresponding threshold value, the diagnosis unit 56 determines that a cylinder-to-cylinder air-fuel ratio balanced mode occurs.

Note that the embodiment illustrated in FIG. 21 can be modified so that the threshold value can be corrected as illustrated in FIG. 14. The first and second threshold values may be corrected using the correction coefficient K. Thereafter, the 0.5th-order integration value may be compared with the corrected first threshold value, and the first-order integration value may be compared with the corrected second threshold value.

The configuration shown in FIG. 22 differs from that shown in FIG. 15 in that the processing route of a first-order frequency of the engine speed is additionally provided.

The detected air-fuel ratio acquiring unit 63 acquires the detected equivalent ratio KACT by sampling the output of the air-fuel ratio sensor 16 in synchronization with the cycles of the filtering process performed by the 0.5th-order bandpass filter 64 and a first-order bandpass filter 164 disposed downstream of the detected air-fuel ratio acquiring unit 63.

The 0.5th-order bandpass filter 64 and the 0.5th-order integration unit 65 are the same as those shown in FIG. 15. The 0.5th-order bandpass filter 64 and the 0.5th-order integration unit 65 outputs a first filtered equivalent ratio and a first integration value, respectively.

The first-order bandpass filter 164 and a first-order integration unit 165 operate as illustrated in FIG. 21. The outputs of the first-order bandpass filter 164 and the first-order integration unit 165 are referred to as a "third filtered equivalent ratio" and a "third integration value", respectively.

The second bandpass filter 66 and the second integration unit 67 perform a process for a first-order integration value separately from the process for computing the second filtered equivalent ratio and the second integration value illustrated in FIG. 15. That is, the second bandpass filter 66 filters the detected equivalent ratio KACT at the same time as the first-order bandpass filter 164 filters the detected equivalent ratio KACT. Thus, the second bandpass filter 66 computes a fourth filtered equivalent ratio. In addition, the second integration unit 67 accumulates the fourth filtered equivalent ratio at the same time as the first-order integration unit 165 performs accumulation. Thus, the second integration unit 67 computes a fourth integration value.

The normalization unit 71 normalizes the third integration value using the fourth integration value after the predetermined period of time of the diagnosis mode has elapsed separately from a process for computing a resultant value (hereinafter referred to as a "0.5th-order resultant value") by normalizing the first integration value using the second integration value illustrated in FIG. 15. That is, the normalization unit 71 computes the first-order resultant value by dividing the third integration value by the fourth integration value.

A diagnosis unit 72 compares the 0.5th-order resultant value with a first threshold value and compares the first resultant value with a second threshold value. As in the case shown in FIG. 21, the first and second threshold values can be set separately. If at least one of the 0.5th-order resultant value and the first-order resultant value is larger than the corresponding threshold value, the diagnosis unit 72 determines that a cylinder-to-cylinder air-fuel ratio imbalance mode occurs. However, if each of the 0.5th-order resultant value and the first-order resultant value is smaller than or equal to the corresponding threshold value, the diagnosis unit 72 determines that a cylinder-to-cylinder air-fuel ratio balanced mode occurs.

Note that the embodiment illustrated in FIG. 19 in which the threshold value is set can be also applied to the embodiment shown in FIG. 22 so that a second threshold value can be set. In such a case, a map that is similar to that shown in FIG. 20 is generated on the basis of the second threshold value and the fourth integration value in advance and is stored in the storage unit, such as a memory. Thereafter, after the predetermined period of time of the diagnosis mode has elapsed, the diagnosis unit 72 looks up the second threshold value corresponding to the finally computed fourth integration value in the map. After the predetermined period of time has elapsed, the diagnosis unit 72 compares the finally computed third integration value with the second threshold value obtained from the map. If at least one of the two conditions: the first integration value is greater than the first threshold value obtained from the map shown in FIG. 20 and the third integration value is greater than the second threshold value obtained from the map is satisfied, the diagnosis unit 72 determines that a cylinder-to-cylinder air-fuel ratio imbalance mode occurs. However, when the first integration value is smaller than or equal to the first threshold value and if the third integration value is smaller than or equal to the second threshold value, the diagnosis unit 72 determines that a cylinder-to-cylinder air-fuel ratio balanced mode occurs.

Figure 23:
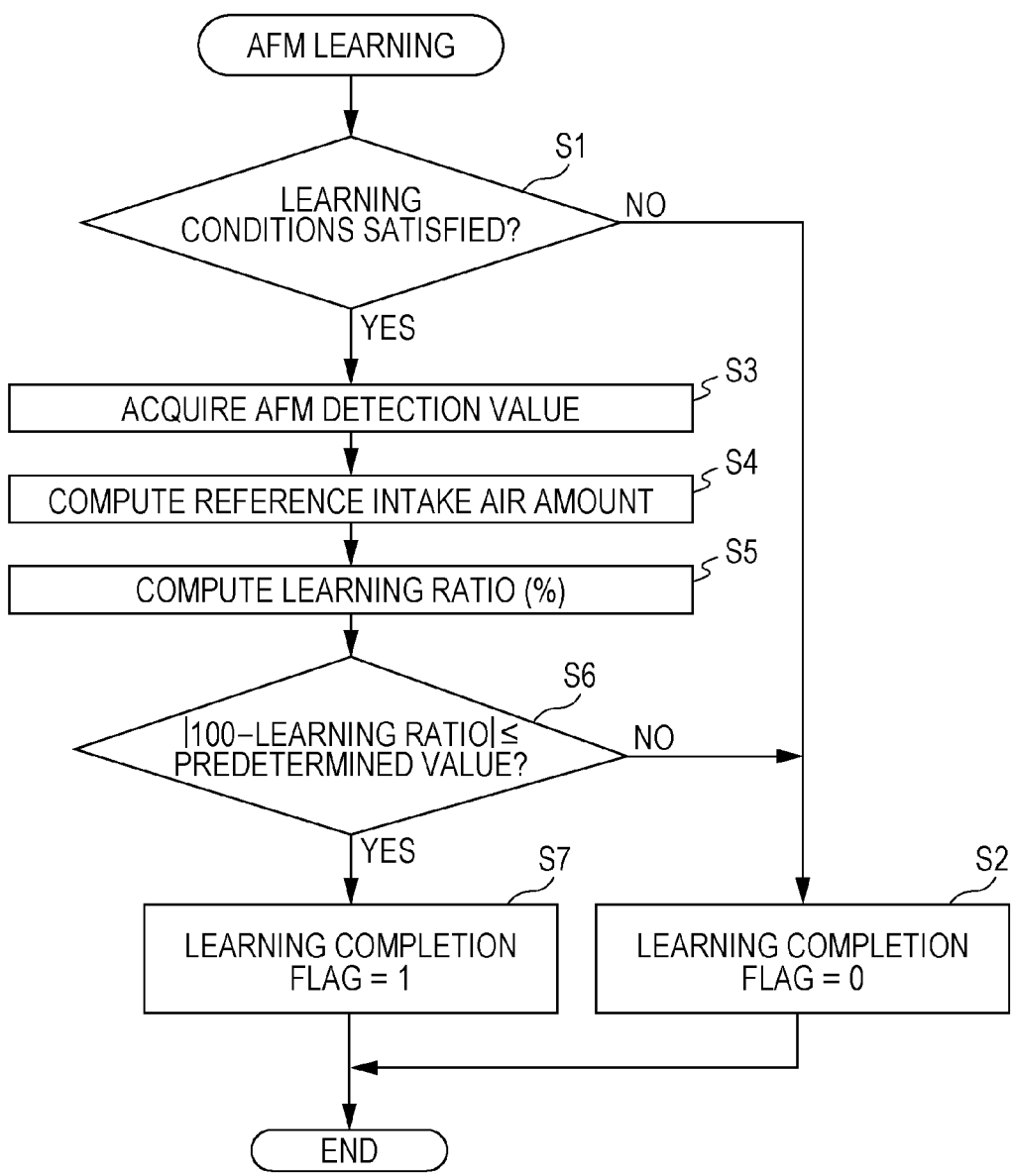
FIG. 23 is a flowchart of an AFM learning process according to an embodiment of the present invention.

FIG. 23 is a flowchart of an AFM learning process according to an embodiment of the present invention. This process is performed by the CPU of the ECU 1. More specifically, the process is performed by the AFM learning unit 40 in predetermined cycles.

In step S1, it is determined whether the above-described predetermined learning conditions are satisfied. If the learning conditions are not satisfied, the learning process is not completed. Thus, in step S2, a learning completion flag is set to zero. However, if the learning conditions are satisfied, the detection value of the AFM 8 is acquired in step S3.

In step S4, the reference intake air amount is computed on the basis of the operating mode of the engine, as described above. More specifically, a predetermined map is referenced to find an intake air amount corresponding to the detected engine speed and the intake pipe pressure. As described above, the obtained reference intake air amount may be density-corrected using the detected atmospheric pressure and intake air temperature.

In step S5, the learning ratio (%) representing a shift of the detection value of the AFM 8 from the reference intake air amount is computed using equation (1). In step S6, it is determined whether the absolute difference between the learning ratio and 100 (%) is less than or equal to a predetermined value (e.g., 10%). If the absolute difference is greater than the predetermined value, the shift of the detection value of the AFM 8 is large and, therefore, the AFM 8 may be deteriorated. Thus, it is determined that the learning cannot be completed. Thereafter, the processing proceeds to step S2. However, if the absolute difference is less than or equal to the predetermined value, it is determined that the learning has been completed. Thereafter, the processing proceeds to step S7, where the learning completion flag is set to 1.

Figure 24:
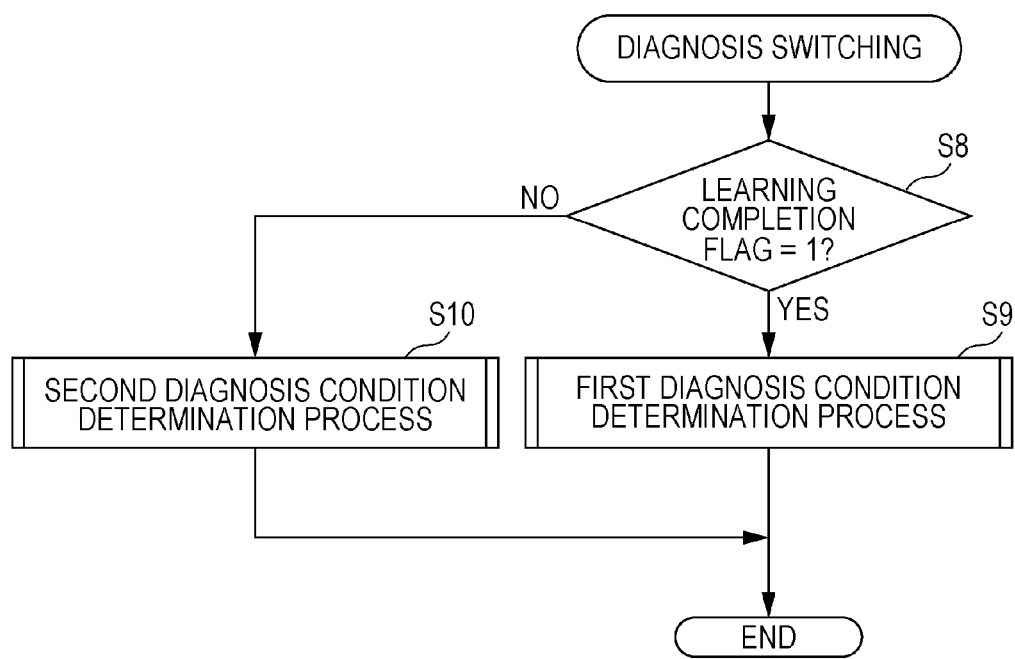
FIG. 24 is a flowchart of a diagnosis switching process according to the embodiment of the present invention.

FIG. 24 is a flowchart of a diagnosis switching process according to an embodiment of the present invention. This process is performed by the CPU of the ECU 1. More specifically, the process is performed by the diagnosis switching unit 41 in predetermined cycles. According to the present embodiment, the process can be performed in cycles the same as those of a diagnosis process described below.

In step S8, it is determined whether the learning completion flag set in FIG. 23 is 1. If the learning completion flag is 1, the result of learning performed by the AFM 8 can be used. Therefore, the processing proceeds to step S9, where a first diagnosis condition determination process is performed. However, if the learning completion flag is zero, the processing proceeds to step S10, where a second diagnosis condition determination process is performed.

Figure 25A:
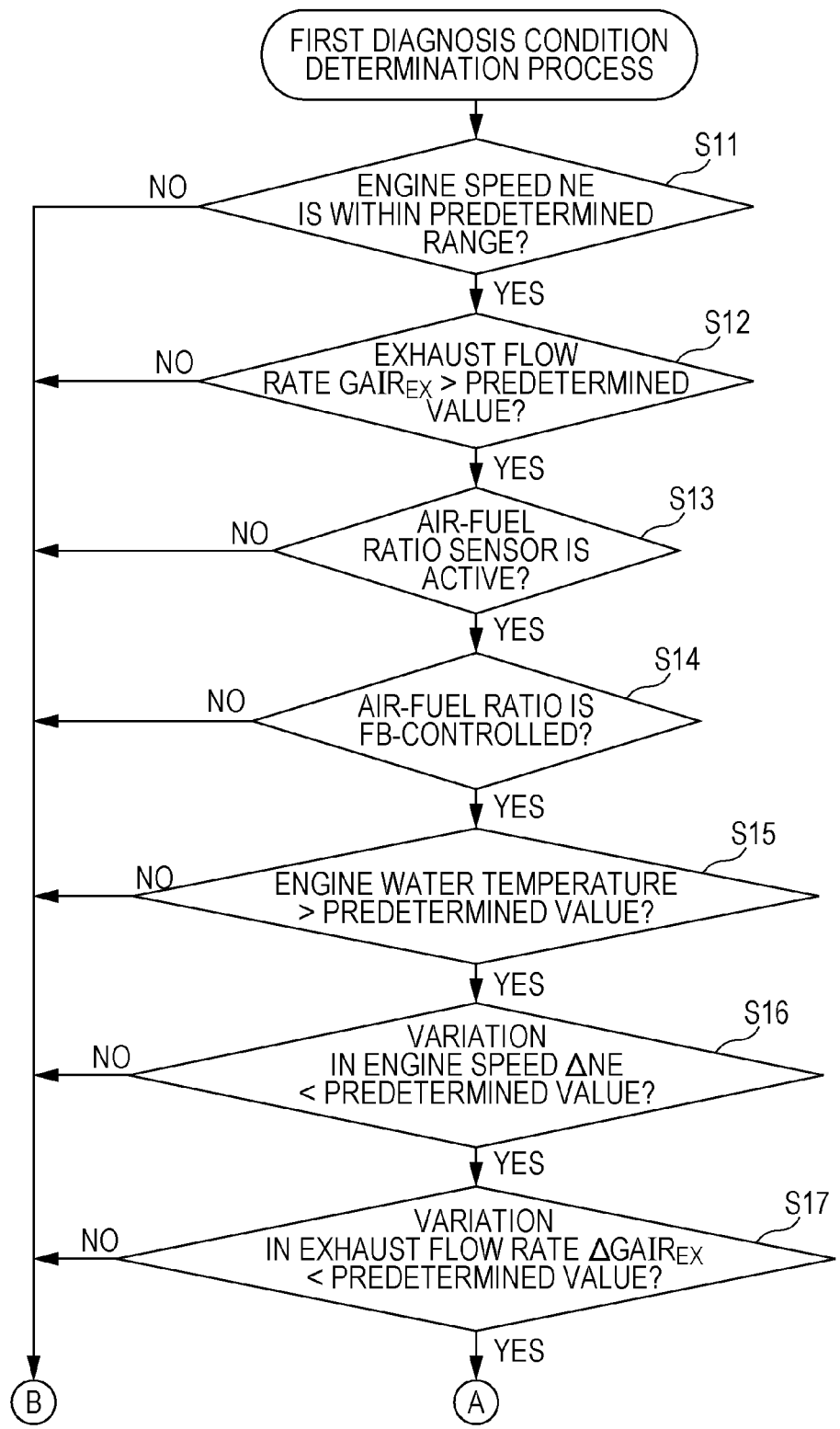

FIGS. 25A and 25B are flowcharts of the first diagnosis condition determination process performed in step S9 shown in FIG. 24. More specifically, the process is performed by the first diagnosis condition determination unit 51.

In step S11, it is determined whether the detected engine speed NE is within a predetermined range. In step S12, the exhaust flow rate $GAIR_{EX}$ is computed using equation (5) on the basis of the detected intake air amount, intake pipe pressure, and atmospheric pressure. In addition, preferably, the computed exhaust flow rate $GAIR_{EX}$ is corrected using the correction coefficient KIG obtained by referencing the map shown in FIG. 13B using the current ignition timing. Thus, the ignition timing-corrected exhaust flow rate $GAIR_{EX}$ is computed. As described above, the ignition timing correction is performed so that as the ignition timing is retarded, the exhaust flow rate is increased (i.e., the resultant value decreases). Thereafter, it is determined whether the ignition timing-corrected exhaust flow rate $GAIR_{EX}$ is greater than a predetermined value. As illustrated in FIG. 8, such a process is performed in order to determine whether the current operating mode is within a diagnosable region. If the current operating mode is within a diagnosable region, the processing proceeds to step S13. However, if the current operating mode is outside the diagnosable region, the processing proceeds to step S25, where a first diagnosis condition flag is set to zero. In this way, diagnosis is prohibited.

In step S13, it is determined whether the air-fuel ratio sensor 16 is active. If the air-fuel ratio sensor 16 is not active, a correct output cannot be acquired from the air-fuel ratio sensor. Therefore, diagnosis is prohibited (step S25).

In step S14, it is determined whether normal air-fuel ratio feedback (FB) control for converging the air-fuel ratio on the target air-fuel ratio (a predetermined value, e.g., the theoretical air-fuel ratio) is performed. The normal air-fuel ratio feedback (FB) control can be realized using any one of widely used techniques. This control is performed in order to determine whether cylinder-to-cylinder air-fuel ratio imbalance occurs although the air-fuel ratio is controlled so as to be the target air-fuel ratio. Therefore, if the normal air-fuel ratio feedback control is not being performed, diagnosis is prohibited (step S25).

In step S15, it is determined whether the engine water temperature TW detected by the engine water temperature sensor 11 is higher than a predetermined value. If the engine water temperature TW is lower than the predetermined value, a spike-shaped variation in the detected equivalent ratio may occur due to, for example, fuel deposition. Therefore, diagnosis is prohibited (step S25).

In steps S16 and S17, it is determined whether each of a variation $\Delta NE$ in the engine speed and a variation $\Delta GAIR_{EX}$ in the exhaust flow rate $GAIR_{EX}$ is smaller than a predetermined value. If these variations are large, the output of the air-fuel ratio sensor may be unstable. Therefore, diagnosis is prohibited (step S25). For example, the variation $\Delta NE$ can be expressed as an absolute difference between the engine speed NE in the previous cycle and the engine speed NE in the current cycle. The variation $\Delta GAIR_{EX}$ can be expressed as an absolute difference between the exhaust flow rate $GAIR_{EX}$ in the previous cycle and the exhaust flow rate $GAIR_{EX}$ in the current cycle.

In step S18, it is determined whether control to increase the amount of fuel is being performed. If control to increase the amount of fuel is being performed, a balance of the air-fuel ratio is easily affected by an increase in the amount of fuel. Therefore, diagnosis is prohibited (step S25).

In step S19, it is determined whether the duty ratio of the purge control valve 28 is synchronized with the engine speed NE. As described above, the purge control valve 28 is opened and closed using a predetermined duty ratio. If the cycles of opening and closing the purge control valve 28 are synchronized with the engine speed (e.g., if the length of the cycle of opening and closing the purge control valve 28 is the same as the length of the cycle of the engine speed), fuel vapor drawn into a cylinder is increased and, therefore, the balance of the air-fuel ratio may be lost. Therefore, diagnosis is prohibited (step S25).

In step S20, it is determined whether the EGR circulation ratio is higher than a predetermined value. The EGR circulation ratio can be controlled by the opening angle of the EGR valve 19. If circulation of EGR is not in operation, a cylinder-to-cylinder air-fuel ratio imbalance mode caused by malfunction regarding EGR circulation (e.g., malfunction of the EGR valve 19) cannot be detected. In addition, if the EGR circulation ratio is not higher than the predetermined value, it may be difficult for the air-fuel ratio sensor to detect the imbalance mode caused by malfunction regarding EGR circulation. Therefore, if the EGR circulation ratio is lower than or equal to the predetermined value, diagnosis is prohibited (step S25).

In step S21, it is determined whether the output of the air-fuel ratio sensor is kept at a predetermined upper limit or a predetermined lower limit. If the output of the air-fuel ratio sensor is kept at the predetermined upper limit or the predetermined lower limit, it is difficult to acquire a periodic waveform from the air-fuel ratio sensor. Therefore, diagnosis is prohibited (step S25).

In step S22, it is determined whether a cylinder is stopped when the engine has a cylinder stopping function. If a cylinder is stopped, it is difficult to detect malfunction even when the air-fuel ratio of the stopped cylinder is shifted. Therefore, diagnosis is prohibited (step S25).

In step S23, it is determined whether the responsiveness of the air-fuel ratio sensor is so deteriorated that the air-fuel ratio sensor is determined to malfunction. If the responsiveness of the air-fuel ratio sensor is so deteriorated that the air-fuel ratio sensor malfunctions (e.g., if an absolute difference between the air-fuel ratio detected by the air-fuel ratio sensor 16 and the value that the air-fuel ratio sensor 16 should normally outputs (e.g., the target air-fuel ratio) is higher than or equal to a predetermined value), it can be determined that the air-fuel ratio sensor does not normally operates. If it is determined that the air-fuel ratio sensor does not normally operate, diagnosis is prohibited (step S25).

If all of the conditions in steps S11 to S23 are satisfied, the first diagnosis condition flag is set to 1 in step S24, and diagnosis is enabled (a diagnosis mode is started). However, at least one of the conditions is not satisfied, the first diagnosis condition flag is set to zero in step S25, and diagnosis is prohibited.

Figure 26:
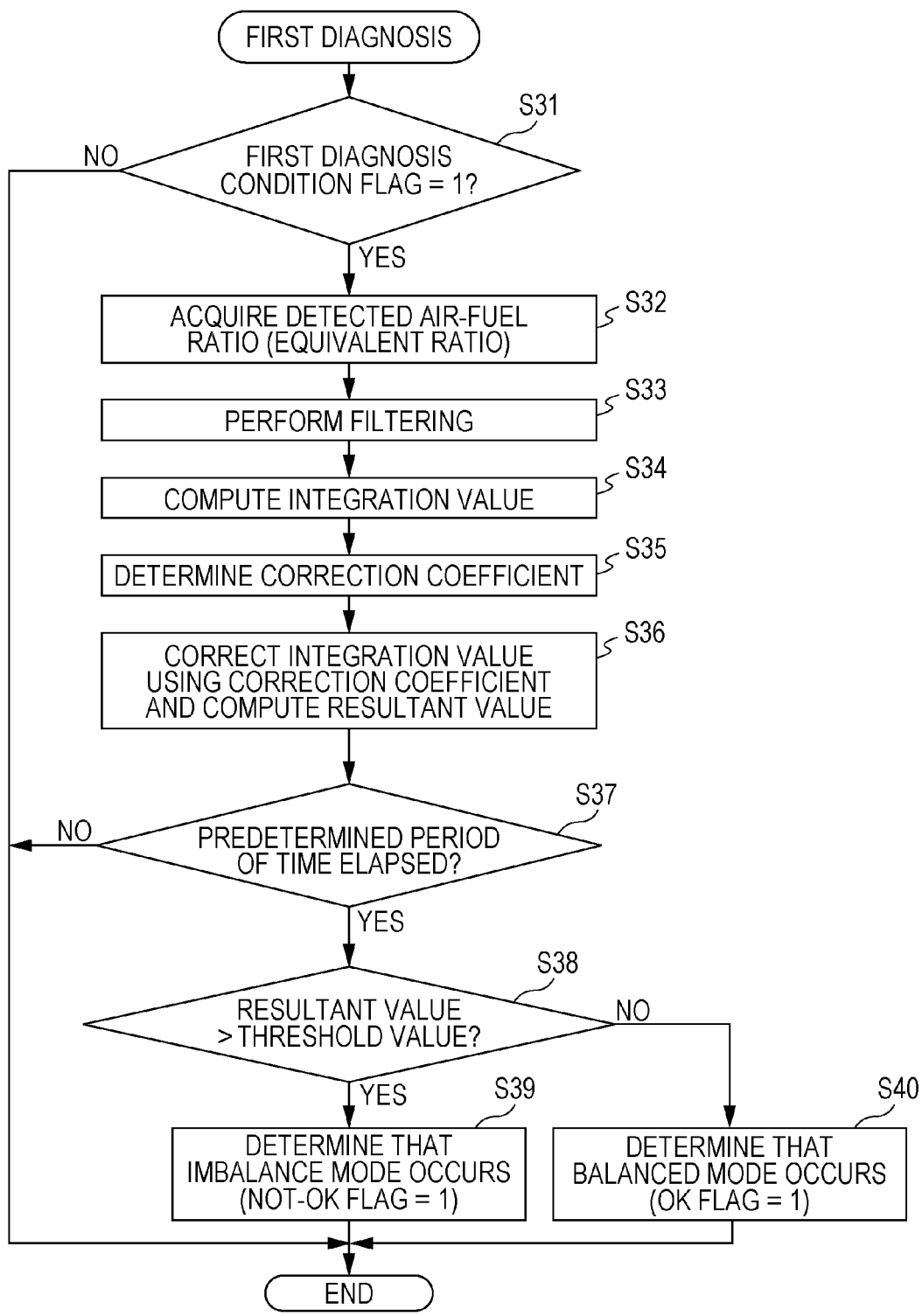
FIG. 26 is a flowchart of a process for diagnosing whether a cylinder-to-cylinder air-fuel ratio balanced mode or a cylinder-to-cylinder air-fuel ratio imbalance mode occurs in the first diagnosis according to the embodiment of the present invention.

FIG. 26 is a flowchart of a diagnosis process for the first diagnosis according to an embodiment the present invention. This process is performed by the CPU of the ECU 1. More specifically, the process is performed by the detected air-fuel ratio acquiring unit 52, the bandpass filter 53, the integration unit 54, the correction unit 55, and the diagnosis unit 56 shown in FIG. 7 in cycles corresponding to the 0.5th-order frequency.

If, in step S31, the first diagnosis condition flag illustrated in FIG. 25 is set to 1, the diagnosis process is started. Otherwise, in order to prohibit the diagnosis, the processing exits this routine.

In step S32, the detected equivalent ratio KACT is acquired via the air-fuel ratio sensor 16. In step S33, the filtered equivalent ratio is computed by applying a bandpass filter to the detected equivalent ratio KACT. As described above, the filtered equivalent ratio represents the 0.5th-order frequency component of the engine speed extracted from the detected equivalent ratio KACT.

In step S34, the current integration value is computed by adding the filtered equivalent ratio to the previous integration value.

In step S35, the correction coefficient K is obtained by referencing, for example, the map shown in FIG. 8C using the detected engine speed NE and exhaust flow rate $GAIR_{EX}$, which is computed in step S12 shown in FIG. 25 (preferably, the ignition timing-corrected exhaust flow rate $GAIR_{EX}$ is used).

In step S36, the integration value obtained in step S34 is corrected using the correction coefficient K. As described above, the correction can be performed by multiplying the integration value by the correction coefficient K. Through such correction, the resultant value can be obtained.

In step S37, it is determined whether the predetermined period of time has elapsed. Measurement of the predetermined period of time is performed by a predetermined timer (not shown), and the measurement starts from the time the first diagnosis condition flag is set to 1. If the predetermined period of time has not elapsed, the processing exits this routine. However, if the predetermined period of time has elapsed, the resultant value computed in step S36 is compared with a predetermined threshold value (step S38). If the resultant value is greater than the threshold value, it is determined that an imbalance mode occurs, and the processing proceeds to step S39, where a not-OK flag is set to 1. However, if the resultant value is less than or equal to the threshold value, it is determined that a balanced mode occurs, and the processing proceeds to step S40, where an OK flag is set to 1.

If, as in the embodiment illustrated in FIG. 21, the first-order frequency of the engine speed is also extracted, the filtered first-order equivalent ratio, the first-order integration value, and the first-order resultant value can be computed in cycles corresponding to the first-order frequency in parallel to the processing performed in steps S32 to S36.

In addition, if, as in the embodiment illustrated in FIG. 14, the threshold value is corrected, the threshold value is corrected using the correction coefficient K in step S36. In step S38, the integration value computed in step S34 is compared with the corrected threshold value.

Note that in this process, the ignition timing correction is performed on the exhaust flow rate. However, as described above, the ignition timing correction is alternatively performed on one of the integration value, the resultant value, and the threshold value.

Since the diagnosis condition determination process of second diagnosis performed in step S10 shown in FIG. 24 is similar to the diagnosis condition determination process of the first diagnosis shown in FIG. 25, the drawing is not shown. The second diagnosis differs from the first diagnosis in that in steps S12 and S17, the intake pipe pressure PB and a variation ΔPB thereof are used instead of the exhaust flow rate $GAIR_{EX}$ and $\Delta GAIR_{EX}$ thereof. Furthermore, even in the second diagnosis, the determination in step S14 is made. This is to determine whether, as described above, a feedback coefficient used for the air-fuel ratio feedback control performed for a period of time during which the target air-fuel ratio is varied in predetermined cycles is computed. Note that in the second diagnosis, a second diagnosis condition flag is used instead of the first diagnosis condition flag. If the second diagnosis condition flag is set to 1, the diagnosis mode starts.

Figure 27:
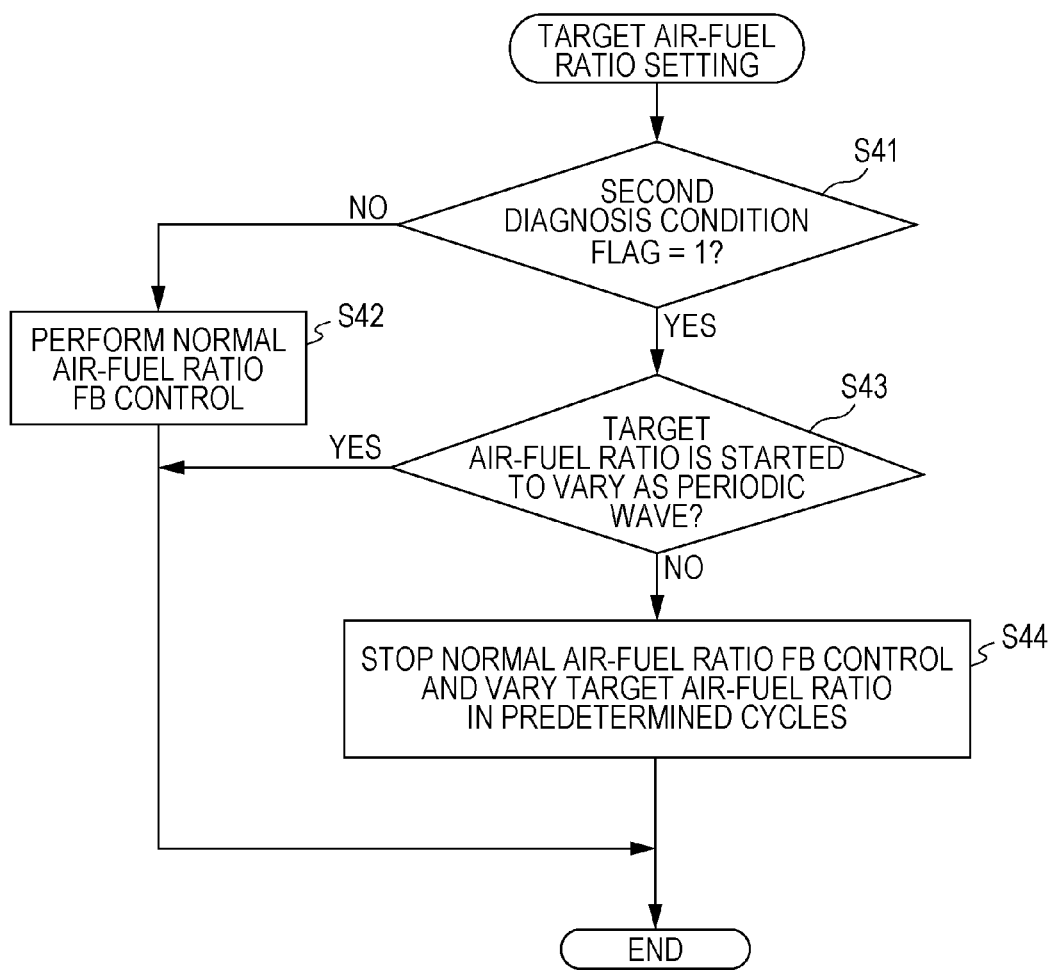
FIG. 27 is a flowchart of a target air-fuel ratio setting process of the second diagnosis according to the embodiment of the present invention.

FIG. 27 is a flowchart of a target air-fuel ratio setting process of the second diagnosis according to an embodiment of the present invention. This process is performed by the CPU of the ECU 1. More specifically, the process is performed by the target air-fuel ratio setting unit 62 shown in FIG. 15 in predetermined cycles. According to the present embodiment, the process can be performed in the same cycles as those of a diagnosis process described below.

If, in step S41, the second diagnosis condition flag is set to zero, diagnosis is prohibited. Therefore, in step S42, the normal air-fuel ratio feedback control for converging the air-fuel ratio detected by the air-fuel ratio sensor 16 on the target air-fuel ratio (as described above, a predetermined value, e.g., the theoretical air-fuel) is continuously performed. However, if the second diagnosis condition flag is set to 1, the diagnosis mode has been started. Therefore, the processing proceeds to step S43.

When the diagnosis mode is started, a variation in the target air-fuel ratio in the form of a periodic wave has not yet been started (step S43). Therefore, the processing proceeds to step S44, where the normal air-fuel ratio feedback control is stopped. As described above, in order to start a variation in the target air-fuel ratio in the form of a periodic wave, the target air-fuel ratio is set as the periodic wave varies in predetermined cycles Ta shown in FIG. 17. In this way, an air-fuel ratio feedback control process (not shown) is separately started. In this process, the target air-fuel ratio is sampled at predetermined intervals, and the injection fuel quantity is computed so that the air-fuel ratio detected by the air-fuel ratio sensor 16 converges on the target air-fuel ratio having the sampled values. Thus, the fuel of the computed fuel quantity is injected (at that time, as described in step S14, the feedback coefficient used in the normal air-fuel ratio feedback control can be used). In this way, during a predetermined period of time of the diagnosis mode, the target air-fuel ratio varies in predetermined cycles. As a result, the actual air-fuel ratio also varies in predetermined cycles.

When this process is performed next time, the determination in step S43 is "Yes". Therefore, the processing immediately exits this process. In addition, as described below, when the diagnosis condition is not satisfied during the diagnosis mode and, therefore, the second diagnosis condition flag is reset to zero, the determination in step S41 is "No". Thus, in step S42, the variation in the target air-fuel ratio in the form of a periodic wave is stopped, and the normal air-fuel ratio feedback control process resumes.

Figure 28:
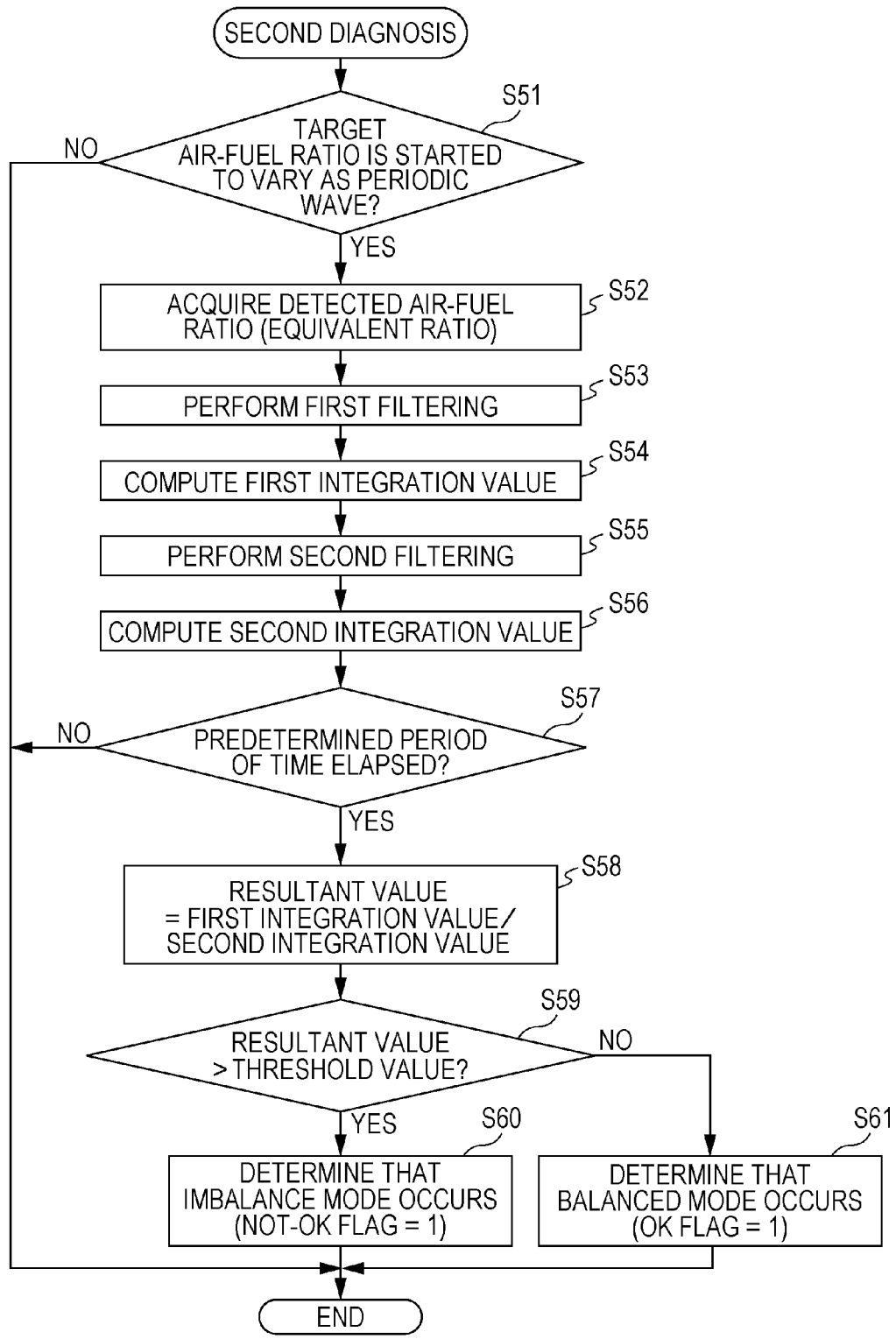
FIG. 28 is a flowchart of a process for diagnosing whether a cylinder-to-cylinder air-fuel ratio balanced mode or a cylinder-to-cylinder air-fuel ratio imbalance mode occurs in the second diagnosis according to the embodiment of the present invention.

FIG. 28 is a flowchart of a diagnosis process of the second diagnosis according to an embodiment of the present invention. This process is performed by the CPU of the ECU 1. More specifically, the process is performed by the detected air-fuel ratio acquiring unit 63, the first bandpass filter 64, the first integration unit 65, the second bandpass filter 66, the second integration unit 67, the normalization unit 71, and the diagnosis unit 72 shown in FIG. 15 in cycles corresponding to the above-described 0.5th-order frequency.

In step S51, it is determined whether the normal air-fuel ratio feedback control process is stopped and a variation in the target air-fuel ratio in the form of a periodic wave is started. If the determination is "No", the processing exits this diagnosis process. However, if the determination is "Yes", the subsequent diagnosis process is performed.

In step S52, the equivalent ratio KACT detected via the air-fuel ratio sensor 16 is acquired. In step S53, a first filtered equivalent ratio is computed by applying a first bandpass filter to the detected equivalent ratio KACT. As described above, the first filtered equivalent ratio represents the 0.5th-order frequency component of the engine speed extracted from the detected equivalent ratio KACT. In step S54, the current first integration value is computed by adding the first filtered equivalent ratio to the previous first integration value (the initial value can be set to zero).

In step S55, a second filtered equivalent ratio is computed by applying a second bandpass filter to the detected equivalent ratio KACT. As described above, the second filtered equivalent ratio represents the frequency component of a variation in the target air-fuel ratio. In step S56, the current second integration value is computed by adding the second filtered equivalent ratio to the previous second integration value (the initial value of the second integration value can be set to zero).

In step S57, it is determined whether the predetermined period of time of the diagnosis mode has elapsed. Measurement of the predetermined period of time is performed by a predetermined timer (not shown), and the measurement starts from the time the second diagnosis condition flag is set to 1. If the predetermined period of time has not elapsed, the processing exits this process.

However, if the predetermined period of time has elapsed, the first integration value is divided by the second integration value in step S58. In this way, the first integration value is normalized, and a resultant value is obtained.

In step S59, the computed resultant value is compared with a predetermined threshold value. If the resultant value is greater than the threshold value, it is determined that an imbalance mode occurs, and a not-OK flag is set to 1 (step S60). However, if the resultant value is less than or equal to the threshold value, it is determined that a balanced mode occurs, and an OK flag is set to 1 (step S61).

If, as in the embodiment illustrated in FIG. 22, the first-order frequency of the engine speed is also extracted, a third filtered equivalent ratio, a third integration value, a fourth filtered equivalent ratio, and a fourth integration value can be computed in cycles corresponding to the first-order frequency simultaneously with the processing performed in steps S52 to S56.

In addition, if, as in the embodiment illustrated in FIG. 19, the threshold value is set, a corresponding threshold value can be obtained on the basis of the second integration value in step S58. Thereafter, the resultant value can be compared with the threshold value in step S59.

Although not shown, if the above-described predetermined conditions are not satisfied in some cycle during the predetermined period of time and, therefore, determination in step S31 or S41 is "No", it is desirable that the integration value computed in the previous cycle (including the integration values in the first diagnosis and second diagnosis) be stored in the storage unit, such as a memory. Thereafter, if the above-described predetermined conditions are satisfied during the predetermined period of time and, therefore, determination in step S31 or S41 is "Yes", the stored integration value is read from the storage unit and accumulation resumes. In such a case, it is desirable that a period of time for which the conditions are not satisfied be excluded from the predetermined period of time. In this way, diagnosis in which the result obtained from accumulation performed for the predetermined period of time is reliably used can be performed. Thus, the accuracy of diagnosis can be increased.

Examples of a simulation result according to the technique of the present embodiment are described next with reference to FIGS. 29 to 31. In these examples, diagnosis according to the first diagnosis route is employed.

Figure 29:
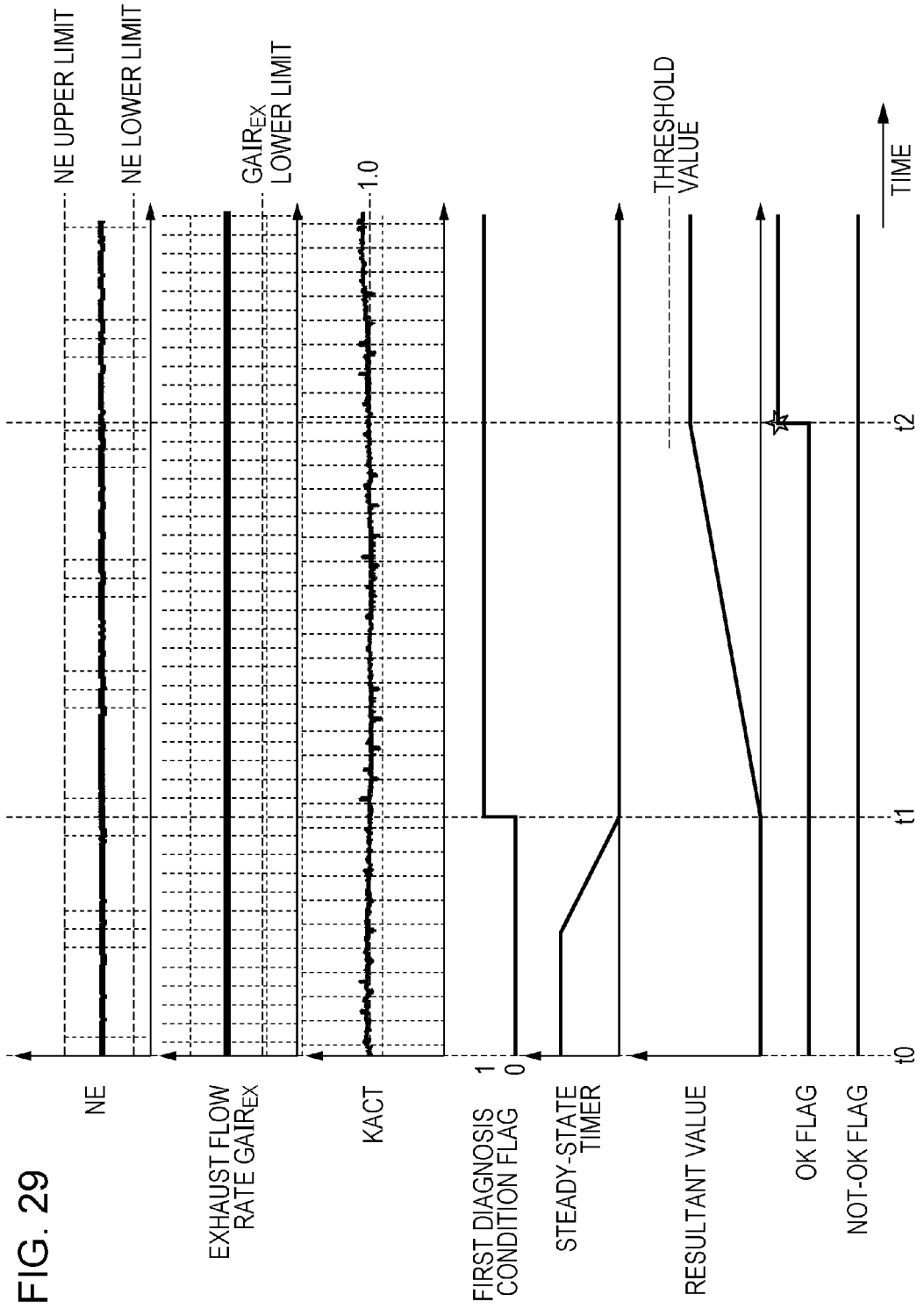
FIG. 29 illustrates an example of a simulation result obtained when air-fuel ratios are balanced cylinder to cylinder in the first diagnosis according to the embodiment of the present invention.

FIG. 29 illustrates an example of the simulation result obtained when a cylinder-to-cylinder air-fuel ratio balanced mode occurs. The range between the upper limit and the lower limit of the engine speed NE corresponds to the predetermined range in step S11 shown in FIGS. 25A and 25B. The lower limit of the exhaust flow rate $GAIR_{EX}$ corresponds to the predetermined value in step S12 shown in FIGS. 25A and 25B.

A certain period of time is measured by a ready-state timer (a timer that measures the period of time until the output of the air-fuel ratio sensor becomes stable). Thereafter, if the predetermined diagnosis conditions are satisfied at a point of time t1, the value of the first diagnosis condition flag is changed from 0 to 1. Although not shown, when the value of the first diagnosis condition flag is changed from 0 to 1, a timer that measures the predetermined period of time starts.

For the predetermined period (a diagnosis mode) of time from the point of time t1 to a point of time t2, an equivalent ratio obtained by filtering the detected equivalent ratio KACT output from the air-fuel ratio sensor using a bandpass filter is accumulated and corrected in cycles corresponding to the above-described 0.5th-order frequency. Such a process is repeated. In this way, the resultant value increases for the predetermined period of time from the point of time t1 to the point of time t2. In FIG. 29, the resultant value is shown as a straight line. However, more precisely, the resultant value increases in a stepwise manner at every cycle, as shown in FIGS. 9B and 9C. Since correction is performed on the resultant value, the resultant value increases with a constant increment regardless of the engine speed NE and the exhaust flow rate $GAIR_{EX}$.

At the point of time t2 at which the predetermined period of time has elapsed, the resultant value is compared with a predetermined threshold value. In this example, since the resultant value is less than or equal to the threshold value, the OK flag is set to 1, and it is determined that a balanced mode occurs.

Figure 30:
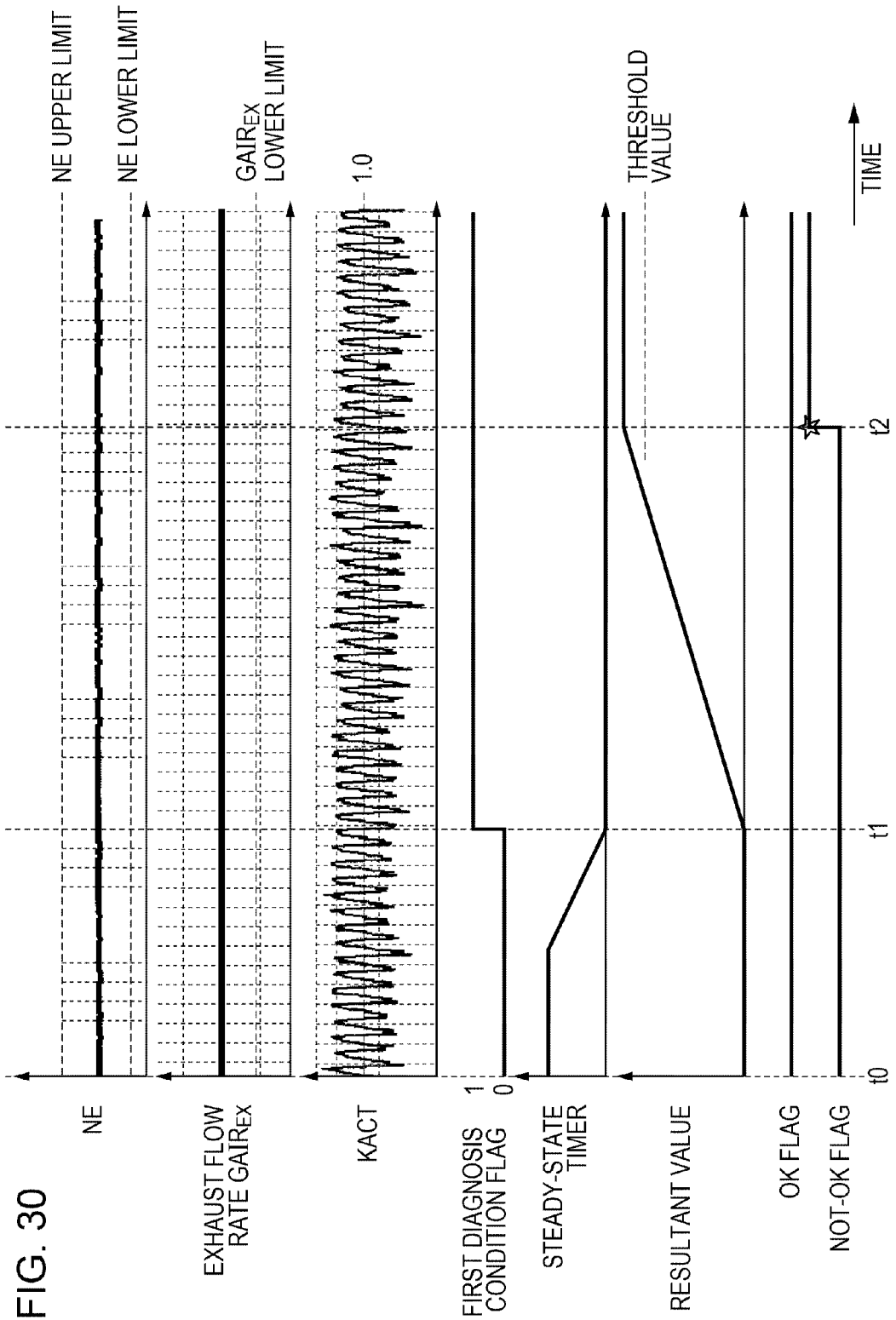
FIG. 30 illustrates an example of the simulation result obtained when air-fuel ratio cylinder imbalance occurs in the first diagnosis according to the embodiment of the present invention.

FIG. 30 illustrates another example of the simulation result obtained when cylinder-to-cylinder air-fuel ratio imbalance occurs. The detected equivalent ratio KACT output from the air-fuel ratio sensor significantly varies, as compared with the example shown in FIG. 29. Accordingly, an increase in the resultant value from the point of time t1 to the point of time t2 is larger than that in FIG. 29.

At the point of time t2, the resultant value is compared with the predetermined threshold value. In this example, since the resultant value is greater than the threshold value, the not-OK flag is set to 1, and it is determined that an imbalanced mode occurs.

FIG. 31 illustrates another example of the simulation result obtained when a cylinder-to-cylinder air-fuel ratio imbalance mode occurs. Unlike the case shown in FIG. 30, at the point of time t2, the exhaust flow rate $GAIR_{EX}$ varies. The variation $\Delta GAIR_{EX}$ is so large that the above-described diagnosis conditions are not satisfied (step S17 shown in FIG. 25A). Accordingly, since the variation occurs, the first diagnosis condition flag is set to zero in the first diagnosis determination process (FIGS. 25A and 25B). Thus, the subsequent diagnosis process (FIG. 26) is not performed. If the diagnosis is stopped, the integration value computed immediately before the diagnosis is stopped is stored in, for example, the memory of the ECU 1. In addition, when the diagnosis condition flag is set to zero at the point of time t2, the timer for measuring the predetermined period of time is stopped while maintaining the value thereof.

If the first diagnosis condition flag is set to 1 in the diagnosis condition determination process performed in the subsequent cycle (at a point of time t3), the timer for measuring the predetermined period of time is resumed, and the diagnosis process shown in FIG. 26 is started. That is, the equivalent ratio obtained by filtering the detected equivalent ratio KACT is added to the integration value stored in the memory. Thus, the integration value is corrected, and the resultant value is computed. In this way, when the predetermined period of time is expired at a point of time t4 (i.e., (period of time from t1 to t2)+(period of time from t3 to t4)=predetermined period of time, which is equal to the predetermined period of time shown in FIGS. 29 and 30), the resultant value is compared with the threshold value. Thus, it is determined whether an imbalance mode occurs. In this example, the resultant value is greater than the threshold value, it is determined that an imbalance mode occurs, and the not-OK flag is set to 1.

It should be noted that the bandpass filter and the integration unit shown in the above-described functional block diagrams may be realized by a computer program or hardware components.

In terms of the ignition timing correction described in the first diagnosis, if the ignition timing is controlled in accordance with the research octane number (RON) of fuel, correction may be performed by using the RON. As the RON decreases, the ignition timing is controlled so as to be retarded. Thus, as the RON decreases, the temperature of the exhaust gas increases. Accordingly, correction is performed so that the exhaust flow rate increases as the RON decreases and, therefore, the integration value (or the resultant value) decreases. Alternatively, correction may be performed so that the threshold value increases as the RON decreases.

While the present invention has been described with reference to exemplary embodiments, the present invention is not limited thereto. Furthermore, the embodiment of the present invention is applicable to not only a gasoline engine but a diesel engine.

If imbalance occurs in the air-fuel ratio of one of a plurality of cylinders and the air-fuel ratio of another cylinder or if imbalance occurs in the air-fuel ratios of two cylinders into which fuel is consecutively injected, a signal representing the air-fuel ratio detected by an air-fuel ratio sensor has a high value for the 0.5th-order frequency component of the engine speed. From this phenomenon, it can be easily detected whether cylinder-to-cylinder air-fuel ratio imbalance (a variation) occurs by extracting the 0.5th-order frequency component of the engine speed from the signal representing the detected air-fuel ratio and examining the level of the extracted frequency component.

In addition, a variation in the volume flow of exhaust gas flowing through the exhaust passage may have an impact on the responsiveness of the air-fuel ratio sensor. According to the embodiment, the exhaust flow rate indicating the level of the volume flow of the exhaust gas is computed by volume-correcting the intake air amount. The integration value is corrected in accordance with the exhaust flow rate. Thus, such a variation does not affect the determination as to whether the cylinder-to-cylinder air-fuel ratio imbalance occurs. As a result, the accuracy of the determination can be increased.

The control device can further include a unit configured to detect a pressure in an intake pipe of the internal-combustion engine. The exhaust flow rate computing sub-unit can compute the exhaust flow rate by correcting the detected intake air amount using a volume variation coefficient representing the ratio between the pressure in an intake pipe and the atmospheric pressure.

According to the embodiment, since a coefficient indicating a variation in the volume that depends on the atmospheric pressure and the pressure in an intake pipe is used, the current exhaust flow rate can be accurately computed. Accordingly, the accuracy of correction can be increased. As a result, the integration value can be corrected more accurately.

One of the following two operations can be performed: an operation in which one of the exhaust flow rate, the integration value, and the corrected integration value is corrected in accordance with an ignition timing of the internal-combustion engine so that the corrected integration value decreases as the ignition timing is more retarded and an operation in which the threshold value is corrected in accordance with the ignition timing so as to increase as the ignition timing is more retarded.

According to the embodiment, since correction is performed in accordance with the ignition timing, a variation in the volume flow of exhaust gas caused by a variation in ignition timing and, therefore, a variation in the corrected integration value can be compensated for. Accordingly, it can be more accurately determined whether cylinder-to-cylinder air-fuel ratio imbalance occurs.

The control device can further include a second diagnosis unit configured to diagnose whether cylinder-to-cylinder air-fuel ratio imbalance occurs and a switching unit configured to employ diagnosis using the first diagnosis unit if learning of the intake air amount detected by the intake air amount detection unit is completed and employ diagnosis using the second diagnosis unit if the learning is not completed. The second diagnosis unit can include a target air-fuel ratio setting sub-unit configured to set a target air-fuel ratio so that the target air-fuel ratio varies in predetermined cycles, a first filtering sub-unit configured to filter the signal representing the detected air-fuel ratio using a first bandpass filter so that a 0.5th-order frequency component of engine speed of the internal-combustion engine is extracted from the signal, a first integration sub-unit configured to compute a first integration value by accumulating the signal filtered by the first bandpass filter for a predetermined period of time, a second filtering sub-unit configured to filter the signal representing the detected air-fuel ratio using a second bandpass filter so that a frequency component corresponding to the predetermined cycles in which the target air-fuel ratio varies is extracted from the signal, a second integration sub-unit configured to compute a second integration value by accumulating the signal filtered by the second bandpass filter for the predetermined period of time, and a determination sub-unit configured to determine whether cylinder-to-cylinder air-fuel ratio imbalance occurs in the plurality of cylinders on the basis of the first integration value and the second integration value after the predetermined period of time has elapsed.

According to the embodiment, if learning of the output of the intake air amount detection unit, such as an airflow meter, is completed, diagnosis of a variation in the air-fuel ratio can be performed with relatively low computation load through the first diagnosis including a correction process. However, even when learning is not completed, diagnosis of a variation in the air-fuel ratio can be performed through the second diagnosis. Therefore, the reliability of diagnosis can be increased.

If a difference between an intake air amount detected by the intake air amount detection unit and a reference intake air amount based on an operating mode of the internal-combustion engine is less than or equal to a predetermined value, it can be determined that the learning is completed and diagnosis using the first diagnosis unit can be performed using the intake air amount corrected so that an error of the detected intake air amount is compensated for. However, if the difference is greater than the predetermined value, it can be determined that the learning is not completed and, thus, diagnosis using the second diagnosis unit can be performed. In this way, if deterioration of the output of the intake air amount detection unit, such as an airflow meter, is small, diagnosis can be performed through the first diagnosis. However, if deterioration of the output unit is significant, diagnosis can be performed through the second diagnosis.

The control device can further include a unit configured to determine whether a condition in which the engine speed of the internal-combustion engine is within a predetermined range and the computed exhaust flow rate is higher than a predetermined value is satisfied. If the condition is satisfied, filtering performed by the filtering sub-unit, accumulation performed by the integration sub-unit, correction performed by the correction sub-unit, and determination performed by the determination sub-unit of the first diagnosis unit are allowed.

According to the embodiment, in some range of an operating state, it may be difficult to accurately determine whether cylinder-to-cylinder air-fuel ratio imbalance occurs. Accordingly, in such a case, the determination is prohibited. In this way, it can be determined whether cylinder-to-cylinder air-fuel ratio imbalance occurs in an operating state in which an excellent responsiveness of the air-fuel ratio sensor can be provided.

If the condition is not satisfied in a cycle during the predetermined period of time, the accumulation can be prohibited and an integration value computed in the previous cycle can be stored and, thereafter, the accumulation can be resumed using the stored integration value if the condition is satisfied. In this way, if the predetermined condition is not satisfied while the accumulation process is being performed due to, for example, a variation in the operating mode, the accumulation process is temporarily stopped and, thereafter, the accumulation process is resumed. Therefore, even in such a case, it can be determined whether the air-fuel ratio cylinder imbalance occurs.

The correction sub-unit can correct the predetermined threshold value in accordance with the computed exhaust flow rate instead of correcting the first integration value in accordance with the computed exhaust flow rate, and the determination sub-unit can determine that cylinder-to-cylinder air-fuel ratio imbalance occurs if the first integration value is greater than the corrected threshold value after the predetermined period of time has elapsed.

The determination sub-unit of the second diagnosis unit can determine that cylinder-to-cylinder air-fuel ratio imbalance occurs if a value obtained by dividing the first integration value by the second integration value is greater than a predetermined threshold value after the predetermined period of time has elapsed. Alternatively, the determination sub-unit of the second diagnosis unit can determine that cylinder-to-cylinder air-fuel ratio imbalance occurs if the first integration value is greater than a threshold value determined on the basis of the second integration value after the predetermined period of time has elapsed. In this way, even when the responsiveness of the air-fuel ratio detection unit is deteriorated due to normalization in accordance with the second integration value or setting of the threshold value in accordance with the second integration value, it can be accurately determined whether the air-fuel ratio cylinder imbalance occurs.

The first diagnosis unit can further include a sub-unit configured to filter the signal representing the detected air-fuel ratio using a third bandpass filter and extract a first-order frequency component of the engine speed of the internal-combustion engine from the signal and an integration sub-unit configured to compute a third integration value by accumulating the signal filtered by the third bandpass filter for a predetermined period of time. The determination sub-unit of the first diagnosis unit can determine that cylinder-to-cylinder air-fuel ratio imbalance occurs if the third integration value corrected in accordance with the computed exhaust flow rate corrected each time the third integration value is computed is greater than a predetermined second threshold value after the predetermined period of time has elapsed or if the third integration value is greater than the second threshold value corrected in accordance with the computed exhaust flow rate after the predetermined period of time has elapsed.

The second diagnosis unit can further include a sub-unit configured to filter the signal representing the detected air-fuel ratio using a fourth bandpass filter and extract a first-order frequency component of the engine speed of the internal-combustion engine from the signal and a sub-unit configured to compute a fourth integration value by accumulating the signal filtered by the fourth bandpass filter for the predetermined period of time. The determination sub-unit of the second diagnosis unit can determine that cylinder-to-cylinder air-fuel ratio imbalance occurs if a value obtained by dividing the fourth integration value by the second integration value is greater than a predetermined threshold value after the predetermined period of time has elapsed or if the fourth integration value is greater than a threshold value determined on the basis of the second integration value after the predetermined period of time has elapsed.

In some form of an internal-combustion engine, if the air-fuel ratio of two cylinders into which fuel is nonconsecutively injected differs from the air-fuel ratio of another cylinder, the first-order frequency component of the engine speed becomes high in a signal representing the detected air-fuel ratio. Accordingly, even for an internal-combustion engine having such a form, by extracting the first-order frequency component in addition to the 0.5th-order frequency component, it can be simply determined whether cylinder-to-cylinder air-fuel ratio imbalance occurs using the first diagnosis and the second diagnosis.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an internal-combustion engine, comprising:
   an air-fuel ratio detector configured to detect an air-fuel ratio of the internal-combustion engine having a plurality of cylinders;
   an intake air amount detector provided in an intake passage of the internal-combustion engine and configured to detect an intake air amount;
   an atmospheric pressure detector configured to detect an atmospheric pressure; and
   a first diagnosis device configured to diagnose whether cylinder-to-cylinder air-fuel ratio imbalance occurs, the first diagnosis device comprising:
      an exhaust flow rate calculator configured to calculate an exhaust flow rate that reflects a volume flow amount of exhaust gas flowing through an exhaust passage of the internal-combustion engine by performing volume-correction of the intake air amount detected by the intake air amount detector based on at least the atmospheric pressure detected by the atmospheric pressure detector;
      a first filter configured to filter a signal representing the air-fuel ratio detected by the air-fuel ratio detector using a first bandpass filter so that a 0.5th-order frequency component of engine speed of the internal-combustion engine is extracted from the signal;
      a first integrator configured to accumulate a filtered signal filtered by the first filter for a predetermined first period of time to compute a first integration value;
      a corrector configured to correct the first integration value in accordance with the exhaust flow rate calculated by the exhaust flow rate calculator to compute a corrected first integration value each time the first integration value is computed by the first integrator; and
      a first determination section configured to determine that cylinder-to-cylinder air-fuel ratio imbalance occurs in the plurality of cylinders if the corrected first integration value is greater than a predetermined first threshold value after the predetermined first period of time has elapsed.

2. The control apparatus according to claim 1, further comprising:
   a intake pipe pressure detector configured to detect a pressure in an intake pipe of the internal-combustion engine,
   wherein the exhaust flow rate calculator is configured to calculate the exhaust flow rate by correcting the intake air amount detected by the intake air amount detector using a volume variation coefficient representing a ratio between the pressure in an intake pipe and the atmospheric pressure.

3. The control apparatus according to claim 1,
   wherein the control apparatus is configured to perform one of a first operation and a second operation, the first operation being an operation in which one of the exhaust flow rate, the first integration value, and the corrected first integration value is corrected in accordance with an ignition timing of the internal-combustion engine so that the corrected first integration value decreases as the ignition timing is more retarded, the second operation being an operation in which the predetermined first threshold value is corrected in accordance with the ignition timing so as to increase as the ignition timing is more retarded.

4. The control apparatus according to claim 1, further comprising:
   a second diagnosis device configured to diagnose whether cylinder-to-cylinder air-fuel ratio imbalance occurs; and
   a switching device configured to employ diagnosis using the first diagnosis device if learning of the intake air amount detected by the intake air amount detector is completed and configured to employ diagnosis using the second diagnosis device if the learning is not completed,
   wherein the second diagnosis device includes
      a target air-fuel ratio setter configured to set a target air-fuel ratio so that the target air-fuel ratio varies in predetermined cycles,
      a second filter configured to filter the signal representing the air-fuel ratio detected by the air-fuel ratio detector using a second bandpass filter so that a 0.5th-order frequency component of engine speed of the internal-combustion engine is extracted from the signal,
      a second integrator configured to accumulate a filtered signal filtered by the second filter for a predetermined second period of time to compute a second integration value,
      a third filter configured to filter the signal representing the air-fuel ratio detected by the air-fuel ratio detector using a third bandpass filter so that a frequency component corresponding to the predetermined cycles in which the target air-fuel ratio varies is extracted from the signal, a third integrator configured to accumulate a filtered signal filtered by the third filter for the predetermined second period of time to compute a third integration value, and a second determination device configured to determine whether cylinder-to-cylinder air-fuel ratio imbalance occurs in the plurality of cylinders based on the second integration value and the third integration value after the predetermined second period of time has elapsed.

5. The control apparatus according to claim 4,
wherein, if a difference between the intake air amount detected by the intake air amount detector and a reference intake air amount based on an operating mode of the internal-combustion engine is less than or equal to a predetermined first value, it is determined that the learning is completed and diagnosis using the first diagnosis device is performed using a corrected intake air amount corrected so that the difference is compensated for, and
wherein, if the difference is greater than the predetermined first value, it is determined that the learning is not completed and diagnosis using the second diagnosis device is performed.

6. The control apparatus according to claim 4,
wherein the second determination section of the second diagnosis device is configured to determine that cylinder-to-cylinder air-fuel ratio imbalance occurs if a value obtained by dividing the second integration value by the third integration value is greater than a predetermined second threshold value after the predetermined second period of time has elapsed.

7. The control apparatus according to claim 4,
wherein the second determination section of the second diagnosis device is configured to determine that cylinder-to-cylinder air-fuel ratio imbalance occurs if the second integration value is greater than a third threshold value determined based on the third integration value after the predetermined second period of time has elapsed.

8. The control apparatus according to claim 4,
wherein the second diagnosis device further includes
a fifth filter configured to filter the signal representing the air-fuel ratio detected by the air-fuel ratio detector using a fifth bandpass filter so that a first-order frequency component of the engine speed of the internal-combustion engine is extracted from the signal and
a fifth integrator configured to accumulate a filtered signal filtered by the fifth filter for the predetermined second period of time to compute a fifth integration value, and
wherein the second determination section of the second diagnosis device is configured to determine that cylinder-to-cylinder air-fuel ratio imbalance occurs if a value obtained by dividing the fifth integration value by the third integration value is greater than a predetermined fifth threshold value after the predetermined second period of time has elapsed or if the fifth integration value is greater than a sixth threshold value determined based on the third integration value after the predetermined second period of time has elapsed.

9. The control apparatus according to claim 1, further comprising:
a determine device configured to determine whether a condition in which the engine speed of the internal-combustion engine is within a predetermined range and the exhaust flow rate calculated by the exhaust flow rate calculator is higher than a predetermined second value is satisfied,
wherein, if the condition is satisfied, filtering performed by the first filter, accumulation performed by the first integrator, correction performed by the corrector, and determination performed by the first determination section of the first diagnosis device are allowed.

10. The control apparatus according to claim 9,
wherein, if the condition is not satisfied in a cycle during the predetermined first period of time, the accumulation is prohibited and a first integration value computed in a previous cycle is stored and, thereafter, the accumulation is resumed using a stored first integration value if the condition is satisfied.

11. The control apparatus according to claim 1,
wherein the corrector is configured to correct the predetermined first threshold value in accordance with the exhaust flow rate calculated by the exhaust flow rate instead of correcting the first integration value in accordance with the exhaust flow rate calculated by the exhaust flow rate, and
wherein the first determination section is configured to determine that cylinder-to-cylinder air-fuel ratio imbalance occurs if the first integration value is greater than a corrected first threshold value corrected by the corrector after the predetermined first period of time has elapsed.

12. The control apparatus according to claim 1,
wherein the first diagnosis device further includes
a fourth filter configured to filter the signal representing the air-fuel ratio detected by the air-fuel ratio detector using a fourth bandpass filter so that a first-order frequency component of the engine speed of the internal-combustion engine is extracted from the signal and
a fourth integrator configured to accumulate a filtered signal filtered by the fourth filter for a predetermined third period of time to compute a fourth integration value, and
wherein the first determination section of the first diagnosis device is configured to determine that cylinder-to-cylinder air-fuel ratio imbalance occurs if the corrected fourth integration value corrected by the corrector in accordance with the exhaust flow rate calculated by the exhaust flow rate calculator each time the fourth integration value is computed is greater than a predetermined fourth threshold value after the predetermined third period of time has elapsed or if the fourth integration value is greater than the predetermined fourth threshold value corrected in accordance with the exhaust flow rate calculated by the exhaust flow rate calculator after the predetermined third period of time has elapsed.

13. A control apparatus for an internal-combustion engine, comprising:
air-fuel ratio detection means for detecting an air-fuel ratio of the internal-combustion engine having a plurality of cylinders;
intake air amount detection means for detecting an intake air amount, the intake air amount detection means being provided in an intake passage of the internal-combustion engine;
atmospheric pressure detection means for detecting an atmospheric pressure; and
first diagnosis means for diagnosing whether cylinder-to-cylinder air-fuel ratio imbalance occurs, the first diagnosis means comprising:

exhaust flow rate calculating means for calculating an exhaust flow rate that reflects a volume flow amount of exhaust gas flowing through an exhaust passage of the internal-combustion engine by performing volume-correction of the intake air amount detected by the intake air amount detection means based on at least the atmospheric pressure detected by the atmospheric pressure detection means;

filtering means for filtering a signal representing the air-fuel ratio detected by the air-fuel ratio detection means using a bandpass filter so that a 0.5th-order frequency component of engine speed of the internal-combustion engine is extracted from the signal;

integration means for accumulating a filtered signal filtered by the filtering means for a predetermined period of time to compute a integration value;

correction means for correcting the integration value in accordance with the exhaust flow rate calculated by the exhaust flow rate calculating means to compute a corrected integration value each time the integration value is computed by the integration means; and determination means for determining that cylinder-to-cylinder air-fuel ratio imbalance occurs in the plurality of cylinders if the corrected integration value is greater than a predetermined threshold value after the predetermined period of time has elapsed.

14. A non-transitory computer-readable recording medium having program code stored thereon which, when executed by a computer, causes the computer to perform an internal combustion engine control method for performing a plurality of application programs, the internal combustion engine control method comprising:

detecting an air-fuel ratio of the internal-combustion engine having a plurality of cylinders;

detecting an intake air amount of the internal-combustion engine;

detecting an atmospheric pressure; and diagnosing whether cylinder-to-cylinder air-fuel ratio imbalance occurs, the first diagnosing step comprising:
calculating an exhaust flow rate that reflects a volume flow amount of exhaust gas flowing through an exhaust passage of the internal-combustion engine by performing volume-correction of the intake air amount based on at least the atmospheric pressure;

filtering a signal representing the air-fuel ratio using a first bandpass filter so that a 0.5th-order frequency component of engine speed of the internal-combustion engine is extracted from the signal;

accumulating a filtered signal filtered using the first bandpass filter for a predetermined first period of time to compute a first integration value;

correcting the first integration value in accordance with the exhaust flow rate to compute a corrected first integration value each time the first integration value is computed; and determining that cylinder-to-cylinder air-fuel ratio imbalance occurs in the plurality of cylinders if the corrected first integration value is greater than a predetermined first threshold value after the predetermined first period of time has elapsed.

15. The non-transitory computer-readable recording medium according to claim 14,
wherein the internal combustion engine control method includes
detecting a pressure in an intake pipe of the internal-combustion engine, and
calculating the exhaust flow rate by correcting the intake air amount using a volume variation coefficient representing a ratio between the pressure in an intake pipe and the atmospheric pressure.

16. The non-transitory computer-readable recording medium according to claim 14,
wherein the internal combustion engine control method includes
diagnosing whether cylinder-to-cylinder air-fuel ratio imbalance occurs, the second diagnosing step including
setting a target air-fuel ratio so that the target air-fuel ratio varies in predetermined cycles,
filtering the signal representing the air-fuel ratio using a second bandpass filter so that a 0.5th-order frequency component of engine speed of the internal-combustion engine is extracted from the signal,
accumulating a filtered signal filtered using the second bandpass filter for a predetermined second period of time to compute a second integration value,
filtering the signal representing the air-fuel ratio using a third bandpass filter so that a frequency component corresponding to the predetermined cycles in which the target air-fuel ratio varies is extracted from the signal,
a third integrator configured to accumulate a filtered signal filtered using the third bandpass filter for the predetermined second period of time to compute a third integration value, and
determining whether cylinder-to-cylinder air-fuel ratio imbalance occurs in the plurality of cylinders based on the second integration value and the third integration value after the predetermined second period of time has elapsed;
employing diagnosis using the first diagnosing step if learning of the intake air amount is completed, and
employing diagnosis using the second diagnosing step if the learning is not completed.

17. A control method for an internal-combustion engine, comprising:
detecting an air-fuel ratio of the internal-combustion engine having a plurality of cylinders;
detecting an intake air amount of the internal-combustion engine;
detecting an atmospheric pressure; and
diagnosing whether cylinder-to-cylinder air-fuel ratio imbalance occurs, the first diagnosing step comprising:
calculating an exhaust flow rate that reflects a volume flow amount of exhaust gas flowing through an exhaust passage of the internal-combustion engine by performing volume-correction of the intake air amount based on at least the atmospheric pressure;
filtering a signal representing the air-fuel ratio using a first bandpass filter so that a 0.5th-order frequency component of engine speed of the internal-combustion engine is extracted from the signal;
accumulating a filtered signal filtered using the first bandpass filter for a predetermined first period of time to compute a first integration value;
correcting the first integration value in accordance with the exhaust flow rate to compute a corrected first integration value each time the first integration value is computed; and
determining that cylinder-to-cylinder air-fuel ratio imbalance occurs in the plurality of cylinders if the corrected first integration value is greater than a predetermined first threshold value after the predetermined first period of time has elapsed.

18. The control method according to claim 17, further comprising:
   detecting a pressure in an intake pipe of the internal-combustion engine; and
   calculating the exhaust flow rate by correcting the intake air amount using a volume variation coefficient representing a ratio between the pressure in an intake pipe and the atmospheric pressure.

19. The control method according to claim 17, further comprising:
   performing one of a first operation and a second operation, the first operation being an operation in which one of the exhaust flow rate, the first integration value, and the corrected first integration value is corrected in accordance with an ignition timing of the internal-combustion engine so that the corrected first integration value decreases as the ignition timing is more retarded, the second operation being an operation in which the predetermined first threshold value is corrected in accordance with the ignition timing so as to increase as the ignition timing is more retarded.

20. The control method according to claim 17, further comprising:
   diagnosing whether cylinder-to-cylinder air-fuel ratio imbalance occurs, the second diagnosing step comprising:
   setting a target air-fuel ratio so that the target air-fuel ratio varies in predetermined cycles;
   filtering the signal representing the air-fuel ratio using a second bandpass filter so that a 0.5th-order frequency component of engine speed of the internal-combustion engine is extracted from the signal;
   accumulating a filtered signal filtered using the second bandpass filter for a predetermined second period of time to compute a second integration value;
   filtering the signal representing the air-fuel ratio using a third bandpass filter so that a frequency component corresponding to the predetermined cycles in which the target air-fuel ratio varies is extracted from the signal;
   a third integrator configured to accumulate a filtered signal filtered using the third bandpass filter for the predetermined second period of time to compute a third integration value; and
   determining whether cylinder-to-cylinder air-fuel ratio imbalance occurs in the plurality of cylinders based on the second integration value and the third integration value after the predetermined second period of time has elapsed;
   employing diagnosis using the first diagnosing step if learning of the intake air amount is completed; and
   employing diagnosis using the second diagnosing step if the learning is not completed.

* * * * *